United States Patent
Zulch

(10) Patent No.: US 8,497,871 B2
(45) Date of Patent: Jul. 30, 2013

(54) COLOR GENERATION USING MULTIPLE ILLUMINANT TYPES

(75) Inventor: Richard C. Zulch, Orinda, CA (US)

(73) Assignee: Zulch Laboratories, Inc., Orinda, CA (US)

( * ) Notice: Subject to any disclaimer, the term of this patent is extended or adjusted under 35 U.S.C. 154(b) by 734 days.

(21) Appl. No.: 12/387,468

(22) Filed: Apr. 30, 2009

(65) Prior Publication Data

US 2010/0097406 A1 Apr. 22, 2010

Related U.S. Application Data

(60) Provisional application No. 61/196,974, filed on Oct. 21, 2008.

(51) Int. Cl.
*G09G 5/02* (2006.01)

(52) U.S. Cl.
USPC .......................................... 345/589

(58) Field of Classification Search
USPC ..... 345/87, 690, 83, 589; 315/169.3; 382/162
See application file for complete search history.

(56) References Cited

U.S. PATENT DOCUMENTS

| | | | |
|---|---|---|---|
| 5,334,992 A * | 8/1994 | Rochat et al. | 345/22 |
| 6,236,750 B1 * | 5/2001 | Garber | 382/162 |
| 6,538,742 B1 | 3/2003 | Ohsawa | |
| 2004/0218387 A1 | 11/2004 | Gerlach | |
| 2005/0083352 A1* | 4/2005 | Higgins | 345/690 |
| 2005/0225575 A1 | 10/2005 | Brown Elliott et al. | |
| 2006/0007111 A1 | 1/2006 | Moon et al. | |
| 2006/0214596 A1* | 9/2006 | Miller et al. | 315/169.3 |
| 2007/0211013 A1 | 9/2007 | Uehaera et al. | |
| 2008/0218779 A1 | 9/2008 | Shirasawa | |
| 2008/0225021 A1 | 9/2008 | Hekstra et al. | |

FOREIGN PATENT DOCUMENTS

| | | |
|---|---|---|
| EP | 1484742 A2 | 12/2004 |
| EP | 1931127 A1 | 6/2008 |
| WO | 2007118637 A2 | 10/2007 |

OTHER PUBLICATIONS

Ok et al. "Color Processing for Multi-Primary Display Devices" ICIP 2005. IEEE International Conference on Image Processing, vol. 3, Issue, Sep. 11-14, 2005.

(Continued)

*Primary Examiner* — Quan-Zhen Wang
*Assistant Examiner* — Calvin C Ma
(74) *Attorney, Agent, or Firm* — Van Pelt, Yi & James LLP

(57) ABSTRACT

A system for generating a colored light comprises a set of illuminant types and a processor. The set of illuminant types is associated with a chromaticity gamut, and the set of illuminant types comprises at least five illuminant types that are each associated an illuminant type hue angle. The processor is configured to determine, based at least in part on a mapping, an output level set for a received color coordinate. The mapping comprises associating each color coordinate with an output level set that uses a set of hue-adjacent illuminant types. Hue-adjacent illuminant types comprise a group of illuminant types that are determined to be adjacent in a circular ordered list of illuminant types that is circularly ordered according to the illuminant type hue angle.

27 Claims, 47 Drawing Sheets

OTHER PUBLICATIONS

Ries et al. "Optimized Additive Mixing of Colored Light-emitting Diode Sources" Paper IE-OE 12 received Jan. 9, 2004; revised manuscript received Mar. 1, 2004; accepted for publication Mar. 3, 2004. This paper is a revision of a paper presented at the SPIE conference on Design of Efficient Illumination Systems, Aug. 2003, San Diego, CA. The paper there appears (unrefereed) in SPIE Proceedings vol. 5186.

H. Sugiura "Multiple Primary Color Backlights" LCD Backlights, (c) 2009 John Wiley & Sons, Ltd.

Wyszecki et al. "3.8.2 Methods of Generating Metamers" excerpt from Color Science: Concepts and Methods, Quantitative Data Formulae (2nd edition), Jul. 2000.

Mannini, Nunzio , "Ambilight Furs Wohnen: Philips Living Colors getestet", Internet Citation, Sep. 4, 2007, pp. 1-11, XP002672092, Retrieved from the Internet: URL:http://neuerdings.com/2007/09/04/ambilight-fuers-wohnen-philips-living-colors-getested/ [retrieved on Mar. 22, 2012].

* cited by examiner

| COLOR NAME | TRISTIMULUS | | | CHROMATICITY | | RADIANT INTENSITY | LUMINOUS INTENSITY |
|---|---|---|---|---|---|---|---|
| | X | Y | Z | $x$ | $y$ | | |
| RED | .470 | .195 | .003 | .704 | .292 | .041 | 5.4 |
| RED ORANGE | .636 | .278 | .001 | .695 | .303 | .033 | 6.3 |
| AMBER | .979 | .676 | .015 | .587 | .405 | .016 | 7.6 |
| GREEN | .220 | .734 | .102 | .209 | .695 | .016 | 8.0 |
| CYAN | .073 | .363 | .379 | .089 | .445 | .018 | 4.6 |
| BLUE | .178 | .127 | 1.104 | .126 | .090 | .026 | 2.2 |
| INDIGO | .274 | .067 | 1.443 | .154 | .038 | .030 | 1.4 |
| WARM WHITE | .436 | .308 | .135 | .496 | .350 | .052 | 10.9 |

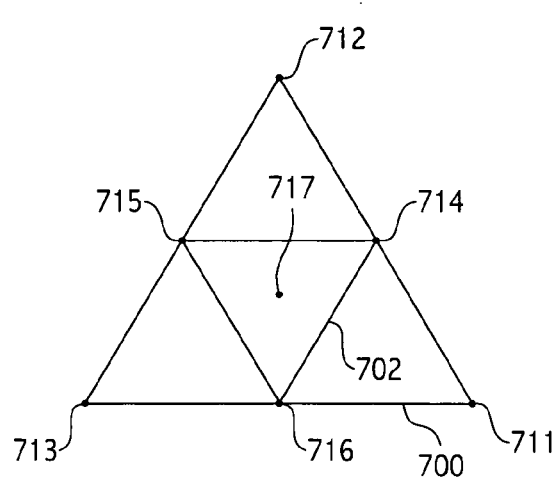
Fig. 7A
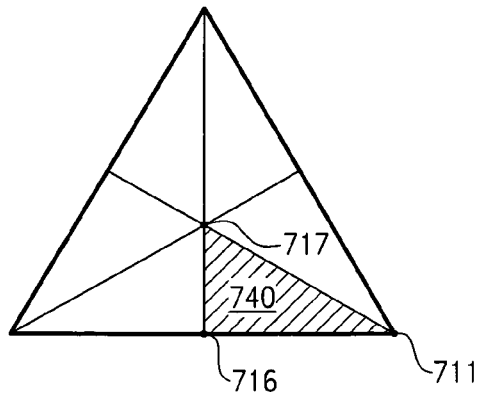
Fig. 7B
| VERTEX | RANK | $IL_0$ DRIVE | $IL_1$ DRIVE | $IL_2$ DRIVE | BITMAP |
|---|---|---|---|---|---|
| 711 | 1 | 100 % | 0 % | 0 % | 001 |
| 712 | 1 | 0 % | 100 % | 0 % | 010 |
| 713 | 1 | 0 % | 0 % | 100 % | 100 |
| 714 | 2 | 100 % | 100 % | 0 % | 011 |
| 715 | 2 | 0 % | 100 % | 100 % | 110 |
| 716 | 2 | 100 % | 0 % | 100 % | 101 |
| 717 | 3 | 100 % | 100 % | 100 % | 111 |
Fig. 7C

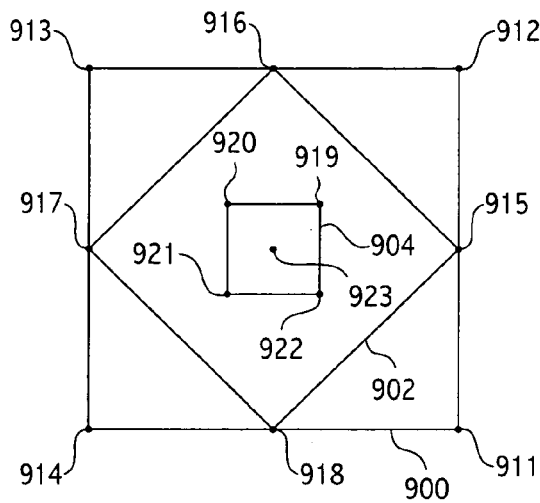
Fig. 9A
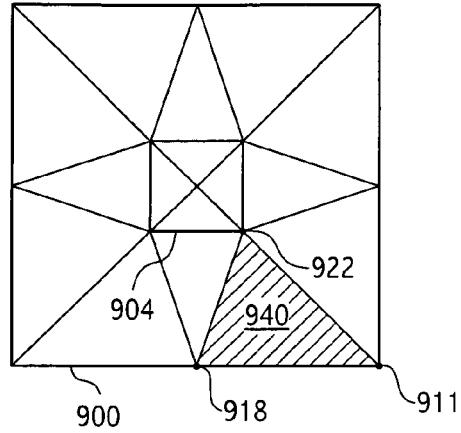
Fig. 9B
| VERTEX | RANK | IL$_0$ DRIVE | IL$_1$ DRIVE | IL$_2$ DRIVE | IL$_3$ DRIVE | BITMAP |
|---|---|---|---|---|---|---|
| 911 | 1 | 100 % | 0 % | 0 % | 0 % | 0001 |
| 912 | 1 | 0 % | 100 % | 0 % | 0 % | 0010 |
| 913 | 1 | 0 % | 0 % | 100 % | 0 % | 0100 |
| 914 | 1 | 0 % | 0 % | 0 % | 100 % | 1000 |
| 915 | 2 | 100 % | 100 % | 0 % | 0 % | 0011 |
| 916 | 2 | 0 % | 100 % | 100 % | 0 % | 0110 |
| 917 | 2 | 0 % | 0 % | 100 % | 100 % | 1100 |
| 918 | 2 | 100 % | 0 % | 0 % | 100 % | 1001 |
| 919 | 3 | 100 % | 100 % | 100 % | 0 % | 0111 |
| 920 | 3 | 0 % | 100 % | 100 % | 100 % | 1110 |
| 921 | 3 | 100 % | 0 % | 100 % | 100 % | 1101 |
| 922 | 3 | 100 % | 100 % | 0 % | 100 % | 1011 |
| 923 | 4 | 100 % | 100 % | 100 % | 100 % | 1111 |
Fig. 9C

FIG. 26A

| CHROMATICITY | |
|---|---|
| FIELD NAME | TYPE |
| $x$ | ABSCISSA |
| $y$ | ORDINATE |

FIG. 26B

| TRISTIMULUS | |
|---|---|
| FIELD NAME | TYPE |
| X | NUMBER |
| Y | NUMBER |
| Z | NUMBER |

FIG. 27A

| VERTEX | |
|---|---|
| FIELD NAME | TYPE |
| MAP | BITMAP |
| TSV | TRISTIMULUS |

FIG. 27B

| FACET | |
|---|---|
| FIELD NAME | TYPE |
| V1 | VERTEX INDEX |
| V2 | VERTEX INDEX |
| V3 | VERTEX INDEX |
| XLATE | 3X3 MATRIX |

FIG. 27C

| COLOR CALCULATOR STATE | |
|---|---|
| FIELD NAME | TYPE |
| N | ILLUMINANT COUNT |
| GAMUT | CHROMATICITY ARRAY |
| LINT | INTENSITY ARRAY |
| CENTER | VERTEX |
| VERTS | VERTEX ARRAY |
| FACETS | FACET ARRAY |
| LEVELS | PERCENT ARRAY |

FIG. 28A

| ILLUMINANT STATUS | |
|---|---|
| FIELD NAME | TYPE |
| ILLUMINANTS | TRISTIMULUS ARRAY |
| LINEARIZER | PERCENT ARRAY |

FIG. 28B

| COMMAND | |
|---|---|
| FIELD NAME | TYPE |
| C | CHROMATICITY |
| I | PERCENT |
| SPECTRAL | PERCENT ARRAY |

FIG. 28C

| DRIVE LEVEL SET | |
|---|---|
| FIELD NAME | TYPE |
| DRIVES | PERCENT ARRAY |

US 8,497,871 B2

COLOR GENERATION USING MULTIPLE ILLUMINANT TYPES

CROSS REFERENCE TO OTHER APPLICATIONS

This application claims priority to U.S. Provisional Patent Application No. 61/196,974 entitled SIMPLIFIED COLOR GENERATION USING MULTIPLE ILLUMINANTS filed Oct. 21, 2008 which is incorporated herein by reference for all purposes.

BACKGROUND OF THE INVENTION

Light emitting devices can be categorized as either illumination devices or display devices. Illumination devices, known as luminaires, are primarily intended to make objects and surfaces visible while display devices are intended to graphically convey information. Both emit light by means of illuminants of different types, having different colors. Additive color mixing combines these illuminant types in appropriate proportions to achieve a selected color. Selectable colors include the entire human perceptual gamut from deeply saturated hues to every shade of white. While three illuminant types were traditionally used, four or more illuminant types are useful in providing a broader gamut for both luminaires and display devices. Four or more illuminant types are also useful for luminaires incorporating light sources such as LEDs (Light-Emitting Diodes) that emit a relatively narrow wavelength bandwidth because broader spectrum coverage improves color rendering.

When three or fewer illuminant types are used there is exactly one mixture of the brightness values for each of the illuminants for each possible color, but with four or more illuminant types there are infinite mixtures for each color, known as metamers of that color. Different metamers have varying qualities, among them brightness and color rendering (e.g., affecting the color appearance of surfaces being illuminated), so the best metamer for a selected criterion is preferred. However, finding this best metamer has been a difficult problem. Prior art methods applicable to four or more illuminant types include linear programming, calculus of variations, ad-hoc measurement with lookup tables, and probabilistic algorithms using Monte Carlo simulation or simulated annealing. Many of these methods generate metamers that imprecisely match the selected color. Most of these methods require significant computational resources, especially for large numbers of illuminants. All of these methods fail to achieve a best metamer under a selected criterion (e.g., brightness, color rendering, etc.) for at least some parts of the illuminant gamut, and most cause visual artifacts for at least some color changes. Visual artifacts result from sudden changes in the composition of the computed metamers, so while an aggregate original color and an aggregate new color may differ almost imperceptibly, constituent illuminant brightness can change utterly between them. Such sudden transitions trigger a strong reaction in an observer's visual system that is perceived as an irritating flicker.

BRIEF DESCRIPTION OF THE DRAWINGS

Various embodiments of the invention are disclosed in the following detailed description and the accompanying drawings.

FIG. 7A is a diagram illustrating an embodiment of a method of obtaining all possible proportions of three arbitrary illuminant types $IL_0$, $IL_1$, and $IL_2$.

FIG. 7B is a diagram illustrating an embodiment of one possible tessellation of the two-dimensional triangular control surface.

FIG. 7C is a table illustrating an embodiment of detailed information for each vertex in FIGS. 7A and 7B.

FIG. 9A is a diagram illustrating an embodiment of a method of obtaining all possible proportions of four arbitrary illuminant types $IL_0$, $IL_1$, $IL_2$, and $IL_3$ that are required for color mixing.

FIG. 9B is a diagram illustrating an embodiment of one possible tessellation of the two-dimensional rectangular control surface.

FIG. 9C is a table illustrating an embodiment of detailed information for each vertex in FIGS. 9A and 9B.

FIG. 26A is a table illustrating an embodiment of a chromaticity data structure useful for color mixing calculations.

FIG. 26B is a table illustrating an embodiment of a tristimulus data structure useful for color mixing calculations.

FIG. 27A is a table illustrating an embodiment of a vertex data structure used for color mixing.

FIG. 27B is a table illustrating an embodiment of a facet data structure used for color mixing.

FIG. 27C is a table illustrating an embodiment of a color calculator state data structure used to store predetermined and calculated data for a color-mixing device and its control surfaces.

FIG. 28A is a table illustrating an embodiment of an illuminant status data structure used to store measured illuminant type characteristics of a color-mixing device.

FIG. 28B is a table illustrating an embodiment of a command data structure for a color-mixing device.

FIG. 28C is a table illustrating an embodiment of a drive level set data structure used to communicate drive level information to an electronic driver controlling illuminant intensity.

DETAILED DESCRIPTION

Figures 1A, 1B:
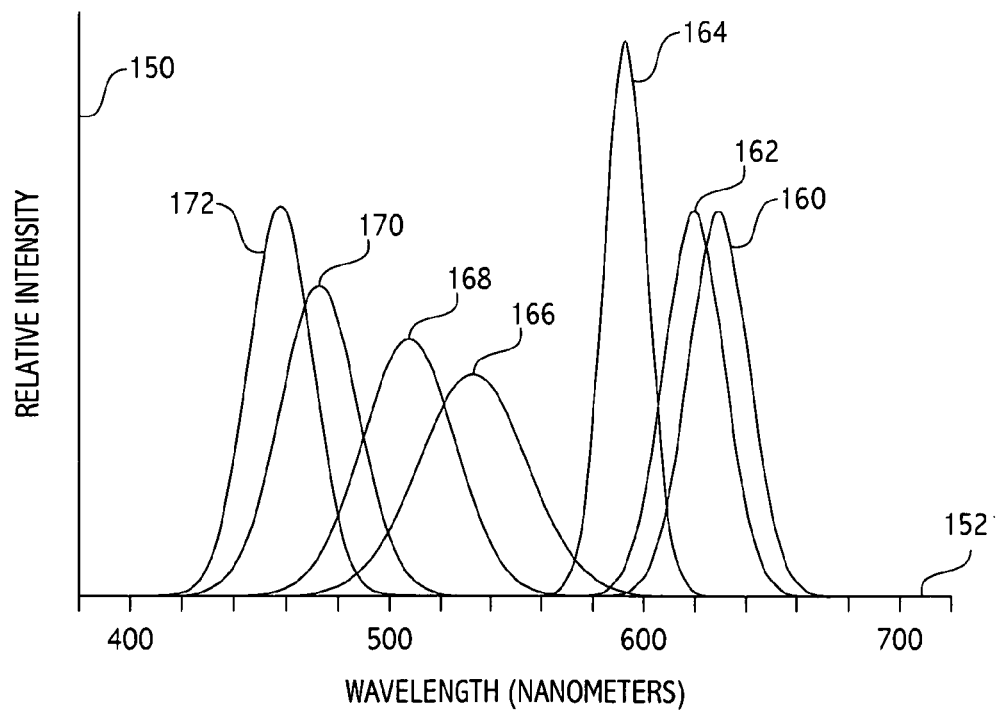
FIG. 1A is a table illustrating an embodiment of eight representative illuminant types.
FIG. 1B is a graph illustrating an embodiment of illuminant relative intensity.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for generating colored light is disclosed. Light is generated using additive color mixing of multiple illuminant types. The system for generating colored light comprises a set of illuminant types and a processor. The set of illuminant types comprises at least four illuminant types that are each associated with a chromaticity gamut and an illuminant type hue angle. The processor is configured to determine, based at least in part on a mapping, an output level set that uses a set of hue-adjacent illuminant types. Hue-adjacent illuminant types comprise a group of illuminant types that are determined to be adjacent in a circular ordered list of illuminant types which is circularly ordered according to the illuminant type hue angle.

In various embodiments, light is generated to achieve a selected color through additive color mixing of four or more illuminant types where one or more of the following are targeted: all transitions between colors are accomplished without sudden illuminant changes, the generated metamers are optimized for a selected criterion (e.g., brightness or color rendering, etc.), the metamer precisely matches the desired color, where the required computations are practicable using minimal computational resources, and/or any other appropriate criteria are targeted.

Optimized color generation using multiple illuminant types is disclosed. Color generation is applicable both to luminaires and to display devices capable of providing information. It is convenient to divide color as a property of visual perception into separate qualities of intensity and chromaticity, and further to associate the qualities of hue and saturation with chromaticity. Four or more different illuminant types are determined, each associated with one or more illuminants having emitted light that is optically combined to form an aggregate generated color. Illuminants of each type have a specified aggregate chromaticity and radiant intensity and are controllable as to intensity by means of a drive level that ranges from off (zero, or 0%) to full (1.0, or 100%). The illuminants collectively have a gamut representing every possible chromaticity that can arise from mixing the illuminants in various proportions.

The proportions of each illuminant type necessary to generate a desired color can be determined by computing a mapping in whole or in part, where the mapping associates with each chromaticity in the gamut a drive level set having one drive level for each illuminant type. The mapping can be visualized as a set of three-dimensional surfaces sharing a common xy plane containing every chromaticity in the gamut, where the z-axis value of each surface specifies the drive level necessary for its illuminant type to achieve the chromaticity at each xy chromaticity point. The set of three-dimensional surfaces can be constructed for N illuminant types by first creating a circular order of the illuminant types according to their hue angle, then recording the chromaticity coordinate resulting from the combination of all illuminant types at full intensity, then recording the N chromaticity coordinates resulting from each combination of illuminant types having N−1 illuminant types at full intensity and the remaining illuminant type at zero intensity, then recording the N chromaticity coordinates resulting from each combination of illuminant types having N−2 illuminant types at full intensity with the remaining illuminant types at zero intensity where all full intensity illuminant types are adjacent in the circular order and all zero intensity illuminant types are adjacent in the circular order, and then repeating similarly to this N−2 step iteratively for N−3 etc. until only one of the N illuminant types is at full intensity for each of the N recorded chromaticity coordinates. When each chromaticity coordinate is recorded the corresponding intensity of each illuminant type is likewise recorded with it. The z-axis values of the three-dimensional surfaces can be computed from a desired chromaticity coordinate C in the xy plane by determining the three closest recorded chromaticity coordinates to C that form a triangle enclosing C but not enclosing any other recorded chromaticity coordinate, then using the position of C within the triangle to interpolate the intensity of each illuminant type at the recorded chromaticity coordinates forming the vertices of the triangle using barycentric interpolation or similar means. A desired color can be generated by determining the z-axis value for the three-dimensional surface corresponding to each illuminant type, combining these values into a drive level set, and causing illuminant intensity to change according to the corresponding levels in the drive level set. Intensity can be changed without affecting chromaticity by multiplying all drive levels by a common factor without changing their proportion.

When one or more illuminant types have a chromaticity coordinate within the convex hull formed by the chromaticity coordinates of the other illuminant types then the former are relatively desaturated illuminant types and do not contribute to the collective gamut, though they are capable of adding brightness to a subset of the gamut. When a desaturated illuminant type is present the previously described three dimensional surfaces are constructed such that the desaturated illuminant type does not contribute to N and is not part of the circular order, and the recorded chromaticity coordinates for every combination of illuminant types includes the desaturated illuminant type at full intensity except for the combinations of illuminant types having, excluding the desaturated illuminant type, exactly one or two illuminant types at full intensity in which case the desaturated illuminant type is at zero intensity. Thus illuminant type combinations include the desaturated illuminant type unless this inclusion would reduce the gamut.

Digital commands from an external command source specify desired light source color. Necessary proportions of each illuminant type are calculated such that any changes to desired color are accomplished smoothly. Calculated illuminant proportions for a metamer of a desired color can be optimized for luminous or radiant intensity, CRI (Color Rendering Index), luminous efficacy, lighting efficiency, etc. Spectral adjustments can limit intensity of each illuminant while maintaining constant color, allowing selection of metamers with varying spectral power distribution. A calculated color of illuminant type proportions closely matches a desired color both computationally and visually. The calculation is reversible from illuminant type proportions to desired color with high accuracy. A desired color can be specified as chromaticity coordinates in a color space using any customary standards including without limitation: CIE XYZ (Commission Internationale de l'Éclairage, International Commission on Illumination, CIE 1931 XYZ color space), xyY (x,y-luminance Y), CIE LUV (CIE 1976, L*, u*, v*), CIE LAB (CIE 1976, L*, a*, b*), RGB (Red-Green-Blue), sRGB (Standard RGB), HSV (Hue-Saturation-Value), CMYK (Cyan-Magenta-Yellow-Black), YCbCr (luminance Y-Chroma Blue-Chroma Red), xvYCC (eXtended YCbCr colorimetry for Video applications), device native, etc. A desired color can be derived from a spectral power distribution, a sensor to match existing light or object surface colors, a list of predetermined colors, a color temperature, etc. Color gamut can be mapped to polygonal, round, or other shape. Out of gamut colors can be mapped to illuminant gamut. Desired colors can be desaturated to increase brightness without materially changing apparent color. Desaturated booster illuminants can be used to add brightness to a subset of the gamut without changing color. Illuminants capable of changing color by electronic control can be utilized. A display of color and luminous or radiant flux capabilities of illuminants can provide a visual display of illuminant capabilities. Automatic level adjustment can maintain constant or reduced-variation flux output between color changes. Color accuracy can be maintained through calibration using a feedback sensor measuring illuminant radiometric or photometric or chromatic attributes, or extrapolating illuminant characteristics using time, temperature, or any combination. Color generation status including luminous efficacy of desired color, radiant flux, luminous flux, conformance to gamut, etc. can be reported to command source.

FIG. 1A is a table illustrating an embodiment of eight representative illuminant types. The illuminant types of FIG. 1A are used for the examples/embodiments illustrated in subsequent figures and/or other examples. In various embodiments, any other illuminant types or number of illuminant types are used for the examples/embodiments illustrated in subsequent figures and/or other examples. In the example shown, the values in the table were generated by measuring the emissions of arrays of Philips Lumileds Luxeon®-I LEDs using a StellarNet Model EPP2000C concave grating spectrometer. The measured spectral power distribution for each illuminant type was integrated to determine the radiant intensity, after which each spectral curve was normalized to a unit area of 1.0 and summed through the CIE 1931 2° standard observer color matching functions to yield the tristimulus values X, Y, and Z using the customary formulae:

$$X = \sum_\lambda I(\lambda)\bar{x}(\lambda)$$

$$Y = \sum_\lambda I(\lambda)\bar{y}(\lambda)$$

$$Z = \sum_\lambda I(\lambda)\bar{z}(\lambda)$$

where $I(\lambda)$ is the normalized spectral power at each wavelength and $\bar{x},\bar{y},\bar{z}$ are the CIE color matching functions in tabular form. Chromaticity coordinates are calculated from XYZ tristimulus values using the customary formulae:

$$x = \frac{X}{X+Y+Z}$$

$$y = \frac{Y}{X+Y+Z}$$

Aggregate XYZ tristimulus values for a combination of n illuminants are calculated by adding the normalized tristimulus values XYZ of the constituent illuminant types weighted by their radiant intensity I according to the following formulae:

$$X = \sum_{i=1}^n X_i I_i$$

$$Y = \sum_{i=1}^n Y_i I_i$$

$$Z = \sum_{i=1}^n Z_i I_i$$

Luminous intensity $I_V$ can be calculated from radiant intensity I using the Y tristimulus value calculated previously. For purposes of color mixing intensity values need not be calibrated to standard units since only their relative proportions are important. The lighting art utilizes a plethora of related units depending upon whether the light is being measured upon emission from a source, on reflection from objects, as an angular quantity, weighted by human perception, etc. For purposes of color mixing it is sufficient to characterize illuminants according to radiometric units, which are independent of human perception. For example, illuminant output can be characterized by radiant flux, radiant intensity, or radiance, as long as the measurements are made consistently. The result of color mixing is best described in terms of photometric units such as luminous flux, luminous intensity, or luminance. For clarity, the term "intensity" is used herein to describe optical output as a radiometric quantity, both for purposes of characterizing an illuminant or describing control of its output level. The terms "brightness" and "luminous intensity" are used herein interchangeably to describe optical output as a photometric quantity, weighted by human perception. Consistently substituting related units does not affect disclosed color mixing. In various embodiments, any appropriate units and/or terms are used to describe (e.g., indicate) and/or determine color mixing using multiple illuminant types.

In various embodiments, one or more of the following different instruments and techniques are used to characterize illuminant types: a spectrograph, a spectroscope, a spectrometer, an optical spectrum analyzer, a radiometer, a photometer, and/or any other appropriate instrument of photometry and radiometry. In some embodiments, the illuminant type characterization is derived from manufacturer data sheets. Although this disclosure uses the CIE 1931 color space for consistency in its illustrations and examples, it should be noted that any other methods of predicting color mixtures could be used, including without limitation those with a different color space, observer model, or color matching functions. In some embodiments, the observer model corresponds to the capabilities of cameras or other optical equipment.

FIG. 1B is a graph illustrating an embodiment of illuminant relative intensity. In the example shown, illuminant relative intensity is graphed on vertical axis 150 versus visible wavelengths on horizontal axis 152. Seven non-white illuminant types (e.g., the illuminant types of table 1A) are plotted as red 160, red orange 162, amber 164, green 166, cyan 168, blue 170, and indigo 172. Each illuminant plot is normalized to have a unit area of 1.0 so bandwidth and dominant wavelength can be compared but total intensity cannot.

Figure 2A:
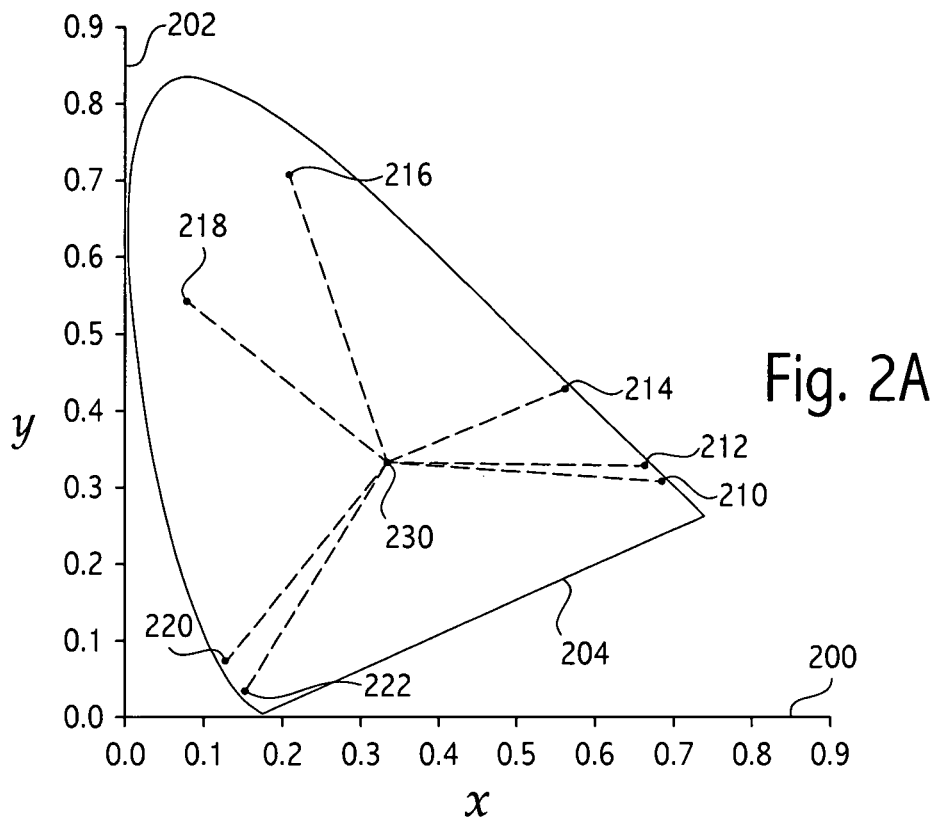
FIG. 2A is a plot illustrating an embodiment of the CIE 1931 xy chromaticity diagram showing illuminant hue angle.

FIG. 2A is a plot illustrating an embodiment of the CIE 1931 xy chromaticity diagram showing illuminant hue angle. In the example shown, the chromaticity diagram has horizontal axis 200 corresponding to x, vertical axis 202 corresponding to y, and human color gamut boundary shown by closed curve 204. Seven non-white illuminant types (e.g., the illuminant types of table 1A) are plotted by chromaticity as red 210, red orange 212, amber 214, green 216, cyan 218, blue 220, and indigo 222. Hue angles for each illuminant are shown using dashed lines radiating from center point 230. Hue angle ordering is circular, so for example red 210 is adjacent to red orange 212 and also adjacent to indigo 222. Although center point 230 is shown at the CIE equal energy point E with coordinates (0.3333, 0.3333), hue angle circular order can be equivalently determined with respect to any point inside the gamut. Illuminant saturation is proportional to its distance from center point 230, with a maximum saturation of 100% for points on boundary 204.

Figure 2B:
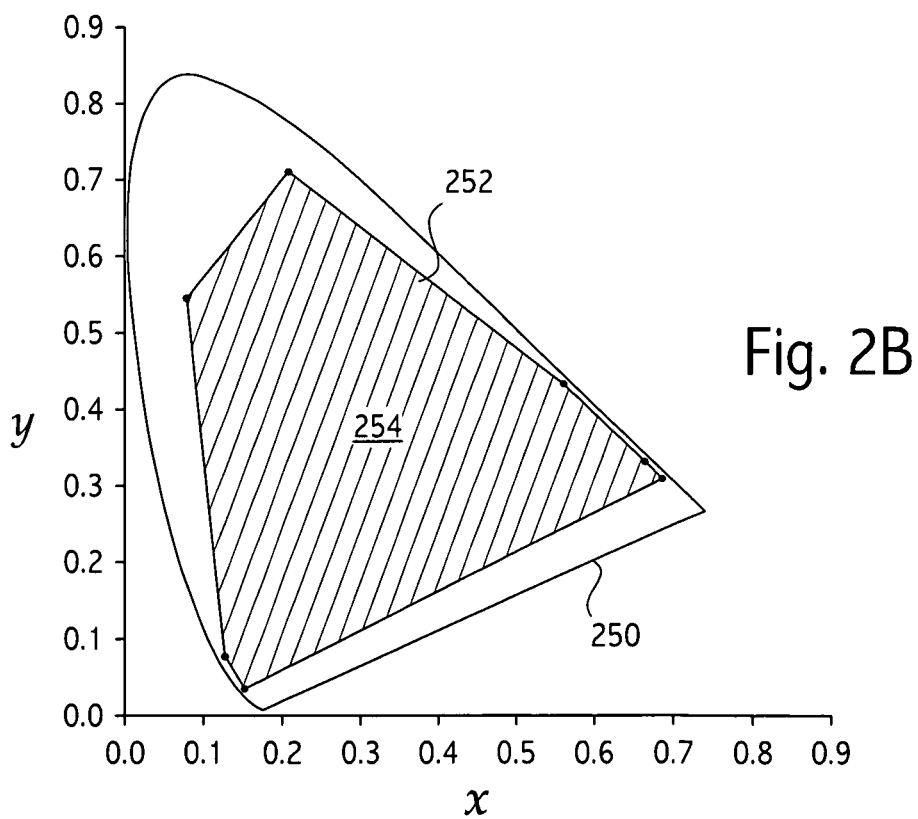
FIG. 2B is a plot illustrating an embodiment of the CIE 1931 xy chromaticity diagram showing an illuminant gamut.

FIG. 2B is a plot illustrating an embodiment of the CIE 1931 xy chromaticity diagram showing an illuminant gamut. In the example shown, the chromaticity diagram has human color gamut boundary shown by closed curve 250. Seven non-white illuminant types (e.g., illuminant types of table 1A) are plotted by chromaticity as vertices of convex polygon 252 illustrating the gamut of the illuminants with the achievable additive mixing range shown by hatched area 254.

Figure 3:
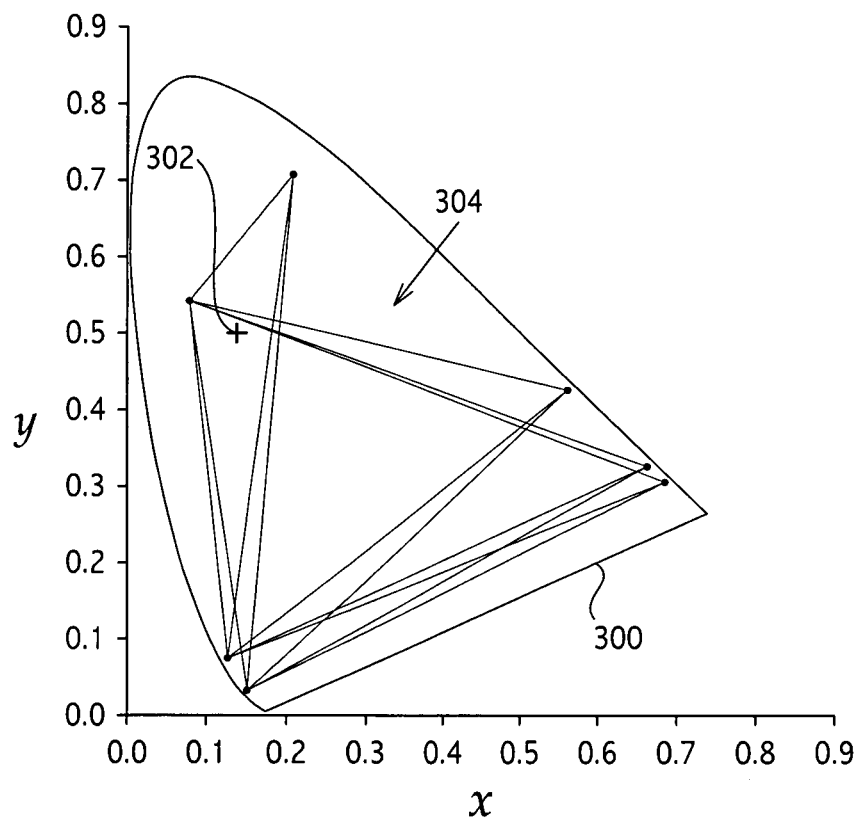
FIG. 3 is a plot illustrating an embodiment of the CIE 1931 xy chromaticity diagram showing triangular decomposition.

FIG. 3 is a plot illustrating an embodiment of the CIE 1931 xy chromaticity diagram showing triangular decomposition. In the example shown, the chromaticity diagram has human color gamut boundary shown by closed curve 300. Seven non-white illuminant types (e.g., illuminant types of table 1A) are plotted by chromaticity as black dots. Point 302 is an example chromaticity within the illuminant gamut. Triangles 304 illustrate all possible combinations of three illuminants with chromaticity coordinates enclosing point 302 and thus capable of mixing to generate that chromaticity. Methods for calculating the necessary proportions of three illuminants to generate a desired color are well known. While only one combination of three illuminants is sufficient to generate the chromaticity of point 302, this three illuminant combination is not as bright as using more of the available illuminants. A prior art method, referred to herein as triangular decomposition, makes use of more illuminants by forming a list of enclosing triangles such as those of 304, each of which enforces a proportion among its three illuminants. The proportions for all triangles are summed and normalized so that the brightest illuminant is at full intensity. The proportions thus computed are virtually never the brightest however, so a weighting needs to be applied to each component triangle with optimal values for this weighting vector being determined using linear programming or similar techniques. The large search space and presence of numerous local minima and maxima make determining the optimal weighting vector a challenging computational task. It is not certain that a weighting vector exists that generates the optimal combination of illuminants. Also, even extremely small changes in chromaticity can cross over a triangle boundary. This causes the list of enclosing triangles to change along with the computed illuminant proportions, usually resulting in a visual artifact out of proportion with the small chromaticity change.

Figure 4A:
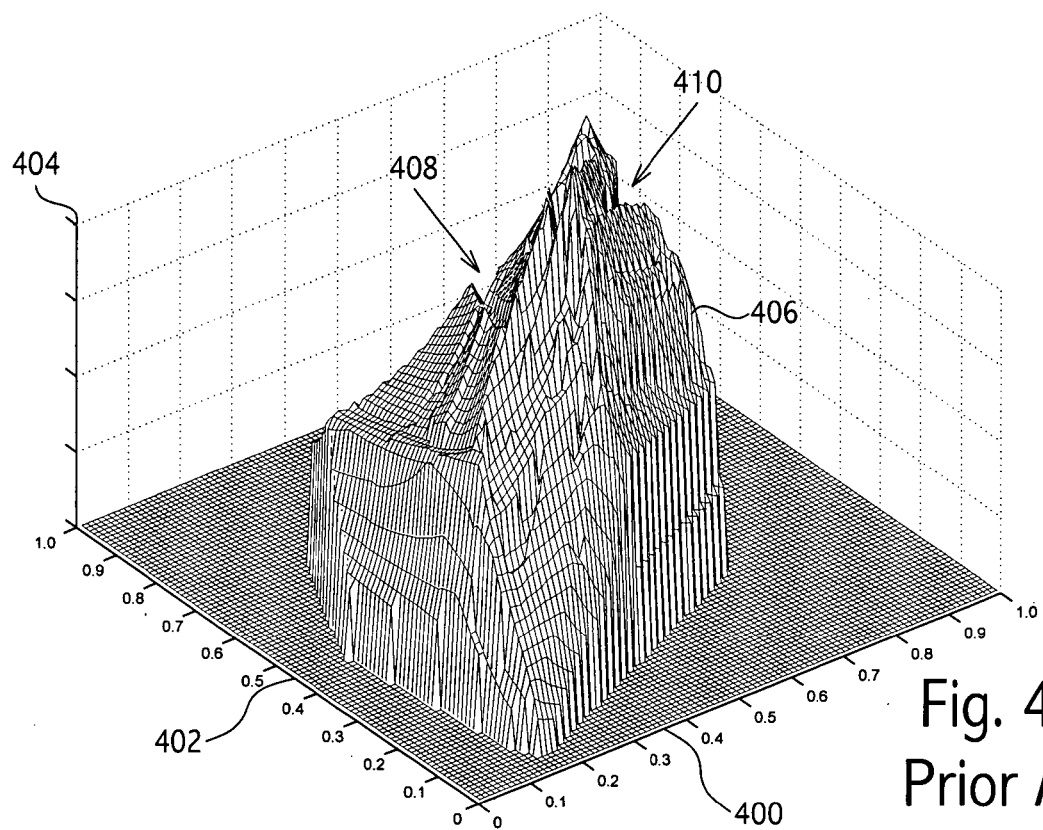
FIG. 4A is a plot of color mixing by triangular decomposition illustrating an embodiment of a calculated total illuminant brightness.

FIG. 4A is a plot of color mixing by triangular decomposition illustrating an embodiment of a calculated total illuminant brightness. In the example shown, the total illuminant brightness is displayed as a surface along vertical axis 404 as a function of chromaticity on horizontal plane described by x-axis 400 and y-axis 402. Three-dimensional surface 406 was computed at chromaticity coordinates on a rectangular grid at 0.01 intervals. Surface discontinuities 408 and 410 illustrate some of the shortcomings of this technique. Color changes in the neighborhood of these discontinuities result in visual artifacts.

Figure 4B:
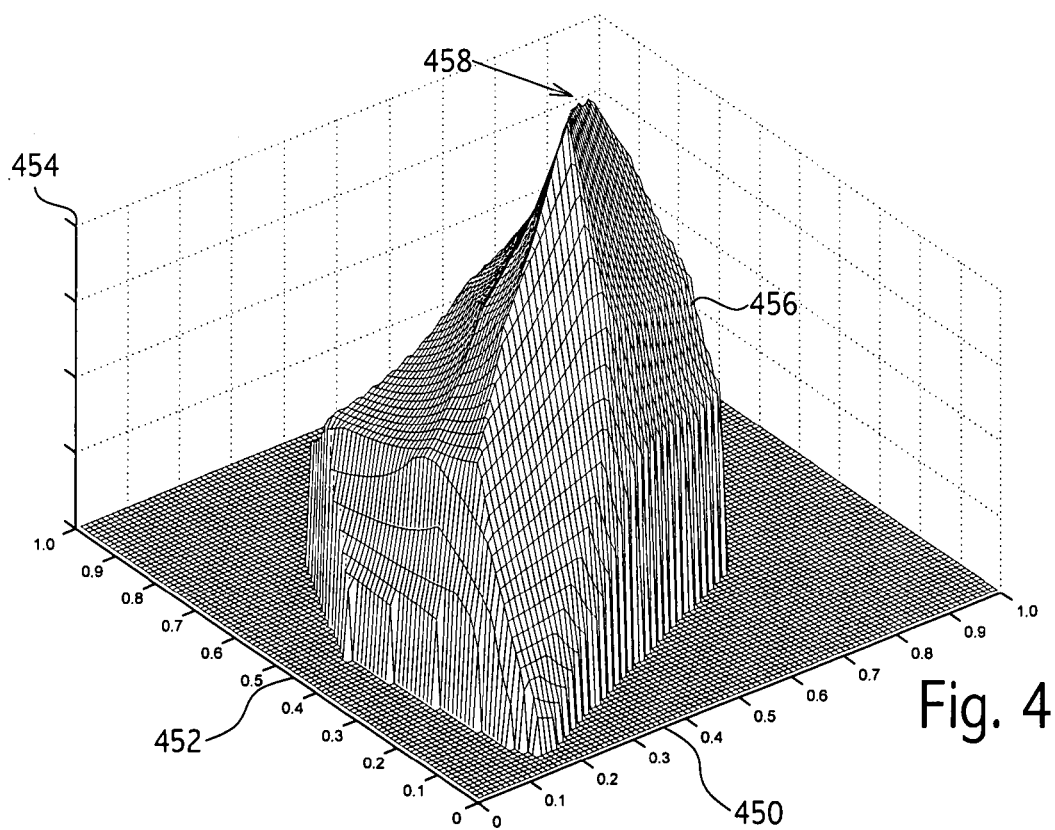
FIG. 4B is a plot illustrating an embodiment of color mixing.

FIG. 4B is a plot illustrating an embodiment of color mixing. In the example shown, a calculated total illuminant brightness is displayed as a surface along vertical axis 454 as a function of chromaticity on horizontal plane described by x-axis 450 and y-axis 452. Three-dimensional surface 456 was computed at chromaticity coordinates on a rectangular grid at 0.01 intervals. Examination of the data reveals that the surface in the vicinity of 458 is a gentle concavity, where the apparent discontinuity is an artifact of the 3D projection of the plot. The shape of surface 456 demonstrates that maximum attainable brightness of generated color varies over a large range according to chromaticity, with lowest brightness at the gamut perimeter and highest at a peak generally towards the center depending upon available illuminant types. Because every set of illuminants has an associated optimal brightness for each chromaticity similar to surface 456, when separate intensity control of each illuminant type is available, it is possible to determine whether a particular color generation method is employed in a device. For example, this is achieved by using a spectrometer or similar instrument to measure a chromaticity and intensity of each illuminant type separately.

The measurement information is then used to construct an optimal surface similar to 456. For every color generated, a comparison of the actual illuminant mixture brightness is made to the optimal surface. If the deviation is minimal then the disclosed methods are employed. In some cases the device may be "detuned" to obscure its processes, but after generating many colors a device-specific surface will emerge that is useful for comparison with the optimal surface.

Figure 5:
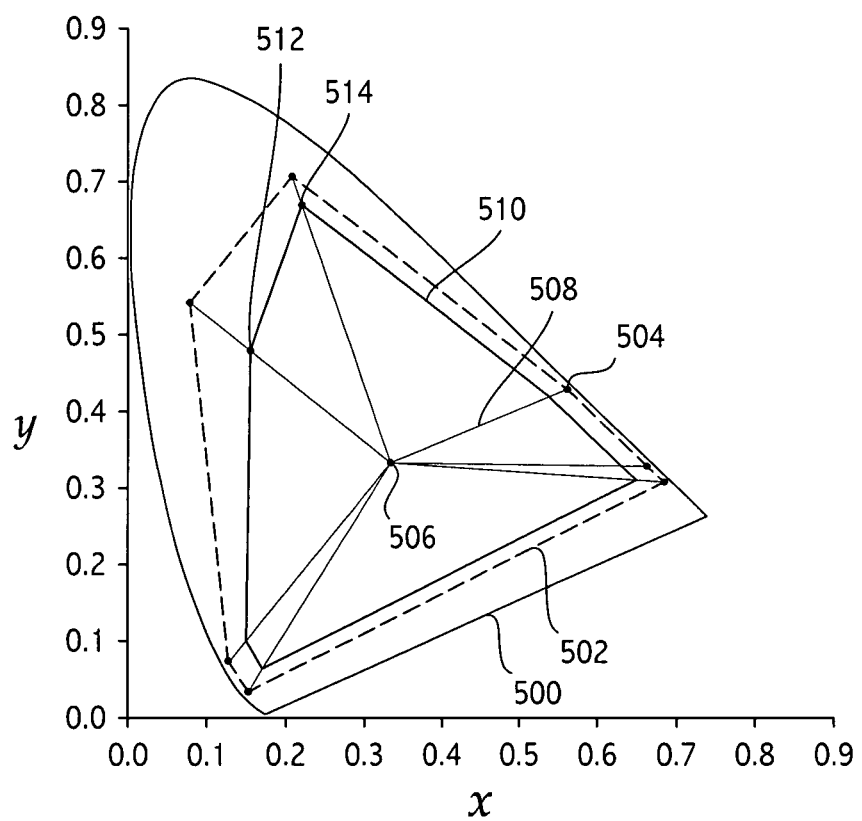
FIG. 5 is a plot illustrating an embodiment of the CIE 1931 xy chromaticity diagram showing a restricted gamut.

FIG. 5 is a plot illustrating an embodiment of the CIE 1931 xy chromaticity diagram showing a restricted gamut. In the example shown, various methods for improving brightness and color consistency are depicted. The chromaticity diagram has human color gamut boundary shown by closed curve 500. Seven non-white illuminant types (e.g., illuminant types of table 1A) are plotted by chromaticity as vertices of dashed convex polygon 502 illustrating a gamut of the illuminants. Representative amber illuminant 504 is connected by line 508 to white point 506, showing the approximate line of desaturation, where a point on line 508 at 504 is maximally saturated and a point on line 508 at 506 is minimally saturated. Because human color perception is generally less sensitive to saturation than to hue or brightness, it is sometimes useful to trade reduced saturation for the benefit of increased brightness, thus creating a reduced gamut. Convex polygon 510 is drawn with vertices corresponding to each illuminant type being approximately 90% saturated. As can be seen in FIG. 4B, the steepness of the surface ensures a reduced gamut results in greater minimum brightness. Additionally, the peak of FIG. 4B can be clipped to a maximum brightness by scaling the intensity of all illuminant types proportionally when total brightness exceeds a predetermined limit. A combination of desaturation and brightness limitation provide a substantially more constant brightness among color changes.

In some embodiments, desaturation for brightness control is non-uniform among hues, allowing varying degrees of saturation, so that brighter illuminant types provide more saturation of their associated hues. For example, polygon 510 has vertex 512, which is saturated approximately 70% instead of vertex 514, which is saturated at approximately 90%. In some embodiments, white point 506 is operator selectable to permit control over the reference point for desaturation percentages. For example, a white point may be chosen by a visual designer to correspond to a particular color temperature, such as the color temperature of existing incandescent luminaires. In some embodiments, a closed curve of constant brightness for the surface of FIG. 4B is used to project a reduced gamut. In some embodiments, brightness control parameters (e.g. degree of saturation, white point, etc.) are adjustable, chosen variously by a control panel, switch, received command, stored configuration option, configuration UI, etc. where the degree can range from no gamut reduction to effectively a single color. In some embodiments, an indication is sent to a command source when desired chromaticity exceeds the gamut. In some embodiments, brightness limitation is accomplished by reducing intensity by a percentage proportional to the maximum brightness for each chromaticity, such that brighter colors are more reduced. In some embodiments, brightness limitation is inversely proportional to radial distance from the peak brightness chromaticity of FIG. 4B, such that brightness at the peak is reduced by a larger percentage than brightness at the perimeter. In some embodiments a smooth brightness control surface is constructed, which has at every chromaticity a brightness no greater than the maximum brightness surface of FIG. 4B; the control surface is used to control maximum brightness at each chromaticity.

Because intensity and chromaticity characteristics of many real-world illuminants change with time, temperature, and usage patterns, and also vary among different manufacturer lots, the gamut of the illuminants can likewise change with time and differ among devices intended to be identical. It is therefore useful for some applications to restrict the gamut to provide accommodation for differences and thus obtain increased color consistency. Based upon an estimation of likely future drift, the gamut can be artificially restricted such that an illuminant is not called upon to operate solely as a single type. Desired colors are desaturated to meet this restricted gamut. When an illuminant is stronger or more saturated (e.g. having a narrower bandwidth) than expected then the gamut boundary is achievable by mixing the illuminant with other types. When an illuminant is weaker or less saturated than expected then less of the other illuminant types is required. Ideally the restricted gamut is so chosen that if the attainable gamut contracts into the restricted gamut, the device has already seen enough service to be considered replaceable.

In some embodiments, the restricted gamut enabling color consistency is standardized for a luminaire product line. In some embodiments, the restricted gamut is standardized for a luminaire model. In some embodiments, the restricted gamut can be reported to a command source. In some embodiments, the restricted gamut conforms to an industry standard. In some embodiments, the restricted gamut can be disabled or adjusted, chosen variously by a control panel, switch, received command, stored configuration option, configuration UI, etc.

It is common practice when operating color-changing luminaires with four or more illuminant types to assign one lever of a lighting control panel to each illuminant type whereby each lever adjusts its illuminant drive level in a range from zero to full intensity. This control layout allows any possible color or metamer to be generated but provides a challenge to human operators because the relationship between control positions and resulting colors is anything but intuitive. For seven illuminant types the seven control levers effectively form a seven-dimensional hypercube, the proper navigation of which is necessary to reach a desired color. This disclosure introduces the general principle that the brightest metamers are composed of illuminant types having adjacent hue angles, and therefore not every degree of freedom in the seven-dimensional hypercube is required. Further, at least one illuminant type should be at full intensity when the brightest metamer is desired. Therefore selection is restricted to the much simpler set of metamers where illuminant type combinations comprise those adjacent in the hue angle order, and at least one illuminant type is at full intensity. When less than maximum intensity is required then all illuminant type drive levels can be scaled proportionally without affecting the chromaticity. Examples of this simplified control for N illuminant types from two through seven are described, though any larger number of illuminant types can be accommodated by appropriate application of this method.

Figure 6:
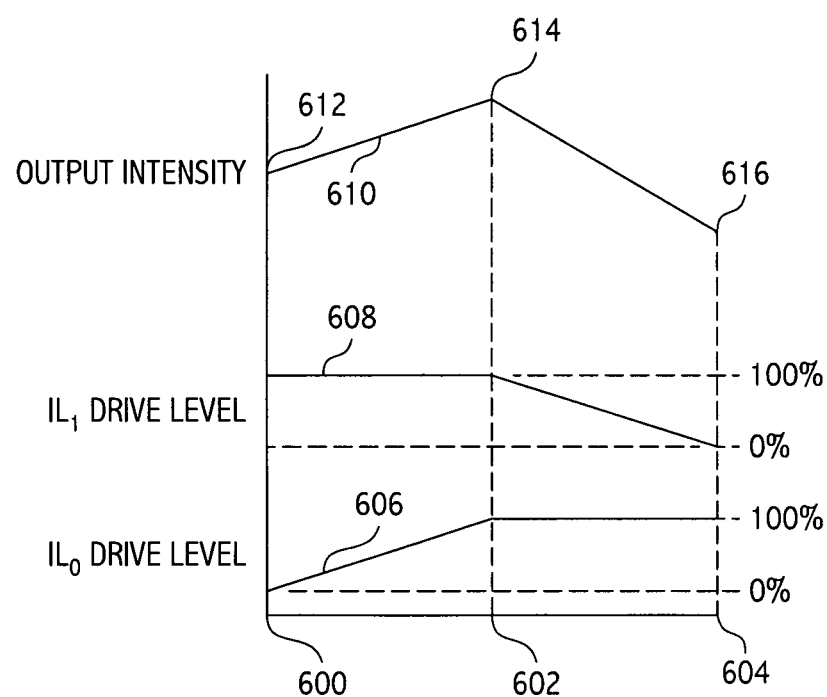
FIG. 6 is a graph illustrating an embodiment of a method of obtaining all possible proportions of two arbitrary illuminant types.

FIG. 6 is a graph illustrating an embodiment of a method of obtaining all possible proportions of two arbitrary illuminant types. In the example shown, all proportions of illuminant $IL_0$ and illuminant $IL_1$ are shown in traversing the horizontal axis from position 600 to position 604. Beginning at position 600, $IL_0$ drive level 606 is zero and increasing while $IL_1$ drive level 608 is full and constant. Moving horizontally from position 600 to midpoint position 602, $IL_0$ drive level 606 rises to full while $IL_1$ drive level 608 remains full. Continuing horizontally from midpoint position 602 to final position 604, $IL_0$ drive level 606 remains full while $IL_1$ drive level 608 drops to zero. The output intensity resulting from these combinations of $IL_1$ and $IL_1$ is shown by curve 610, which starts with intensity 612 at position 600 equivalent to the full $IL_1$ intensity since $IL_0$ is zero there, then rises to peak intensity 614 at position 602 equivalent to the sum of the full $IL_0$ and $IL_1$ intensities, then falls to level 616 at position 604 equivalent to the full $IL_0$ intensity since $IL_1$ is zero there.

Each point between positions 600 and 604 corresponds to one possible proportion of the two illuminants, and every proportion of illuminants corresponds to one point between positions 600 and 604. A desired color is specified by selecting a point between positions 600 and 604 determining corresponding output levels for $IL_0$ and $IL_1$. Because drive level curves 606 and 608 are mathematically continuous, output intensity 610 is also mathematically continuous and therefore changes to the desired color do not generate visual artifacts. Output intensity can be adjusted without affecting chromaticity by scaling both illuminant type drive levels together without changing their relative proportions.

FIG. 7A is a diagram illustrating an embodiment of a method of obtaining all possible proportions of three arbitrary illuminant types $IL_0$, $IL_1$, and $IL_2$. In the example shown, a two-dimensional color-space-independent triangular control surface is depicted. Triangle 700 encloses all possible illuminant type proportions where at least one illuminant type has full intensity, thus having rank 1. Similarly, triangle 702 encloses the portion of triangle 700 where at least two illuminant types have full intensity, thus having rank 2. Each vertex corresponds to a combination of illuminants. Vertex 711 corresponds to illuminant $IL_0$ at full, vertex 712 corresponds to illuminant $IL_1$ at full, and vertex 713 corresponds to illuminant $IL_2$ at full. For triangle 702, vertex 714 corresponds to having both $IL_0$ and $IL_1$ at full, vertex 715 corresponds to having both $IL_1$ and $IL_2$ at full, and vertex 716 corresponds to having both $IL_0$ and $IL_2$ at full. Point 717 corresponds to having all three illuminants at full, thus having rank 3. Each vertex comprises the illuminant types of its neighbors having fewer illuminant types. For example vertex 714 corresponds to the illuminants of the neighboring vertices 711 and 712.

Each point enclosed by triangle 700 corresponds to one possible proportion of the three illuminants, and every proportion of illuminants corresponds to one point enclosed by triangle 700. To calculate the illuminant proportions corresponding to a desired point, the drive levels associated with neighboring vertices is interpolated to according to the position of the desired point. There are numerous well-known techniques for performing this tessellation and interpolation. In some embodiments, Delaunay triangulation is used. In some embodiments, barycentric interpolation is used. In some embodiments, Lagrange polynomial interpolation is used. Because vertices correspond to illuminant drive level extrema, interpolation is mathematically continuous, avoiding visual artifacts from desired color changes. Output intensity is able to be adjusted without affecting chromaticity by scaling all illuminant type drive levels together without changing their relative proportions.

The layout of the triangles and the coordinates of their vertices are not critical. In some embodiments, the origin of the plane corresponds to the center of triangle 700. In some embodiments, all coordinates are represented by positive numbers. In some embodiments, coordinates are skewed to match a predetermined color space. In some embodiments, coordinates are skewed to match illuminant type characteristics. In some embodiments, coordinates are skewed to match external command source characteristics.

FIG. 7B is a diagram illustrating an embodiment of one possible tessellation of the two-dimensional triangular control surface. Hatched triangle 740 is a representative tessellation element, and illuminant drive levels associated with vertices 711, 716, and 717 participate in the interpolation for any point in triangle 740. In this example, $IL_0$ drive level is full for all three vertices so its interpolated value remains trivially at full. $IL_1$ drive level is full only for vertex 717, so the drive level will vary for points in triangle 740 from zero at the line connecting vertices 711 and 716, to full at vertex 717. $IL_2$ drive level is zero only at vertex 711, so it will likewise vary in triangle 740 up to full at the line that connects vertices 716 and 717.

FIG. 7C is a table illustrating an embodiment of detailed information for each vertex in FIGS. 7A and 7B. In the example shown, the rank is the number of illuminant types associated with each vertex. The three Drive columns identify which illuminant types are associated with each vertex. And, the Bitmap column describes a numerical value useful for encoding the information of the other columns for computational purposes.

Figure 8A:
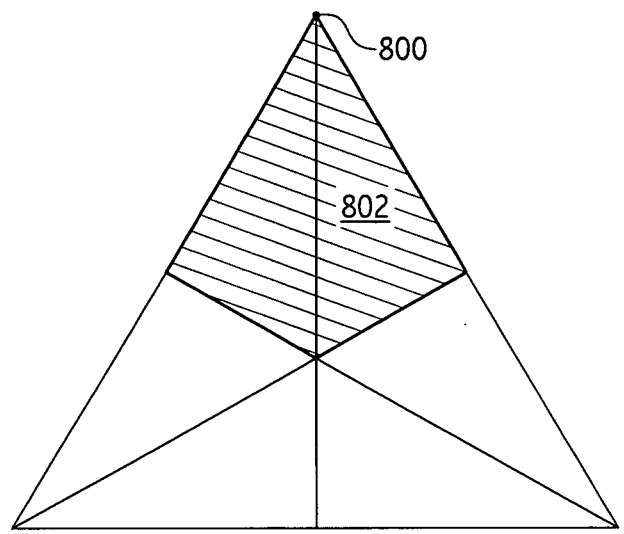
FIG. 8A is a diagram illustrating an embodiment plotting a portion of a two-dimensional triangular control surface.

FIG. 8A is a diagram illustrating an embodiment plotting a portion of a two-dimensional triangular control surface. In the example shown, the two dimensional triangular control surface corresponds to the triangle of FIG. 7A, where the illuminant type associated with vertex 800 has a drive level at full within hatched area 802. It can readily be seen that this portion represents ⅓ of the control surface area, and thus one illuminant is always at full anywhere in the control surface.

Figure 8B:
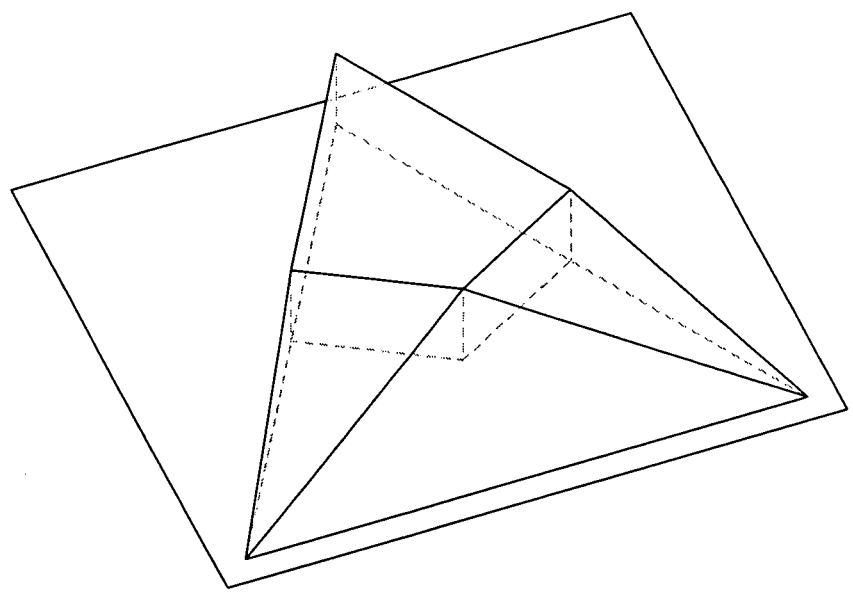
FIG. 8B is a diagram illustrating an embodiment plotting the drive level of the illuminant type associated with vertex 800 in the two-dimensional triangular control surface of FIG. 7A, in perspective as a vertical dimension above the horizontal plane.

FIG. 8B is a diagram illustrating an embodiment plotting the drive level of the illuminant type associated with vertex 800 in the two-dimensional triangular control surface of FIG. 7A, in perspective as a vertical dimension above the horizontal plane. In the example shown, full drive level portion 802 of FIG. 8A is seen in perspective as the highest area in the plot. For clarity only one surface is shown, but there would actually be one for each illuminant type. In some embodiments, the slope down from the highest area of the plot is linear as shown. In some embodiments, the slope down from the highest area of the plot is curved to provide additional control resolution at low illuminant drive levels, where small drive level changes have greater effect on aggregate chromaticity than at high illuminant drive levels. In some embodiments, the curved slope is proportional to $d^n$ where d is the depicted linear drive level and n is greater than one.

FIG. 9A is a diagram illustrating an embodiment of a method of obtaining all possible proportions of four arbitrary illuminant types $IL_0$, $IL_1$, $IL_2$, and $IL_3$ that are required for color mixing. In the example shown, a two-dimensional color-space-independent rectangular control surface is depicted. Rectangle 900 encloses all illuminant type proportions where at least one illuminant type has full intensity, thus having rank 1. Similarly, rectangle 902 encloses the portion of rectangle 900 where at least two illuminant types have full intensity, thus having rank 2. Rectangle 904 encloses the portion of rectangle 902 where at least three illuminant types have full intensity, thus having rank 3. Each vertex corresponds to a combination of illuminants. Vertex 911 corresponds to illuminant $IL_0$ at full, vertex 912 corresponds to illuminant $IL_1$ at full, vertex 913 corresponds to illuminant $IL_2$ at full, and vertex 914 corresponds to illuminant $IL_3$ at full. For rectangle 902, vertex 915 corresponds to having both $IL_0$ and $IL_1$ at full, vertex 916 corresponds to having both $IL_1$ and $IL_2$ at full, etc. For rectangle 904, vertex 919 corresponds to having $IL_0$, $IL_1$, and $IL_2$ at full; vertex 920 corresponds to having $IL_1$, $IL_2$, and $IL_3$ at full; etc. Point 923 corresponds to having all four illuminants at full, thus having rank 4. Each vertex comprises the illuminant types of its neighbors having fewer illuminant types. For example vertex 915 corresponds to the illuminants of the neighboring vertices 911 and 912.

Each point enclosed by rectangle 900 corresponds to one possible proportion of the four illuminants, and every proportion of adjacent illuminants corresponds to one point enclosed by rectangle 900. To calculate the illuminant proportions corresponding to a desired point, the drive levels associated with neighboring vertices can be interpolated to according to the position of the desired point. There are numerous well-known techniques for performing this tessellation and interpolation. In some embodiments, Delaunay triangulation is used. In some embodiments, barycentric interpolation is used. In some embodiments, Lagrange polynomial interpolation is used. Because vertices correspond to illuminant drive level extrema, interpolation can be made mathematically continuous, avoiding visual artifacts from desired color changes. Optimized brightness is attained by restricting illuminant type combinations to adjacent illuminant types in hue angle order. Output intensity is able to be adjusted without affecting chromaticity by scaling all illuminant type drive levels together without changing their relative proportions.

The layout of the rectangles and the coordinates of their vertices are not critical. In some embodiments, the origin of the plane corresponds to the center of rectangle 900. In some embodiments, all coordinates are represented by positive numbers. In some embodiments, coordinates are skewed to match a predetermined color space. In some embodiments, coordinates are skewed to match illuminant type characteristics. In some embodiments, coordinates are skewed to match external command source characteristics.

FIG. 9B is a diagram illustrating an embodiment of one possible tessellation of the two-dimensional rectangular control surface. In the example shown, hatched triangle 940 is a representative tessellation element, and illuminant drive levels associated with vertices 911, 918, and 922 will participate in the interpolation for any point in triangle 940. In this example $IL_0$ drive level is full only for vertex 911, so the drive level varies linearly from zero at the line joining vertices 918 and 922, to full at vertex 911. $IL_1$ drive level is full only for vertex 922, so the drive level varies linearly for points in triangle 940 from zero at the line connecting vertices 911 and 918, to full at vertex 922. $L_2$ drive level is zero for all three vertices so its interpolated value remains trivially zero. $IL_3$ drive level is zero only at vertex 911, so it likewise varies linearly in triangle 940 up to full at the line that connects vertices 918 and 922.

FIG. 9C is a table illustrating an embodiment of detailed information for each vertex in FIGS. 9A and 9B. In the example shown, rank is the number of illuminant types associated with each vertex; the four Drive columns identify which illuminant types are associated with each vertex; and Bitmap describes a numerical value useful for encoding the information of the other columns for computational purposes.

Figure 10A:
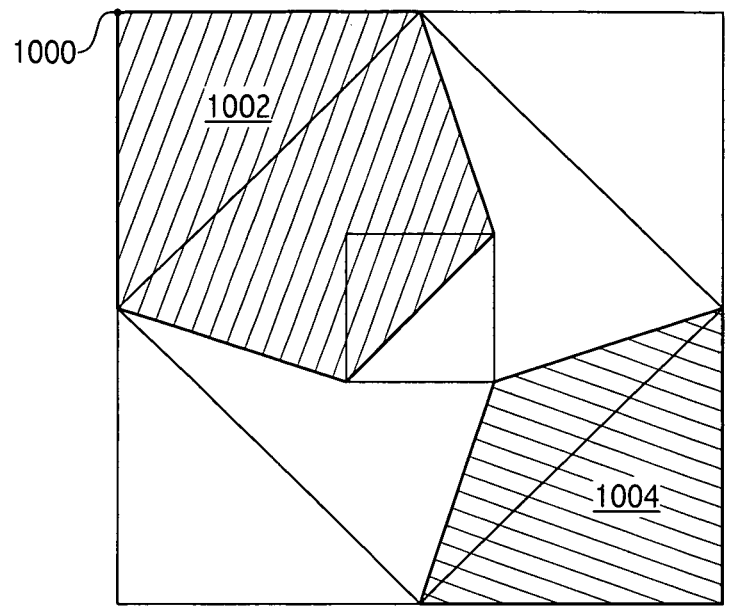
FIG. 10A is a diagram illustrating an embodiment plotting a portion of the two-dimensional rectangular control surface of FIG. 9A.

FIG. 10A is a diagram illustrating an embodiment plotting a portion of the two-dimensional rectangular control surface of FIG. 9A. In the example shown, the illuminant type associated with vertex 1000 has a drive level at full in hatched area 1002, and at zero in hatched area 1004. A rotation of hatched area 1002 for each of the four illuminants will cover the entire rectangular control surface, and thus at least one illuminant is always at full anywhere in the control surface.

Figure 10B:
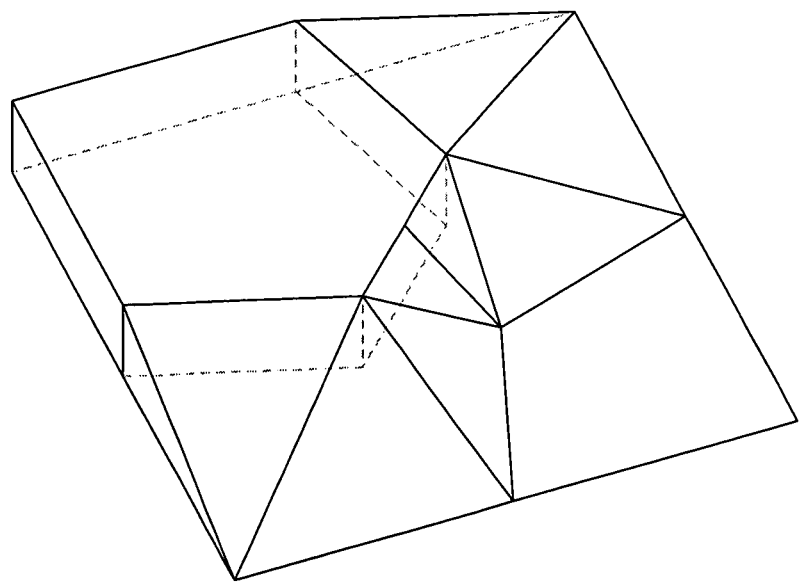
FIG. 10B is a diagram illustrating an embodiment plotting the drive level of the illuminant type associated with vertex 1000 in the two-dimensional rectangular control surface of FIG. 9A, in perspective as a vertical dimension above the horizontal plane.

FIG. 10B is a diagram illustrating an embodiment plotting the drive level of the illuminant type associated with vertex 1000 in the two-dimensional rectangular control surface of FIG. 9A, in perspective as a vertical dimension above the horizontal plane. In the example shown, full drive level portion 1002 and zero drive level portion 1004 of FIG. 10A are seen in perspective as the highest and lowest areas of the plot, respectively. For clarity only one surface is shown, but there would actually be one for each illuminant type. In some embodiments, the slope down from the highest area of the plot is linear as shown. In some embodiments, the slope down from the highest area of the plot is curved to provide additional control resolution at low illuminant drive levels, where small drive level changes have greater effect on aggregate chromaticity than at high illuminant drive levels. In some embodiments, the curved slope is proportional to $d^n$ where d is the depicted linear drive level and n is greater than one.

Figure 11A:
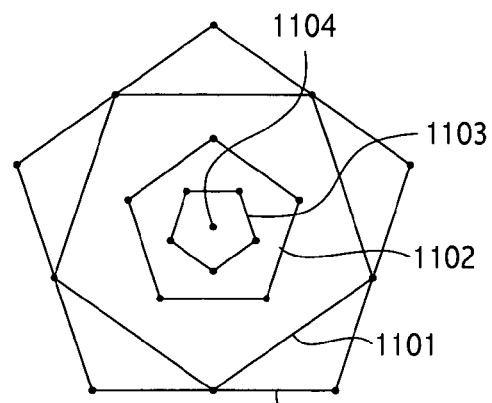
FIG. 11A is a diagram illustrating an embodiment of a two-dimensional color-space-independent pentagonal control surface useful for obtaining all possible proportions of five arbitrary illuminant types that are required for color mixing.

FIG. 11A is a diagram illustrating an embodiment of a two-dimensional color-space-independent pentagonal control surface useful for obtaining all possible proportions of five arbitrary illuminant types that are required for color mixing. In the example shown, two-dimensional pentagonal control surface 1100 encloses all illuminant type proportions where at least one illuminant type has full intensity, thus having rank 1. Pentagon 1101 encloses the portion of pentagon 1100 where at least two illuminant types have full intensity, thus having rank 2. Pentagon 1102 encloses the portion of pentagon 1101 where at least three illuminant types have full intensity, thus having rank 3. Pentagon 1103 encloses the portion of pentagon 1102 where at least four illuminant types have full intensity, thus having rank 4. Point 1104 corresponds to having all five illuminants at full intensity, thus having rank 5. Vertices of each nested pentagon are shown as black dots corresponding to a combination of illuminants. Each vertex comprises the illuminant types of its neighbors having fewer illuminant types.

Each point enclosed by pentagon 1100 corresponds to one possible proportion of the five illuminants, and every proportion of adjacent illuminants corresponds to one point enclosed by pentagon 1100. To calculate the illuminant proportions corresponding to a desired point, the drive levels associated with neighboring vertices are interpolated to according to the position of the desired point. There are numerous well-known techniques for performing this tessellation and interpolation. In some embodiments, Delaunay triangulation is used. In some embodiments, barycentric interpolation is used. In some embodiments, Lagrange polynomial interpolation is used. Because vertices correspond to illuminant drive level extrema, interpolation is made mathematically continuous, avoiding visual artifacts from desired color changes. Optimized brightness is attained by restricting illuminant type combinations to adjacent illuminant types in hue angle order. Output intensity is able to be adjusted without affecting chromaticity by scaling all illuminant type drive levels together without changing their relative proportions.

The layout of the pentagons and the coordinates of their vertices are not critical. In some embodiments, the origin of the plane corresponds to the center of pentagon 1100. In some embodiments all coordinates are represented by positive numbers. In some embodiments, coordinates are skewed to match a predetermined color space. In some embodiments, coordinates are skewed to match illuminant type characteristics. In some embodiments, coordinates are skewed to match external command source characteristics.

Figure 11B:
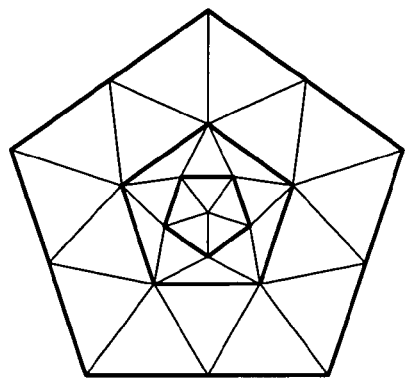
FIG. 11B is a diagram illustrating an embodiment of one possible tessellation of the two-dimensional pentagonal control surface.

FIG. 11B is a diagram illustrating an embodiment of one possible tessellation of the two-dimensional pentagonal control surface. In some embodiments, the vertices forming the triangles are identical to the vertices of FIG. 11A.

Figure 11C:
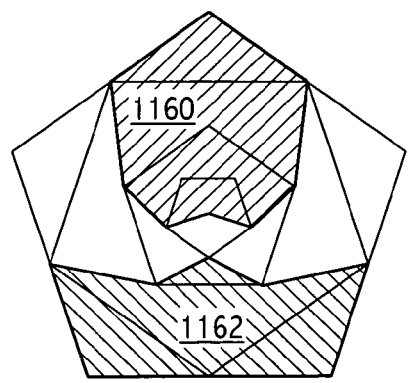
FIG. 11C is a diagram illustrating an embodiment plotting a portion of the two-dimensional pentagonal control surface of FIG. 11A.

FIG. 11C is a diagram illustrating an embodiment plotting a portion of the two-dimensional pentagonal control surface of FIG. 11A. In the example shown, an illuminant type has a drive level at full in hatched area 1160, and at zero in hatched area 1162. A rotation of hatched area 1160 for each of the five illuminants covers the entire pentagonal control surface, and thus at least one illuminant is always at full anywhere in the control surface.

Figure 11D:
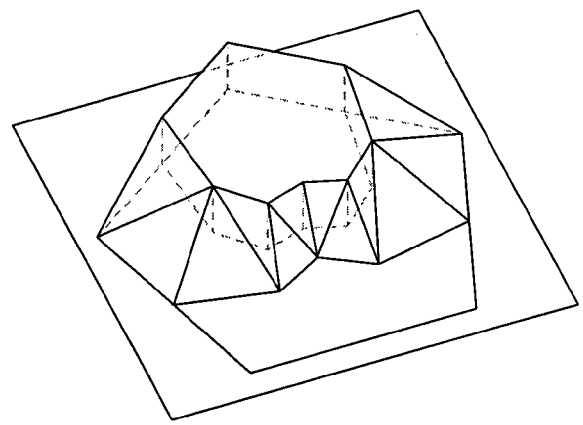
FIG. 11D is a diagram illustrating an embodiment plotting the drive level of one illuminant type in the two-dimensional pentagonal control surface of FIG. 11A, in perspective as a vertical dimension above the horizontal plane.

FIG. 11D is a diagram illustrating an embodiment plotting the drive level of one illuminant type in the two-dimensional pentagonal control surface of FIG. 11A, in perspective as a vertical dimension above the horizontal plane. In the example shown, full drive level portion 1160 and zero drive level portion 1162 of FIG. 11C are seen in perspective as the highest and lowest areas of the plot, respectively. For clarity only one surface is shown, but there is actually one for each illuminant type. In some embodiments, the slope down from the highest area of the plot is linear as shown. In some embodiments, the slope down from the highest area of the plot is curved to provide additional control resolution at low illuminant drive levels, where small drive level changes have greater effect on aggregate chromaticity than at high illuminant drive levels. In some embodiments, the curved slope is proportional to $d^n$ where d is the depicted linear drive level and n is greater than one.

Figure 12A:
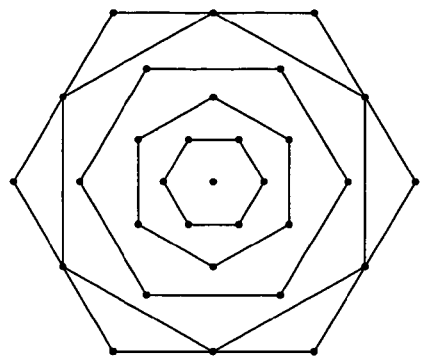
FIG. 12A is a diagram illustrating an embodiment of a two-dimensional color-space-independent hexagonal control surface useful for obtaining all possible proportions of six arbitrary illuminant types that are required for color mixing.

FIG. 12A is a diagram illustrating an embodiment of a two-dimensional color-space-independent hexagonal control surface useful for obtaining all possible proportions of six arbitrary illuminant types that are required for color mixing. In the example shown, nested polygons are associated with increasing numbers of illuminant types from perimeter rank 1 to center rank 6. Vertices of each nested pentagon are shown as black dots corresponding to a combination of illuminants. Each vertex comprises the illuminant types of its neighbors having fewer illuminant types.

Each point in the hexagon corresponds to one possible proportion of the six illuminants, and every proportion of adjacent illuminants corresponds to one point in the hexagon. To calculate the illuminant proportions corresponding to a desired point, the drive levels associated with neighboring vertices are interpolated to according to the position of the desired point. There are numerous well-known techniques for performing this tessellation and interpolation. In some embodiments, Delaunay triangulation is used. In some embodiments, barycentric interpolation is used. In some embodiments, Lagrange polynomial interpolation is used. Because vertices correspond to illuminant drive level extrema, interpolation is made mathematically continuous, avoiding visual artifacts from desired color changes. Optimized brightness is attained by restricting illuminant type combinations to adjacent illuminant types in hue angle order. Output intensity is able to be adjusted without affecting chromaticity by scaling all illuminant type drive levels together without changing their relative proportions.

The layout of the hexagons and the coordinates of their vertices are not critical. In some embodiments, the origin of the plane corresponds to the center of figure. In some embodiments, all coordinates are represented by positive numbers. In some embodiments, coordinates are skewed to match a predetermined color space. In some embodiments, coordinates are skewed to match illuminant type characteristics. In some embodiments, coordinates are skewed to match external command source characteristics.

Figure 12B:
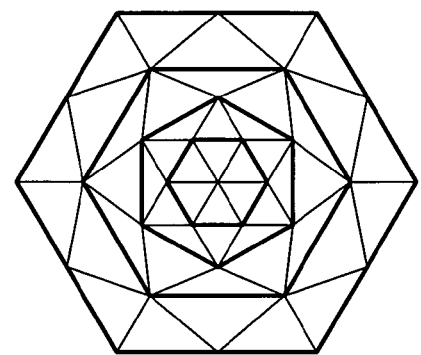
FIG. 12B is a diagram illustrating an embodiment of one possible tessellation of the two-dimensional hexagonal control surface.

FIG. 12B is a diagram illustrating an embodiment of one possible tessellation of the two-dimensional hexagonal control surface. In some embodiments, the vertices forming the triangles are identical to the vertices of FIG. 12A.

Figure 12C:
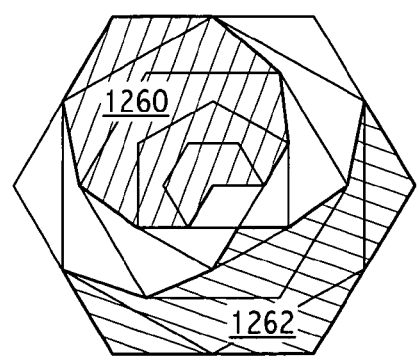
FIG. 12C is a diagram illustrating an embodiment plotting a portion of the two-dimensional hexagonal control surface of FIG. 12A.

FIG. 12C is a diagram illustrating an embodiment plotting a portion of the two-dimensional hexagonal control surface of FIG. 12A. In the example shown, an illuminant type has a drive level at full in hatched area 1260 and at zero in hatched area 1262. A rotation of hatched area 1260 for each of the six illuminants covers the entire hexagonal control surface, and thus at least one illuminant is always at full anywhere in the control surface.

Figure 12D:
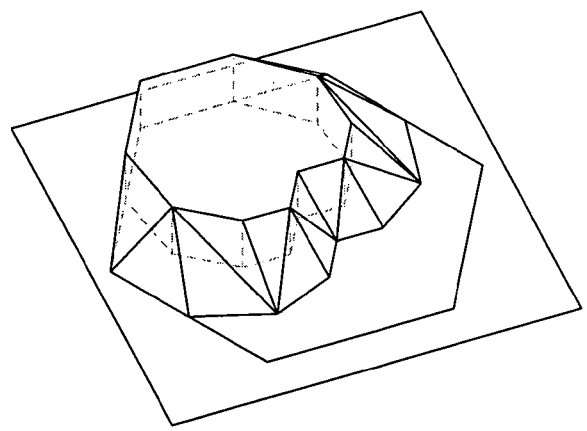
FIG. 12D is a diagram illustrating an embodiment plotting the drive level of one illuminant type in the two-dimensional hexagonal control surface of FIG. 12A, in perspective as a vertical dimension above the horizontal plane.

FIG. 12D is a diagram illustrating an embodiment plotting the drive level of one illuminant type in the two-dimensional hexagonal control surface of FIG. 12A, in perspective as a vertical dimension above the horizontal plane. In the example shown, full drive level portion 1260 and zero drive level portion 1262 of FIG. 12C are seen in perspective as the highest and lowest areas of the plot, respectively. For clarity only one surface is shown, but there is actually one for each illuminant type. In some embodiments, the slope down from the highest area of the plot is linear as shown. In some embodiments, the slope down from the highest area of the plot is curved to provide additional control resolution at low illuminant drive levels, where small drive level changes have greater effect on aggregate chromaticity than at high illuminant drive levels. In some embodiments, the curved slope is proportional to $d^n$ where d is the depicted linear drive level and n is greater than one.

Figure 13A:
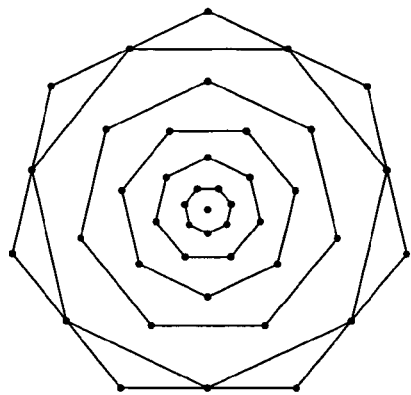
FIG. 13A is a diagram illustrating an embodiment of a two-dimensional color-space-independent heptagonal control surface useful for obtaining all possible proportions of seven arbitrary illuminant types that are required for color mixing.

FIG. 13A is a diagram illustrating an embodiment of a two-dimensional color-space-independent heptagonal control surface useful for obtaining all possible proportions of seven arbitrary illuminant types that are required for color mixing. In the example shown, nested polygons are associated with increasing numbers of illuminant types from perimeter rank 1 to center rank 7. Vertices of each nested pentagon are shown as black dots corresponding to a combination of illuminants. Each vertex comprises the illuminant types of its neighbors having fewer illuminant types. Each point in the heptagon corresponds to one possible proportion of the seven illuminants, and every proportion of adjacent illuminants corresponds to one point in the heptagon. Although this control surface applies to seven illuminants, it should be readily apparent that any finite number of illuminants is accommodated by increasing the number of vertices in each polygon and increasing the number of nested polygonal ranks.

To calculate the illuminant proportions corresponding to a desired point, the drive levels associated with neighboring vertices can be interpolated to according to the position of the desired point. There are numerous well-known techniques for performing this interpolation. In some embodiments, Delaunay triangulation is used. In some embodiments, barycentric interpolation is used. In some embodiments, Lagrange polynomial interpolation is used. Because vertices correspond to illuminant drive level extrema, interpolation is made mathematically continuous, avoiding visual artifacts from desired color changes. Optimized brightness is attained by restricting illuminant type combinations to adjacent illuminant types in hue angle order. Output intensity is able to be adjusted without affecting chromaticity by scaling all illuminant type drive levels together without changing their relative proportions.

The layout of the heptagons and the coordinates of their vertices are not critical. In some embodiments, the origin of the plane corresponds to the center of figure. In some embodiments, all coordinates are represented by positive numbers. In some embodiments, coordinates are skewed to match a predetermined color space. In some embodiments, coordinates are skewed to match illuminant type characteristics. In some embodiments, coordinates are skewed to match external command source characteristics.

Figure 13B:
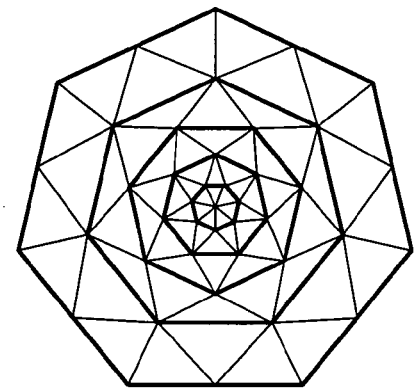
FIG. 13B is a diagram illustrating an embodiment of one possible tessellation of the two-dimensional heptagonal control surface.

FIG. 13B is a diagram illustrating an embodiment of one possible tessellation of the two-dimensional heptagonal control surface. In some embodiments, the vertices forming the triangles are identical to the vertices of FIG. 13A.

Figure 13C:
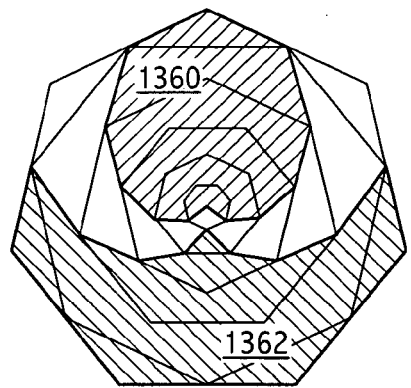
FIG. 13C is a diagram illustrating an embodiment plotting a portion of the two-dimensional heptagonal control surface of FIG. 13A.

FIG. 13C is a diagram illustrating an embodiment plotting a portion of the two-dimensional heptagonal control surface of FIG. 13A. In the example shown, an illuminant type has a drive level at full in hatched area 1360 and at zero in hatched area 1362. A rotation of hatched area 1360 for each of the seven illuminants covers the entire heptagonal control surface, and thus at least one illuminant is always at full anywhere in the control surface.

Figure 13D:
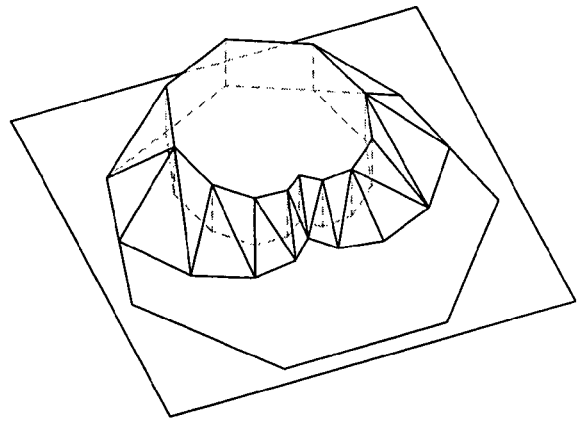
FIG. 13D is a diagram illustrating an embodiment plotting the drive level of one illuminant type in the two-dimensional heptagonal control surface of FIG. 13A, in perspective as a vertical dimension above the horizontal plane.

FIG. 13D is a diagram illustrating an embodiment plotting the drive level of one illuminant type in the two-dimensional heptagonal control surface of FIG. 13A, in perspective as a vertical dimension above the horizontal plane. In the example shown, full drive level region 1360 and zero drive level region 1362 of FIG. 13C are seen in perspective as the highest and lowest areas of the plot, respectively. For clarity only one surface is shown, but there is actually one for each illuminant type. In some embodiments, the slope down from the highest area of the plot is linear as shown. In some embodiments, the slope down from the highest area of the plot is curved to provide additional control resolution at low illuminant drive levels, where small drive level changes have greater effect on aggregate chromaticity than at high illuminant drive levels. In some embodiments, the curved slope is proportional to $d^n$ where d is the depicted linear drive level and n is greater than one.

Figure 14:
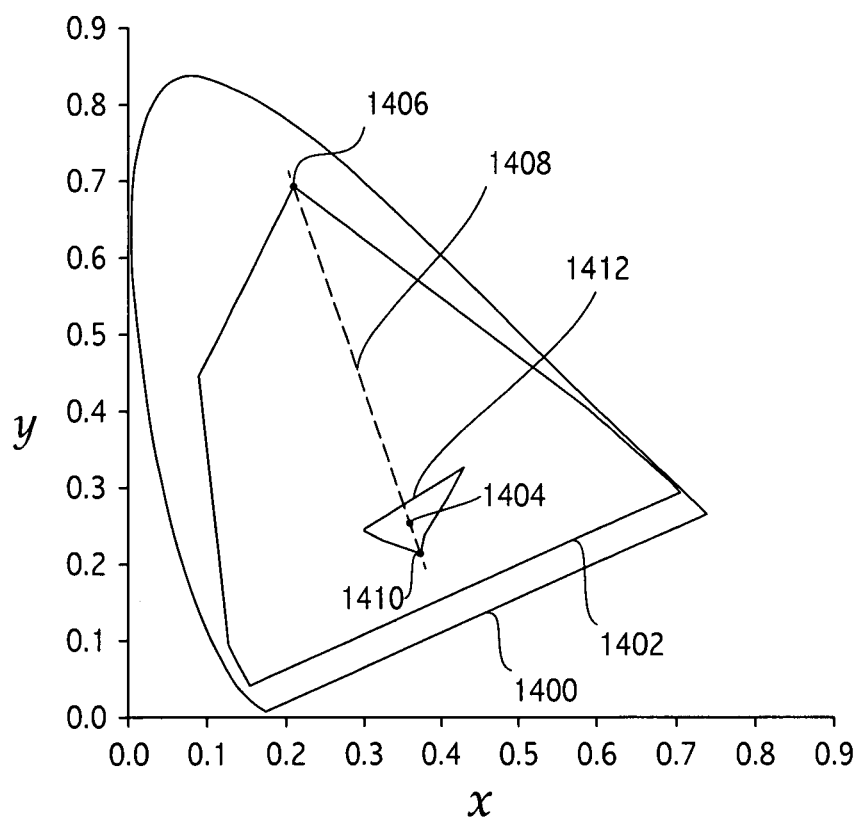
FIG. 14 is a plot illustrating an embodiment of the CE 1931 xy chromaticity diagram showing chromaticity response to changing illuminant intensity.

FIG. 14 is a plot illustrating an embodiment of the CIE 1931 xy chromaticity diagram showing chromaticity response to changing illuminant intensity. In the example shown, the chromaticity diagram has human color gamut boundary shown by closed curve 1400. Seven non-white illuminant types (e.g., illuminant types of table 1A) are plotted by chromaticity as vertices of convex polygon 1402 illustrating a gamut of the illuminants. Chromaticity coordinate 1404 is generated when all illuminants are at full, herein called the maximum power point. Representative green illuminant 1406 is connected by dashed line 1408 through maximum power point 1404 to an all-but-green point 1410. Polygon 1412 illustrates the chromaticity coordinate generated when all but one illuminant type is at full with each illuminant type at zero in turn. Maximum power point 1404 attains the maximum possible brightness by definition, because there are no more illuminants to turn on. All-but-green point 1410 is likewise the brightest possible such chromaticity because the only degree of freedom for the illuminants is to turn green back on, which would cause a transition on the chromaticity diagram to 1404. This is expressing the well-known principle that all possible additive color mixes of two illuminants have a chromaticity on the line connecting the chromaticity coordinates of the two illuminants. The same is true for each of the other illuminants, and thus polygon 1412 contains only the brightest possible values for each chromaticity. This process can be extended recursively for all-but-two adjacent illuminants at full, etc. until the gamut perimeter is reached with only one illuminant at full at a time, always yielding the brightest possible values at each recursion level. Turning on a non-adjacent illuminant will always move chromaticity away from the other illuminant types, towards the center and a previous level, but each level is already constructed as the brightest possible, and thus a non-adjacent illuminant type cannot have optimal brightness.

For some applications and sets of illuminant types, a metamer is preferred that does not have optimal brightness. For example, in a theatrical production some costumes may employ a red cloth accent on a beige background. Under an optimal-brightness white light this accent will appear red, but for dramatic effect it is sometimes desirable to increase the contrast between colors. Selecting a metamer of white with reduced amber (e.g., by limiting the 'amber' illuminant type to a maximum of 30% intensity) in its spectral power distribution leaves the red accent at full brightness while diminishing the beige background. Many other colors will not be affected. The red is not brighter than before, but it is brighter relative to the beige. The visual effect is that the red appears to have changed by itself. This technique enables a striking visual impact. In all cases the total brightness of a non-optimal metamer is reduced, but depending on the illuminants available, the desired color, and the specified spectral adjustment it is possible that the selected metamer is considerably dimmer than the optimal one, or even not achievable. For example, if a spectral selection allows at most 5% green intensity then desired colors close to that illuminant color will be limited accordingly.

In some embodiments, spectral adjustments are made by means of an equalizer control similar to that of audio equipment. A series of levers allows different parts of the visual spectrum to be controlled. In some embodiments, the levers include the region of non-spectral purples by controlling both the long and short wavelength regions of the spectrum together. In various embodiments, the levers are implemented by mechanical levers, by visual user interface, by sliders, knobs, numeric adjusters, and any other appropriate control mechanism. In some embodiments, spectral adjustments are made in terms of the illuminant types. In some embodiments, spectral adjustments are made in terms of a predetermined gamut. In some embodiments, a total brightness reduction of the spectral adjustment is displayed to the operator, and/or indicated to a command source. In some embodiments the total brightness reduction is depicted as a percentage.

Figure 15A:
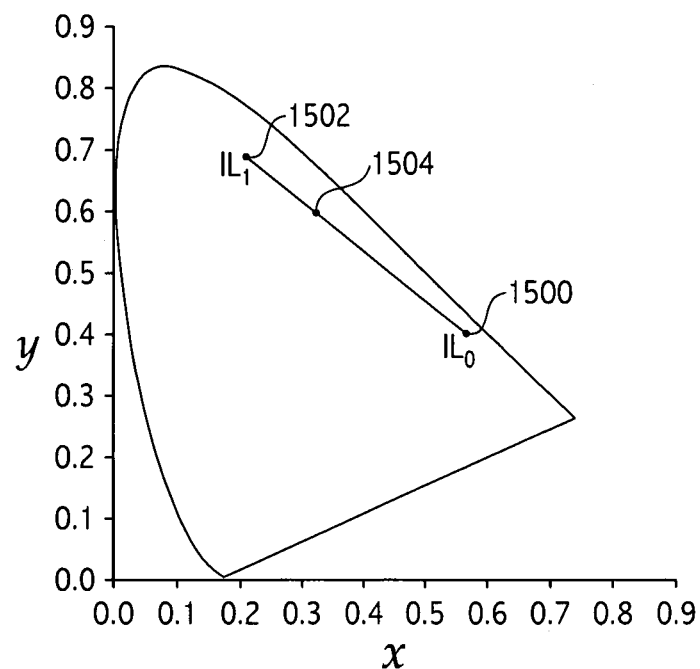
FIG. 15A is a diagram illustrating an embodiment plotting two example illuminant types $IL_0$ and $IL_1$ on a CIE 1931 xy chromaticity diagram.

FIG. 15A is a diagram illustrating an embodiment plotting two example illuminant types $IL_0$ and $IL_1$ on a CIE 1931 xy chromaticity diagram. In the example shown, $IL_0$ chromaticity is plotted at point 1500 and $IL_1$ chromaticity is plotted at point 1502. The line between 1500 and 1502 is the gamut of combining these illuminants in all possible proportions. In this example the combination of both illuminant types at full intensity results in chromaticity 1504.

Figure 15B:
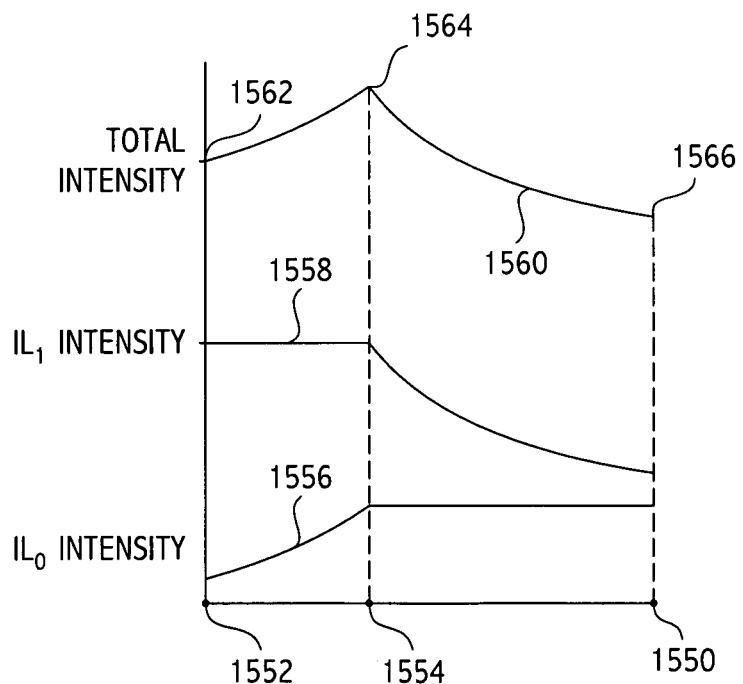
FIG. 15B is a diagram illustrating an embodiment plotting the necessary proportions of $IL_0$ and $IL_1$ for each chromaticity in the gamut shown in FIG. 15A, along with the total intensity of the combination of illuminant types.

FIG. 15B is a diagram illustrating an embodiment plotting the necessary proportions of $IL_0$ and $IL_1$ for each chromaticity in the gamut shown in FIG. 15A, along with the total intensity of the combination of illuminant types. In the example shown, point 1550 corresponds to point 1500 of FIG. 15A, showing the chromaticity when $IL_0$ is at full and $IL_1$ is at zero. Point 1552 corresponds to point 1502 of FIG. 15A, showing the chromaticity when $IL_0$ is at zero and $IL_1$ is at full. Point 1554 corresponds to point 1504 of FIG. 15A, showing the chromaticity when $IL_0$ and $IL_1$ are both at full. Curve 1556 shows the required intensity of $IL_0$ increasing as it approaches the maximum power point 1554. Curve 1558 shows the required intensity of $IL_1$ increasing as it approaches the maximum power point 1554. The total intensity resulting from these combinations of $IL_0$ and $IL_1$ is shown by curve 1560, which starts with intensity 1562 at position 1552 equivalent to the full $IL_1$ intensity since $IL_0$ is zero there, then rises to peak intensity 1564 at position 1554 equivalent to the sum of the full $IL_0$ and $IL_1$ intensities, then falls to level 1566 at position 1550 equivalent to the full $IL_0$ intensity since $IL_1$ is zero there.

Figure 16A:
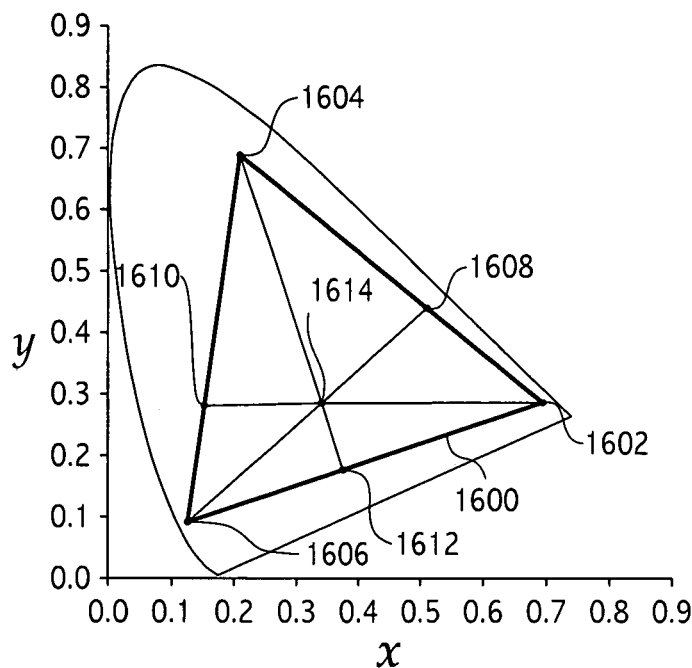
FIG. 16A plots a color-space-specific translation of the triangular control surface.

FIG. 16A plots a color-space-specific translation of the triangular control surface. In some embodiments, the triangular control surface corresponds to FIG. 7A and is useful for determining the necessary proportions of three illuminant types to achieve a particular chromaticity in the CIE 1931 color space. In the example shown, vertex coordinates are set to the chromaticity coordinates of the combination of illuminants associated with each vertex while retaining the optimized brightness and mathematically continuous benefits of the color-space-independent control surface. This example uses the red, green, and blue illuminant types of FIG. 1A. Triangular control surface 1600 is shown with tessellation lines and comprises red vertex 1602, green vertex 1604, and blue vertex 1606 in the first rank; red-green vertex 1608, green-blue vertex 1610, and red-blue vertex 1612 in the second rank; and red-green-blue full power vertex 1614 as the sole member of the third rank.

Figure 16B:
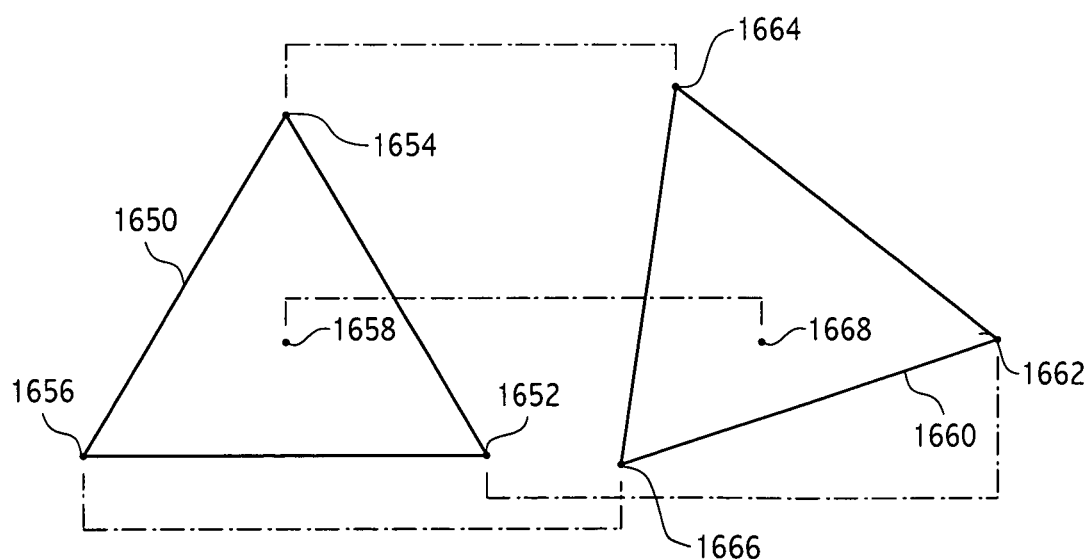
FIG. 16B is a diagram illustrating an embodiment of correspondence between color-space-independent triangular control surface 1650 and color-space-specific triangular control surface 1660.

FIG. 16B is a diagram illustrating an embodiment of correspondence between color-space-independent triangular control surface 1650 and color-space-specific triangular control surface 1660. Red vertices 1652 and 1662, green vertices 1654 and 1664, blue vertices 1656 and 1666, and center points 1658 and 1668 are drawn with projection lines connecting them. Other control surface details were omitted for clarity.

Figure 17A:
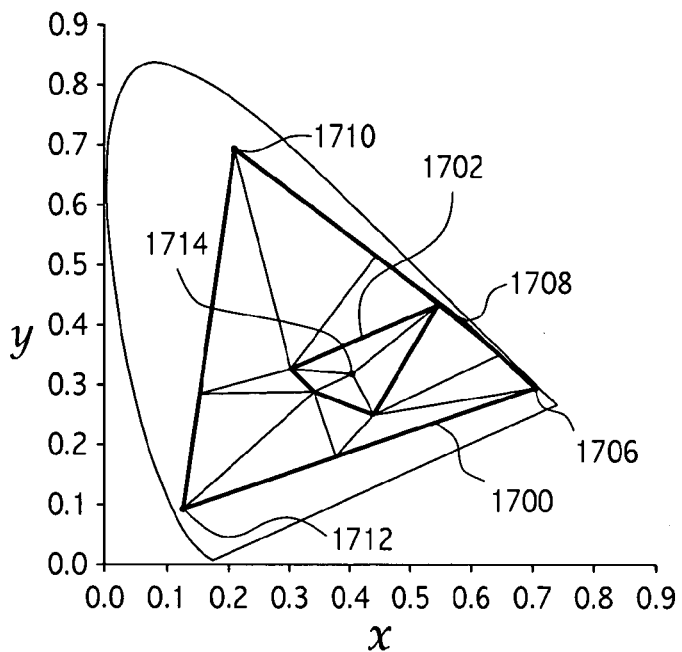
FIG. 17A is a diagram illustrating an embodiment plotting a color-space-specific translation of the rectangular control surface.

FIG. 17A is a diagram illustrating an embodiment plotting a color-space-specific translation of the rectangular control surface. In some embodiments, the rectangular control surface corresponds to FIG. 9A and is useful for determining the necessary proportions of four illuminant types to achieve a particular chromaticity in the CIE 1931 color space. In the example shown, vertex coordinates are set to the chromaticity coordinates of the combination of illuminants associated with each vertex while retaining the optimized brightness and mathematically continuous benefits of the color-space-independent control surface. This example uses the red, amber, green, and blue illuminant types of FIG. 1A. Quadrilateral 1700 comprises red vertex 1706, amber vertex 1708, green vertex 1710, and blue vertex 1712 in rank 1. The rank-2 quadrilateral is not drawn to better show tessellation lines, but its vertices are readily located at intermediate points on the edges of quadrilateral 1700. Rank-3 quadrilateral 1702 also has four vertices connected to tessellation lines and to center point 1714 having rank 4.

Figure 17B:
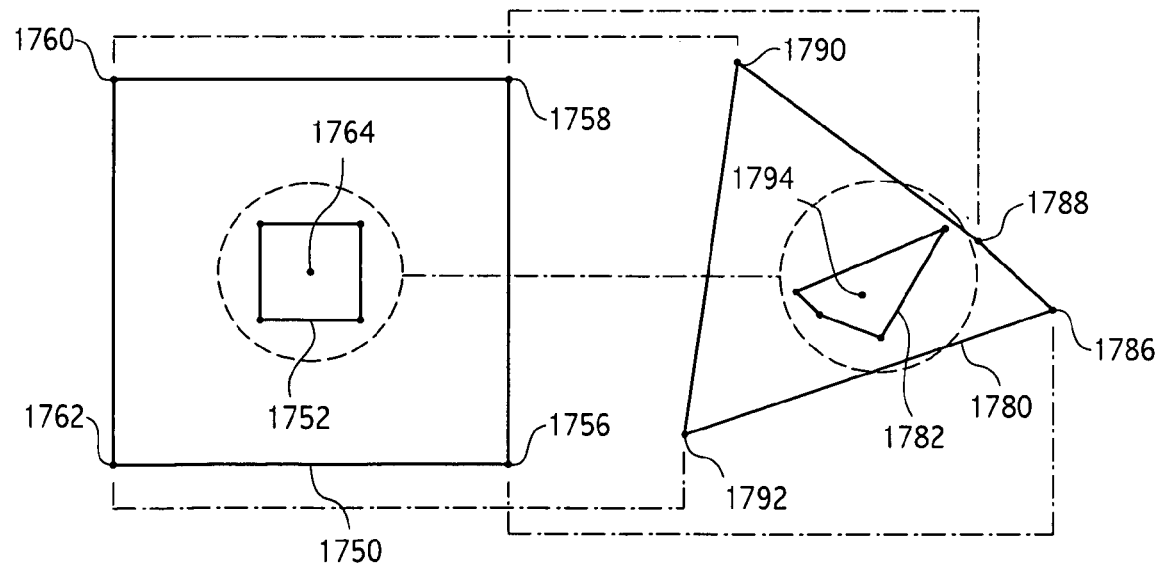
FIG. 17B is a diagram illustrating and embodiment of correspondence between color-space-independent quadrilateral control surface 1750 and color-space-specific quadrilateral control surface 1780.

FIG. 17B is a diagram illustrating and embodiment of correspondence between color-space-independent quadrilateral control surface 1750 and color-space-specific quadrilateral control surface 1780. In the example shown, red vertices 1756 and 1786, amber vertices 1758 and 1788, green vertices 1760 and 1790, blue vertices 1762 and 1792, rank-3 quadrilaterals 1752 and 1782, and rank-4 center points 1764 and 1794 are drawn with projection lines connecting them. Other control surface details were omitted for clarity.

Figure 18A:
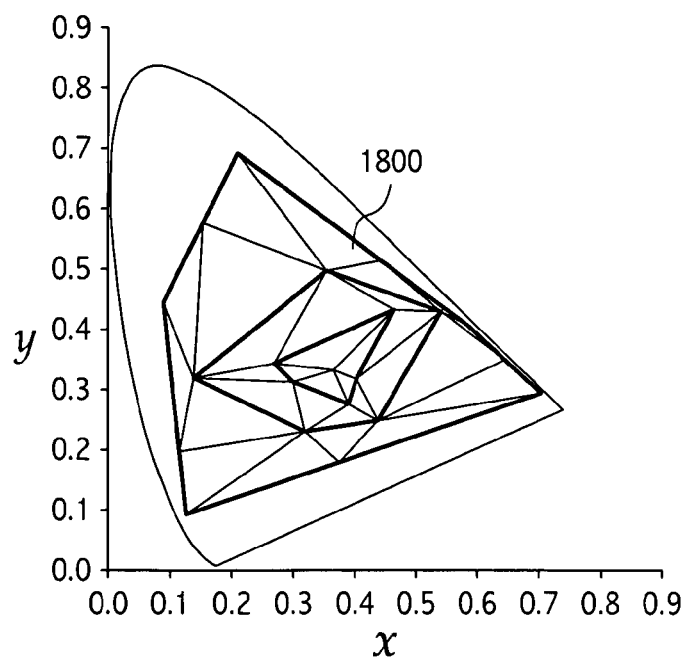
FIG. 18A is a diagram illustrating an embodiment plotting a color-space-specific translation of the pentagonal control surface.

FIG. 18A is a diagram illustrating an embodiment plotting a color-space-specific translation of the pentagonal control surface. In some embodiments, the pentagonal control surface corresponds to FIG. 11A and is useful for determining the necessary proportions of five illuminant types to achieve a particular chromaticity in the CIE 1931 color space. In the example shown, vertex coordinates are set to the chromaticity coordinates of the combination of illuminants associated with each vertex while retaining the optimized brightness and mathematically continuous benefits of the color-space-independent control surface. This example uses the red, amber, green, cyan, and blue illuminant types of FIG. 1A. Control surface 1800 shows pentagonal ranks 1, 3, and 4 drawn bold and connected by tessellation lines drawn light.

Figure 18B:
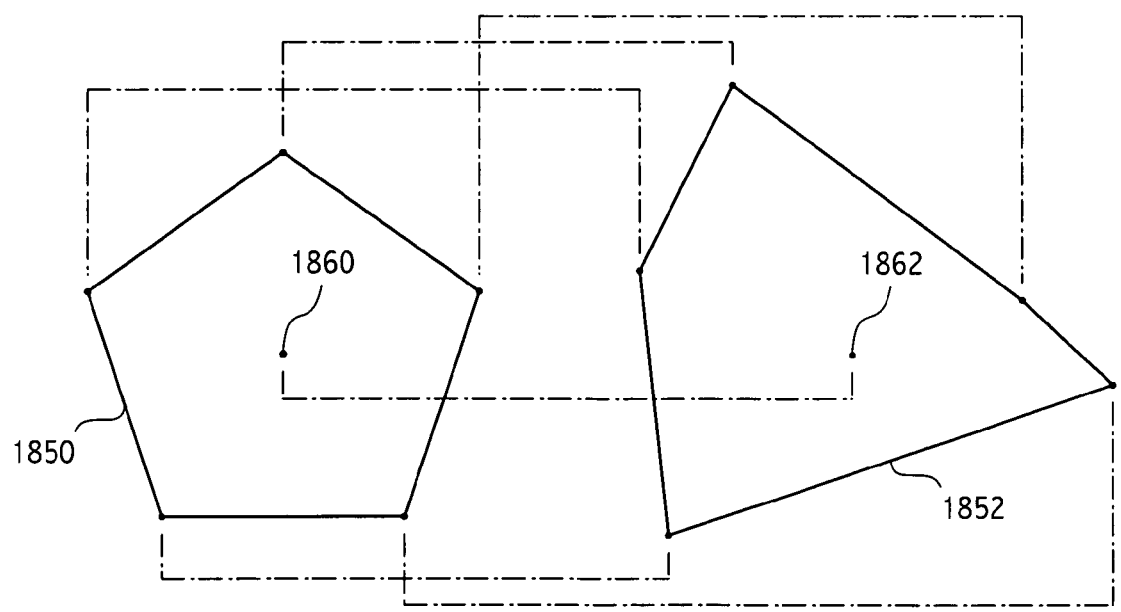
FIG. 18B is a diagram illustrating an embodiment of correspondence between color-space-independent pentagonal control surface 1850 and color-space-specific pentagonal control surface 1852.

FIG. 18B is a diagram illustrating an embodiment of correspondence between color-space-independent pentagonal control surface 1850 and color-space-specific pentagonal control surface 1852. In the example shown, projection lines are shown between center points 1860 and 1862, and between corresponding rank-1 vertices. Other control surface details were omitted for clarity.

Figure 19A:
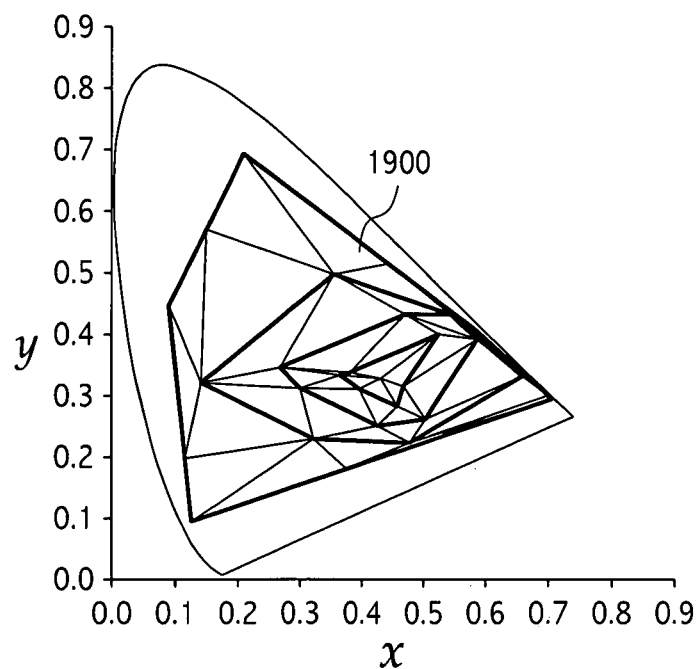
FIG. 19A is a diagram illustrating an embodiment plotting a color-space-specific translation of the hexagonal control surface.

FIG. 19A is a diagram illustrating an embodiment plotting a color-space-specific translation of the hexagonal control surface. In some embodiments, the hexagonal control surface corresponds to FIG. 12A and is useful for determining the necessary proportions of six illuminant types to achieve a particular chromaticity in the CIE 1931 color space. In the example shown, vertex coordinates are set to the chromaticity coordinates of the combination of illuminants associated with each vertex while retaining the optimized brightness and mathematically continuous benefits of the color-space-independent control surface. This example uses the red, red orange, amber, green, cyan, and blue illuminant types of FIG. 1A. Control surface 1900 shows hexagonal ranks 1, 3, 4, and 5 drawn bold and connected by tessellation lines drawn light.

Figure 19B:
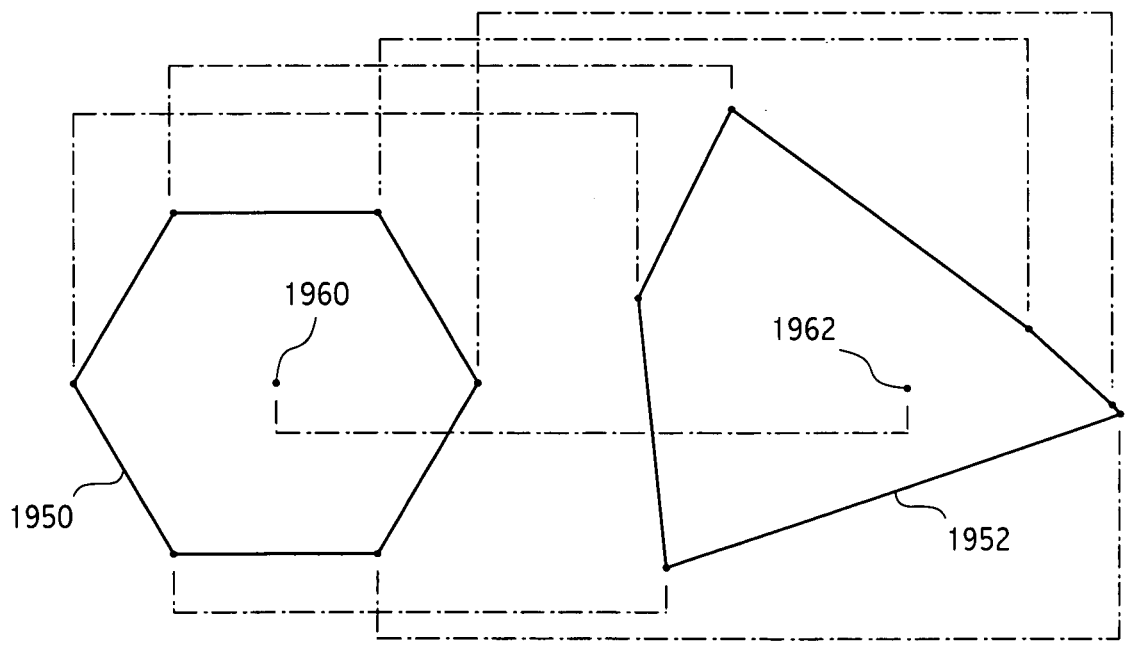
FIG. 19B is a diagram illustrating an embodiment of correspondence between color-space-independent hexagonal control surface 1950 and color-space-specific hexagonal control surface 1952.

FIG. 19B is a diagram illustrating an embodiment of correspondence between color-space-independent hexagonal control surface 1950 and color-space-specific hexagonal control surface 1952. In the example shown, projection lines are shown between center points 1960 and 1962, and between corresponding rank-1 vertices. Other control surface details were omitted for clarity.

Figure 20A:
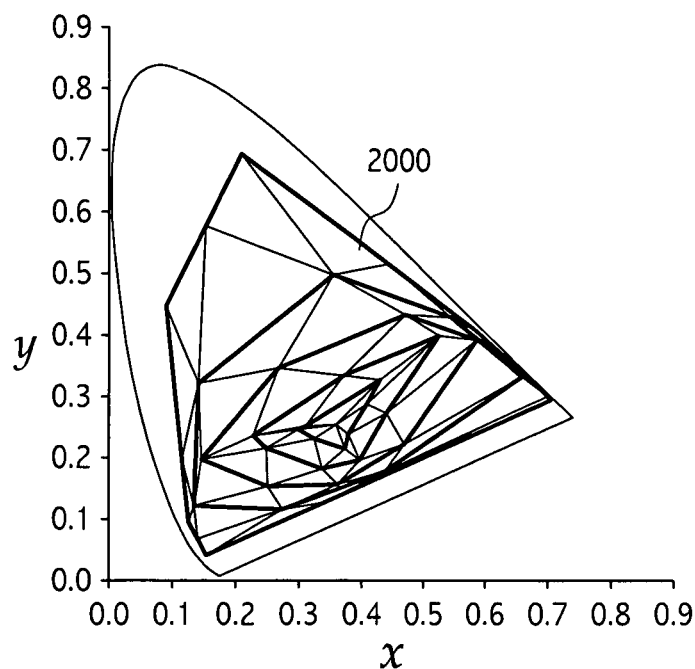
FIG. 20A is a diagram illustrating an embodiment of plotting a color-space-specific translation of the heptagonal control surface.

FIG. 20A is a diagram illustrating an embodiment of plotting a color-space-specific translation of the heptagonal control surface. In some embodiments, the heptagonal control surface corresponds to FIG. 13A and is useful for determining the necessary proportions of seven illuminant types to achieve a particular chromaticity in the CIE 1931 color space. In the example shown, vertex coordinates are set to the chromaticity coordinates of the combination of illuminants associated with each vertex while retaining the optimized brightness and mathematically continuous benefits of the color-space-independent control surface. This example uses the red, red orange, amber, green, cyan, blue, and indigo illuminant types of FIG. 1A. Control surface 2000 shows heptagonal ranks 1, 3, 4, 5, and 6 drawn bold and connected by tessellation lines drawn light. Although this control surface applies to seven illuminants, it should be readily apparent that any finite number of illuminants is accommodated by increasing the number of vertices in each polygon and increasing the number of nested polygonal ranks.

Figure 20B:
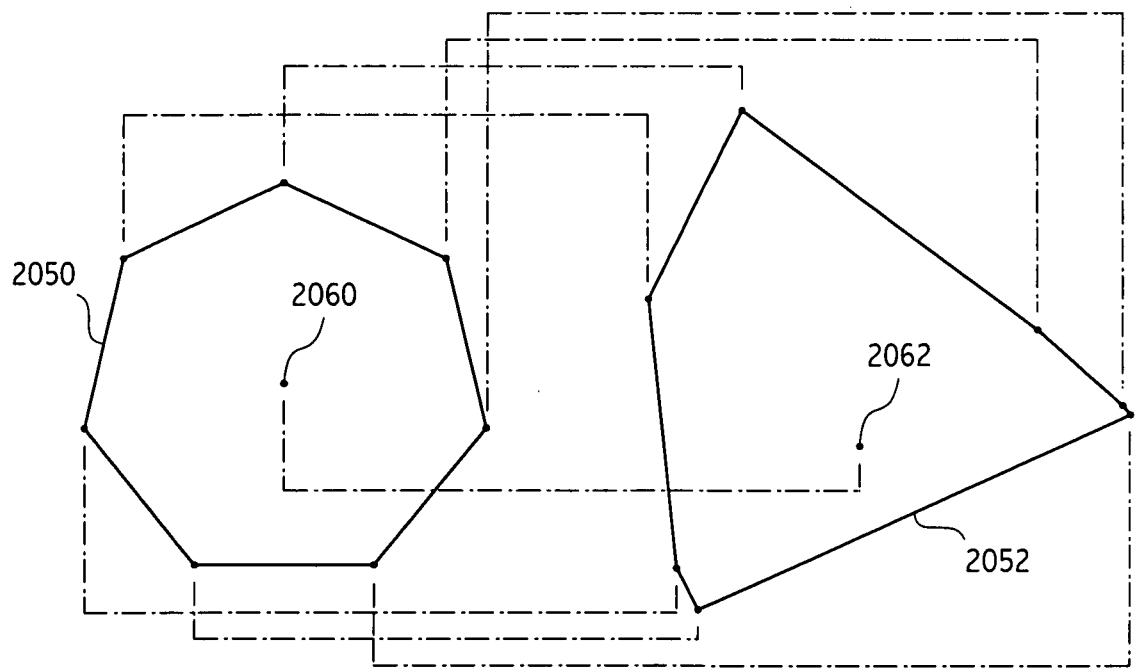
FIG. 20B is a diagram illustrating an embodiment of correspondence between color-space-independent heptagonal control surface 2050 and color-space-specific heptagonal control surface 2052.

FIG. 20B is a diagram illustrating an embodiment of correspondence between color-space-independent heptagonal control surface 2050 and color-space-specific heptagonal control surface 2052. In the example shown, projection lines are shown between center points 2060 and 2062, and between corresponding rank-1 vertices. Other control surface details were omitted for clarity.

Figure 21A:
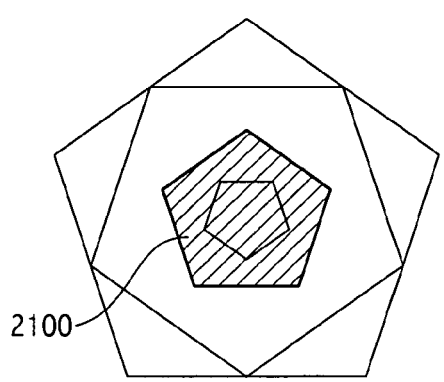
FIG. 21A is a diagram illustrating an embodiment of an example color-space-independent control space for six illuminants where one is relatively desaturated with respect to the others.

FIG. 21A is a diagram illustrating an embodiment of an example color-space-independent control space for six illuminants where one is relatively desaturated with respect to the others. In the example shown, illuminant combinations for vertices at rank 3 and higher include the desaturated illuminant at full corresponding to pentagonal hatched region 2100. Vertices at rank 2 and lower do not include the desaturated illuminant.

Figure 21B:
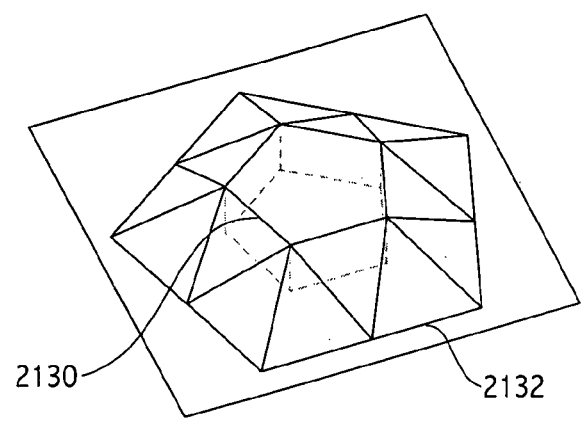
FIG. 21B is a diagram illustrating an embodiment plotting the desaturated illuminant drive level in the two-dimensional pentagonal control surface.

FIG. 21B is a diagram illustrating an embodiment plotting the desaturated illuminant drive level in the two-dimensional pentagonal control surface. In the example shown, the two-dimensional pentagonal control surface corresponds to FIG. 21A, in perspective as a vertical dimension above the horizontal plane. Pentagon 2130 is the highest area of the plot corresponding to drive level at full, while pentagonal perimeter 2132 is the lowest area of the plot corresponding to drive level at zero. While exact tessellation varies among different embodiments, it is important that each vertex of pentagon 2130 is joined by a tessellation line to the corresponding vertex of pentagonal perimeter 2132 so that desaturated illuminant intensity can smoothly vary to zero at the perimeter. In some embodiments, the slope down from the highest area of the plot is linear as shown. In some embodiments, the slope down from the highest area of the plot is curved to provide additional control resolution at low illuminant drive levels, where small drive level changes have greater effect on aggregate chromaticity than at high illuminant drive levels. In some embodiments, the curved slope is proportional to $d^n$ where d is the depicted linear drive level and n is greater than one.

Figure 21C:
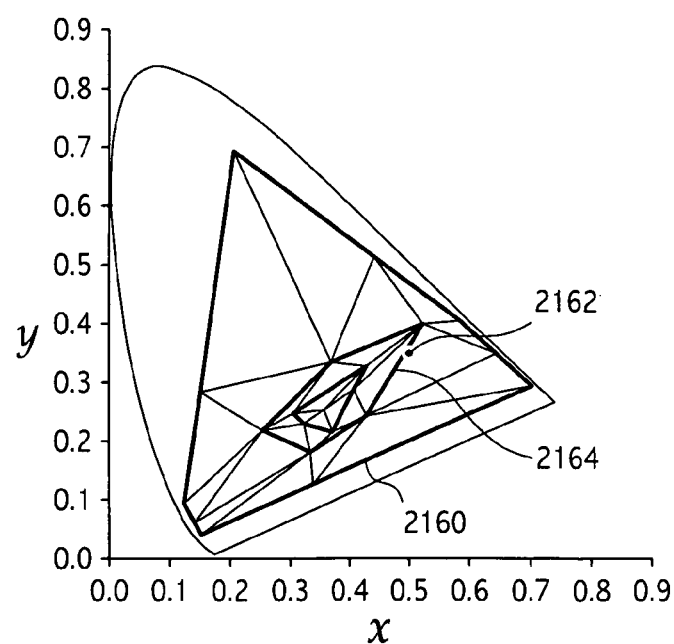
FIG. 21C is a diagram illustrating an embodiment plotting a color-space-specific translation of the desaturated pentagonal control surface.

FIG. 21C is a diagram illustrating an embodiment plotting a color-space-specific translation of the desaturated pentagonal control surface. In the example shown, the pentagonal control surface corresponds to FIG. 21A and is useful for determining the proportions of six illuminant types, where one is relatively desaturated, necessary to achieve a particular chromaticity in the CIE 1931 color space. Vertex coordinates are set to the chromaticity coordinates of the combination of illuminants associated with each vertex while retaining the optimized brightness and mathematically continuous benefits of the color-space-independent control surface. This example uses the red, amber, green, blue, indigo, and warm white illuminant types of FIG. 1A. Pentagonal ranks 1, 3, and 4 are drawn bold and connected by tessellation lines drawn light. The warm white desaturated illuminant chromaticity is plotted at 2162. Perimeter rank-1 pentagon 2160 is not affected by the presence of the warm white desaturated illuminant, but rank-3 pentagon 2164 is skewed by the altered chromaticity of its vertices.

Figure 22A:
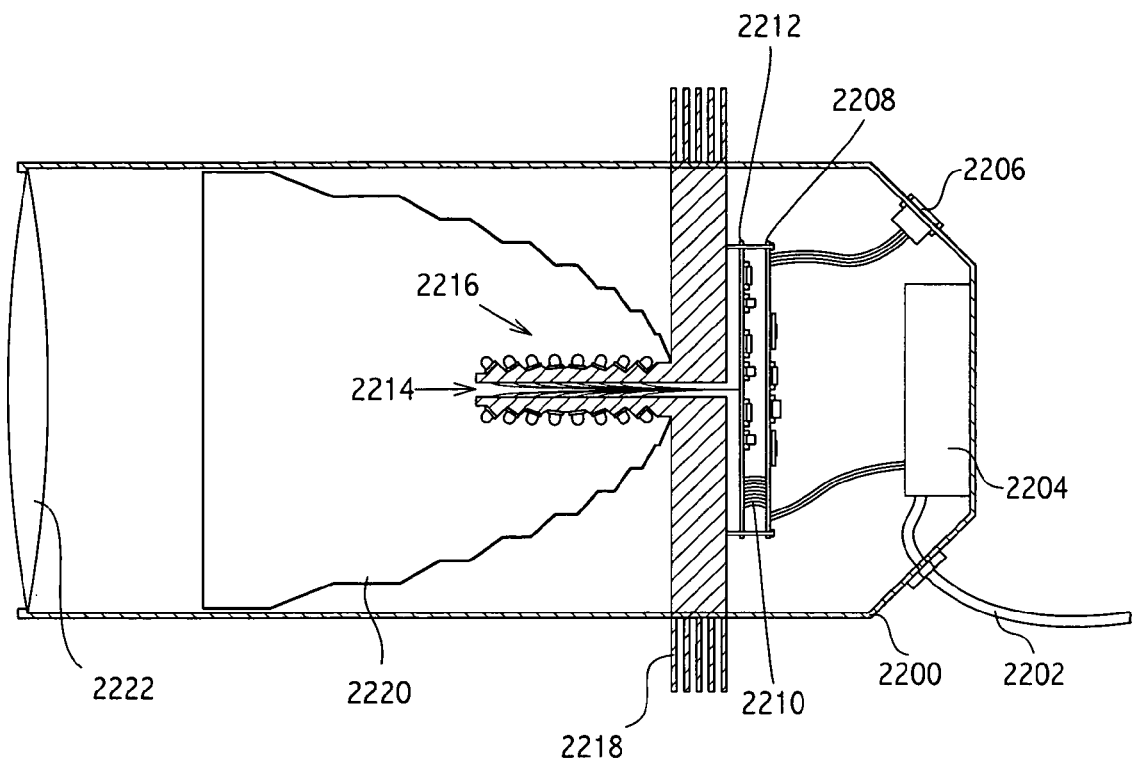
FIG. 22A is a cross-sectional view diagram illustrating an embodiment of a luminaire.

FIG. 22A is a cross-sectional view diagram illustrating an embodiment of a luminaire. In various embodiments, the luminaire of FIG. 22A comprises one of the following: a wash light, a spotlight, an ellipsoidal (e.g. an ellipsoidal reflector spotlight), a leko (e.g. an ellipsoidal), a strip light, a border light, a fresnel, a cyc light (e.g. a luminaire with asymmetrical beam throw intended for lighting cycloramas), a scoop light, a beam projector, an inkie (e.g. a 3 inch fresnel), a par can, a key light, a moving light, a pebble convex lantern (e.g. a "PC"), an accent light, a background light, a flood light, a task light, a house light, a work light, a follow spot, or any other lighting device intended to provide illumination. In the example shown, the luminaire is capable of emitting light of various colors according to commands received on a data interface. Housing 2200 provides mounting structure and protective casing for remaining components. Power cable 2202 provides mains power to power supply module 2204. Data interface 2206 allows connection to an external command source, which is used to send data to and/or from controller board 2208. Controller board 2208 interprets received commands, determines appropriate illuminant proportions for command colors, and provides necessary illuminant drive level information via cable 2210 to electronic driver board 2212. Electronic driver board 2212 provides power through wires 2214 to illuminants 2216. In this example, illuminants 226 are drawn as LEDs (light-emitting diodes), however any other appropriate illuminants can be used. Heat sink 2218 provides a path for waste heat to be dissipated outside housing 2200 in the surrounding environment. Reflector 2220 and lens 2222 optically combine light from different illuminant types and provide light beam characteristics as appropriate for the desired application.

In some embodiments, power is supplied from a direct current source (e.g. batteries or site-specific power distribution.) In some embodiments, power supply module 2204 is omitted in favor of the direct current (DC) source. In some embodiments, power supply module 2204 is a DC-DC converter. In some embodiments, power supply 2204 and electronics driver 2210 are integrated into a single module. In some embodiments, power supply 2204, electronics driver 2210 and controller 2208 are integrated into a single module. In various embodiments controller 2208 comprises a microprocessor, a microcontroller, a Field Programmable Gate Array (FPGA), an Application Specific Integrated Circuit (ASIC), a Programmable Logic Device (PLD), a Digital Signal Processor (DSP), or any other appropriate calculating and/or logic device. In various embodiments, data interface 2206 comprises an interface for one of the following: Ethernet, wireless Ethernet, lighting protocol Digital MultipleXed (DMX, DMX-512), wireless DMX, analog level, or any other appropriate communication technology. In some embodiments, illuminants 2216 are substantially white-emitting (desaturated) emitters with only sufficient additional illuminant types to permit altering the tint or color temperature of the generated white light. In some embodiments, housing 2200 is used as a heat sink. In some embodiments, no heat sink is required. In some embodiments, reflector 2220 is omitted. In some embodiments, a plurality of reflectors is used. In some embodiments, lens 2222 is omitted. In some embodiments, lens 2222 is a lenticular lens. In some embodiments, lens 2222 is a compound lens. In some embodiments, lens 2222 is biconvex.

Figure 22B:
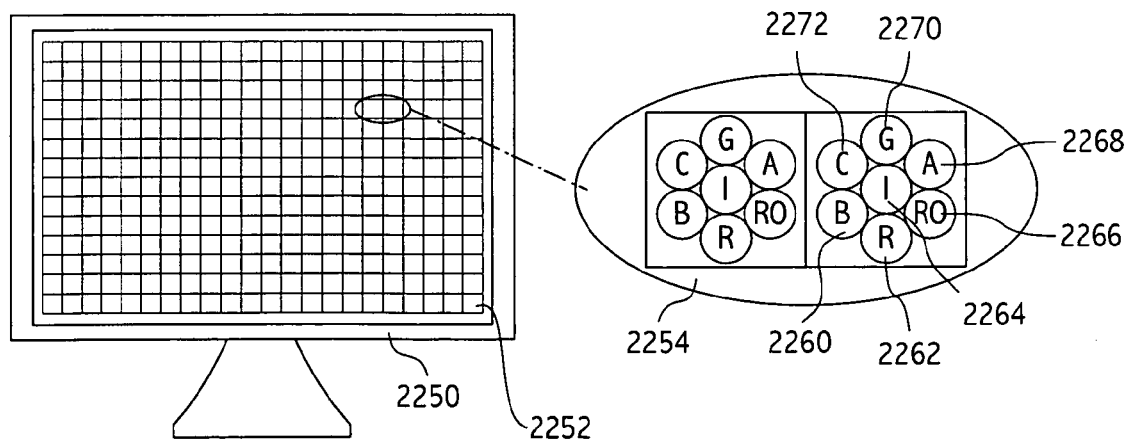
FIG. 22B is a diagram illustrating an embodiment of a display.

FIG. 22B is a diagram illustrating an embodiment of a display. In various embodiments, the display of FIG. 22B comprises one or more of the following: a monitor, a television, a hand held device display, a computer display, or a projection display. In the example shown, a graphical display device generates colors according to a video, picture, and/or other appropriate data source using seven colors per pixel. Desktop display device 2250 incorporates grid 2252 comprising rectangular pixels. Detail 2254 shows two such pixels, each comprising seven illuminants of different types: Blue 2260, Red 2262, Indigo 2264, Red Orange 2266, Amber 2268, Green 2270, and Cyan 2272. Display data is assembled into a rectangular layout and chromaticity and intensity determined for each pixel. Optimized color generation converts the chromaticity into necessary proportions of each illuminant type in each pixel, after which intensity is applied to scale the illuminants without changing their proportion. Calculated illuminant drive levels are output with appropriate addressing and timing to cause the desired generated colored light to be emitted from each pixel.

In some embodiments, pixels are comprised of LED illuminants. In some embodiments, pixels are comprised of liquid crystal display (LCD) filters in front of a backlight. In some embodiments, pixels are comprised of LCD filters in front of LED backlights. In some embodiments, the LED backlights can change color. In some embodiments, multiple illuminants have the same type. In various embodiments each pixel uses four or more illuminant types. In some embodiments, one or more sets of illuminants are hidden inside the device cabinet and coupled to a feedback sensing apparatus to measure illuminant changes. In some embodiments, a measured color and intensity of ambient illumination are used to alter illuminant specifications in accordance with human perceptual differences due to the ambient light.

Figure 23:
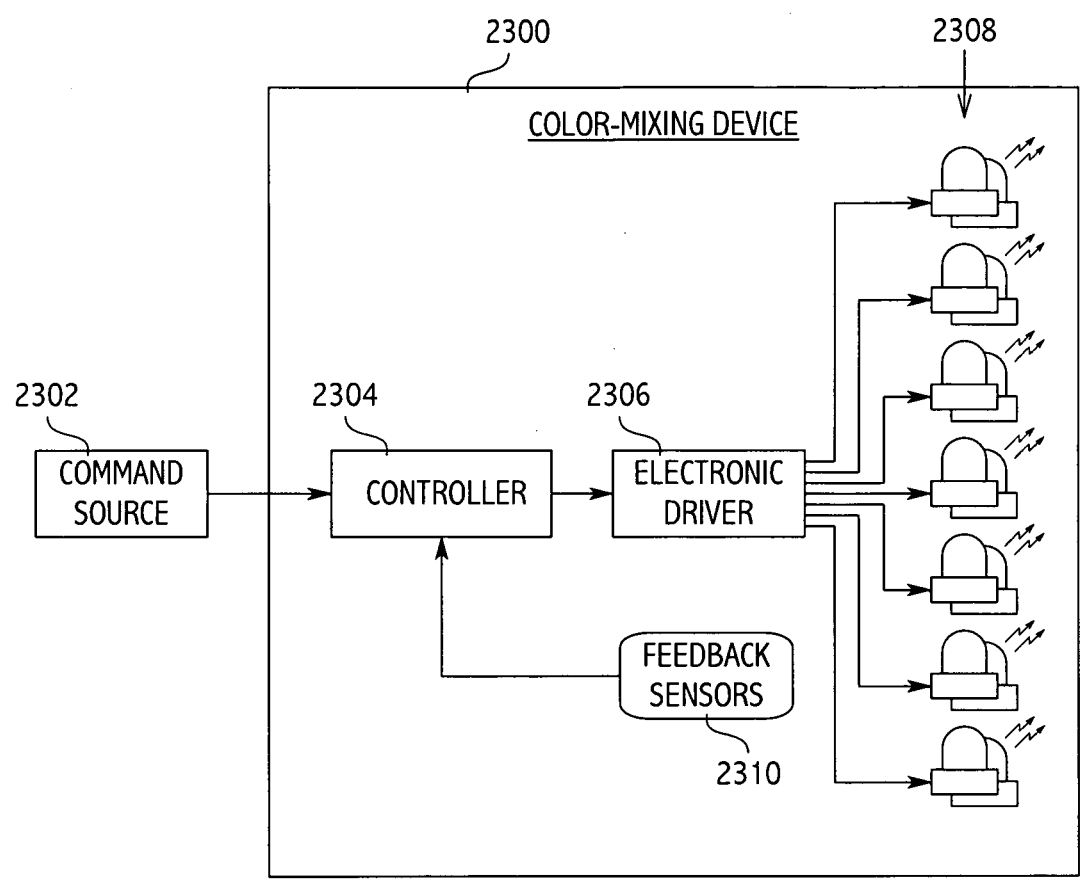
FIG. 23 is a block diagram illustrating an embodiment of a system capable of optimized color generation using multiple illuminant types.

FIG. 23 is a block diagram illustrating an embodiment of a system capable of optimized color generation using multiple illuminant types. In the example shown, color-mixing Device 2300 emits light with selectable color. Command Source 2302 issues digital commands for desired colors to Controller 2304, which is capable of using Electronic Driver 2306 to set intensities for a set of light sources 2308, each in the range of 0 to 100% of its maximum. The set of light sources 2308 is configured to combine light from different illuminant types for additive color mixing. Optional Feedback Sensors 2310 measure temperature, chromaticity, optical power, and spectral power distribution in any combination, allowing Controller 2304 to monitor, respond to, and compensate for changes in illuminant behavior.

In some embodiments, Color-mixing Device 2300 comprises four or more illuminants. In some embodiments, Color-mixing Device 2300 is a luminaire capable of emitting light for illumination. In some embodiments, Color-mixing Device 2300 emits light for one pixel of a plurality of pixels in a device capable of displaying information. In some embodiments, Controller 2304 is physically separate from Color-mixing Device 2300, whereby Controller 2304 is capable of using Electronic Driver 2306 to set intensities for plurality of light sources 2308 using a communication link from Controller 2304 to Electronic Driver 2306. In some embodiments, set of light sources 2308 is physically separate from Color-mixing Device 2300, whereby Electronic Driver 2306 connects to set of light sources 2308 using an electrical connection (e.g., a single wire, a cable, a ribbon cable, etc.) In some embodiments, two or more of Color-mixing Device 2300 share a physically separated Controller 2304. In some embodiments, Controller 2304 controls a plurality of Electronic Driver 2306. In some embodiments, Electronic Driver 2306 controls a plurality of sets of light sources 2308. In some embodiments, optional Feedback sensors 2310 monitor all illuminants. In some embodiments, optional Feedback Sensors 2310 monitor a subset of illuminants. In some embodiments, optional Feedback Sensors 2310 are coupled to remote illuminants 2308 by using an optical connection.

In some embodiments, Command Source 2302 comprises a lighting control panel that includes one or more controls (e.g., switches, sliders, dimmers, value selectors, etc.) for selecting the colors of one or more color-mixing devices. In some embodiments, Command Source 2302 comprises a computer system including software that create a virtual lighting control panel that enables one or more virtual controls (e.g., virtual switches, virtual sliders, virtual dimmers, virtual value selectors, etc.) for setting the colors of one or more color-mixing devices. In some embodiments, Command Source 2302 comprises a computer system with a preprogrammed set of commands that are output to a controller such as Controller 2304. In some embodiments, Command Source 2302 comprises a human interface device. In some embodiments, Command Source 2302 provides commands via a data interface.

In some embodiments, Controller 2304 is a processor that calculates proportions of drive levels (e.g., a set drive levels or a set of output levels for each of the set of light sources 2308) for Electronic Driver 2306 to generate a desired color using set of light sources 2308. In some embodiments, Electronic Driver 2306 is a modulated current source that is used to drive set of light sources 2308, where each of set of light sources 2308 comprises a light emitting diodes (LED). In some embodiments, the modulated current source uses pulse width modulation. In some embodiments, the current source comprises a constant current source. In various embodiments, each of set of light sources 2308 comprises a single LED, multiple LEDs, is driven by a single driver unit or multiple driver units, or any other appropriate driver/light source configuration. In various embodiments, each light source of set of light sources 2308 comprises an incandescent lamp, a florescent lamp, a high intensity discharge lamp, a laser, a light source with electronic color changing means, a phosphor with electronic intensity control means, or any other appropriate light source technologies in any combination. In some embodiments, a light source with a colored optical filter provides one or more of set of light sources 2308. In some embodiments, set of light sources 2308 comprises an integrated light engine. In some embodiments, illuminant intensity control is accomplished using a spatial light modulator. In some embodiments, the spatial light modulator is a digital micromirror device. In some embodiments the spatial light modulator is a light valve. In some embodiments, a color wheel is employed to provide sequentially different illuminant types by filtering a light source.

Figure 24:
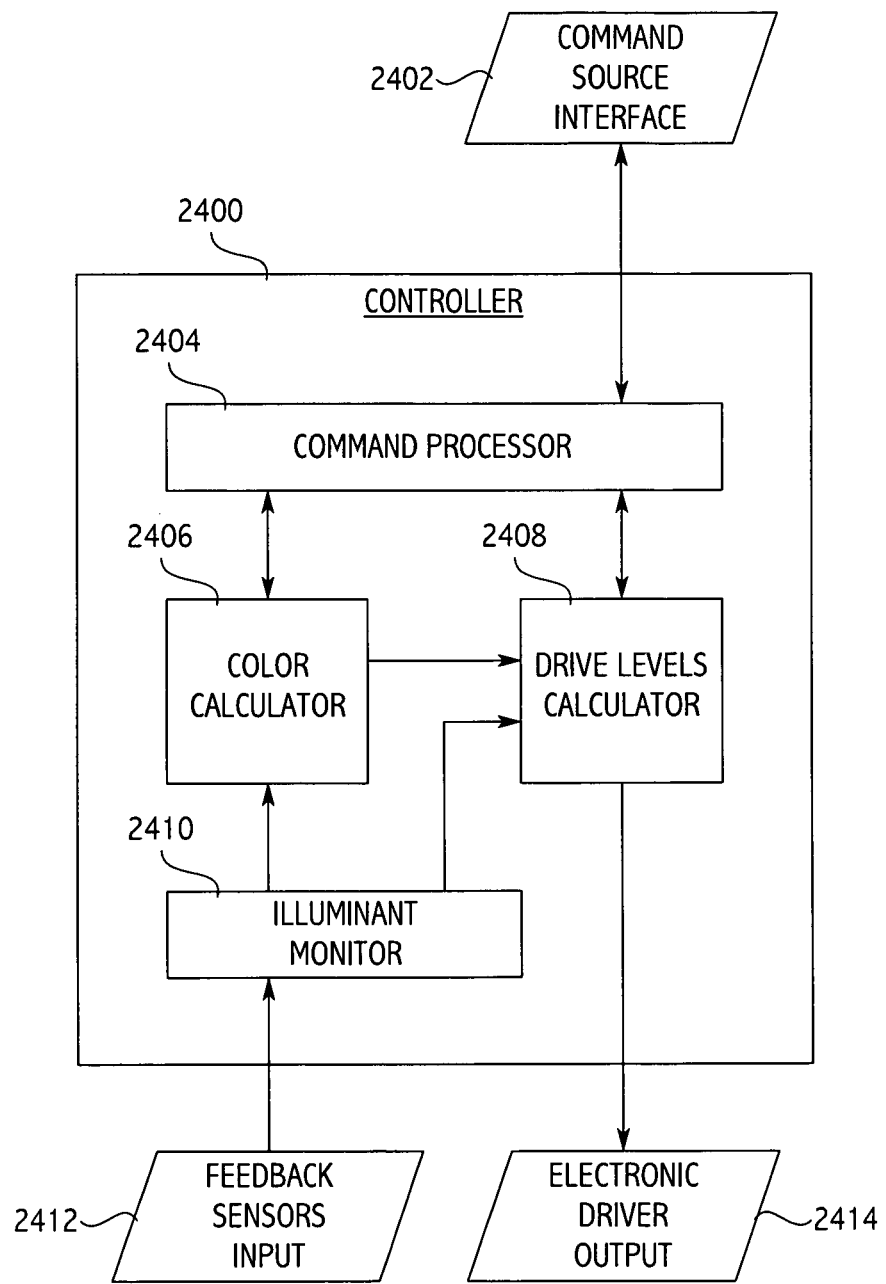
FIG. 24 is a block diagram illustrating an embodiment of a system capable of optimized color generation using multiple illuminant types.

FIG. 24 is a block diagram illustrating an embodiment of a system capable of optimized color generation using multiple illuminant types. In some embodiments, FIG. 24 is used to implement elements of FIG. 23 (e.g., controller 2400 is used to implement controller 2304). In the example shown, Controller 2400 is connected to Command Source Interface 2402, optional Feedback Sensors input 2412, and Electronic Driver Output 2414. Command processor 2404 is responsible for receiving commands from, and optionally providing indications to, an external command source using command source interface 2402. Commands pertaining to any aspect of color are routed to color calculator 2406, while commands controlling desired intensity are routed to drive levels calculator 2408. Color indications (e.g. desired color out of gamut, illuminant status, desired color efficiency, spectral selection efficiency, etc.) are optionally obtained from color calculator 2406 and routed back through command source interface 2402. Luminous intensity indications (e.g. desired color output and efficiency, spectral selection efficiency, etc.) are optionally obtained from drive levels calculator 2408 and routed back through command source interface 2402. Color calculator 2406 obtains illuminant specifications from illuminant monitor 2410 and maintains its tables accordingly. Necessary illuminant proportions for current illuminant specifications and current desired color are provided to drive levels calculator 2408. Drive levels calculator 2408 uses illuminant proportion information from color calculator 2406 along with illuminant intensity and illuminant linearity information from illuminant monitor 2410 to determine actual output level information routed through electronic driver output 2414. Optional feedback sensors input 2412 is connected to sensors monitoring any combination of light source intensity, light source chromaticity, age, temperature, power consumption, usage, etc. Illuminant monitor 2410 obtains information from feedback sensors enabling it to provide accurate illuminant specifications to color calculator 2406 and drive levels calculator 2408. In some embodiments, drive levels calculator 2408 outputs a set of output levels where the set comprises an output level for each illuminant type of a set of illuminant types. In some embodiments, the set of illuminant types comprises a subset of all illuminant types. In some embodiments, the set of output levels includes some output levels that are zero indicating that an illuminant type is not on.

In various embodiments, controller 2400 is implemented using a microprocessor, a microcontroller, a PLD, an FPGA, an ASIC, a DSP, discrete logic, or any other appropriate computational hardware in any combination. In some embodiments, controller 2400 uses special purpose accelerator hardware. In some embodiments, controller 2400 is implemented as a software process within a larger system with one or more processors and/or potentially with one or more virtualized systems. In some embodiments, controller 2400 processes multiple color channels for multiple sets of light sources simultaneously. In some embodiments, controller 2400 is connected to a physical user interface consisting of indicator lights, knobs, switches, displays, and other control panel elements in any combination. In some embodiments, controller 2400 employs fixed-point arithmetic. In some embodiments, controller 2400 employs floating-point arithmetic. In some embodiments, controller 2400 employs integer arithmetic. In various embodiments, command source interface 2402 is implemented as Ethernet, wireless Ethernet, lighting protocol Digital MultipleXed (DMX), wireless DMX, Remote Device Management (RDM), Universal Serial Bus (USB), Bluetooth, Firewire, Digital Visual Interface (DVI), High Definition Multimedia Interface (HDMI), or any other appropriate communications protocol. In some embodiments, feedback sensors input 2412 comprises a connection to a separate external light-measuring device. In various embodiments, the connection to the separate external light-measuring device comprises a wireless connection, a wired connection, USB, Bluetooth, or any other appropriate connection.

In some embodiments, command processor 2404 provides an Hyper Text Markup Language (HTML) interface. In various embodiments, command processor 2404 accepts desired color specification in diverse formats including: CIE XYZ, xyY, CIE LUV, CIE LAB, RGB, sRGB, HSV, CMYK, YCbCr, xvYCC, and any other appropriate color encodings or color spaces. In some embodiments, command processor 2404 is associated with multiple color calculators. In some embodiments, command processor 2404 processes color for a video stream transferred through command source interface 2402. In some embodiments, command processor 2404 processes color for image data transferred through command source 2402. In some embodiments, command processor 2404 responds to color translation requests with corresponding necessary illuminant combinations through command source interface 2402. In some embodiments, command processor 2404 pre-calculates a cache of chromaticity translations and stores them in a lookup table, allowing subsequent color translations to occur very quickly. In some embodiments, color translations using the lookup table interpolate the entries in the lookup table for increased translation accuracy. In various embodiments, the pre-calculated cache is recalculated as necessary according to illuminant changes, user preference changes, or any other appropriate trigger for recalculation of the cache. In some embodiments, the pre-calculated cache is recalculated at intervals when it is not visually apparent (e.g. when a display is dark or a luminaire is turned off.)

In some embodiments, illuminant monitor 2410 originates change information to color calculator 2406 and/or drive levels calculator 2408. In some embodiments, illuminant monitor 2410 responds to information queries from color calculator 2406 or drive levels calculator 2408. In some embodiments, illuminant monitor 2410 actively polls for changes via feedback sensors input 2412. In some embodiments, illuminant monitor 2410 stores pre-programmed information concerning illuminant specifications. In some embodiments, the pre-programmed information is determined during manufacture. In some embodiments, the pre-programmed information is selectable from among a plurality of data sets each associated with a defined set of illuminants.

Figure 25:
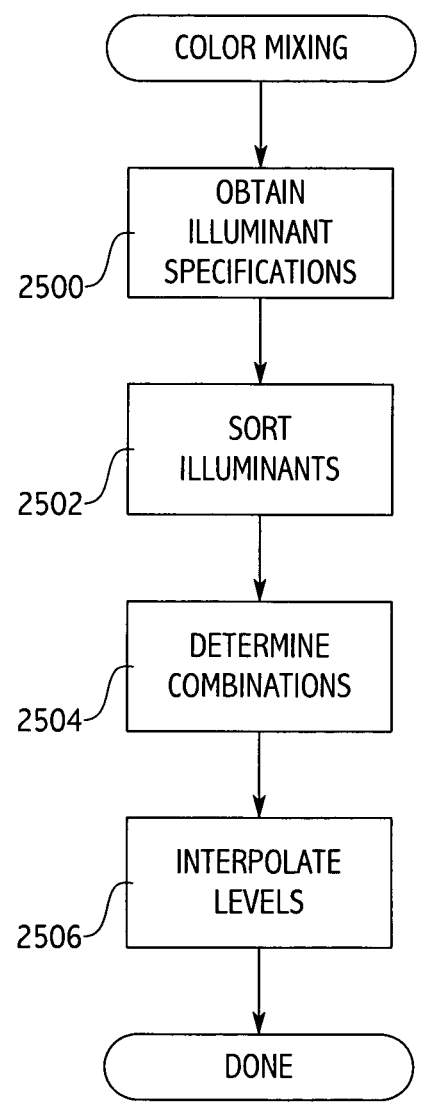
FIG. 25 is a flow chart illustrating an embodiment of a process for generating a colored light through color mixing.

FIG. 25 is a flow chart illustrating an embodiment of a process for generating a colored light through color mixing. In some embodiments, the process of FIG. 25 is executed using controller 2400 of FIG. 24. In the example shown, in 2500 illuminant type specifications are obtained. For example, illuminant type specifications are obtained that include tristimulus values or chromaticity coordinates and intensity information. In 2502, illuminants are sorted. For example, illuminants are sorted into a circular order by hue angle. In 2504, combinations are determined. For example, combinations of adjacent illuminant types in the circular order are determined and their chromaticity coordinates calculated. In 2506, levels are interpolated. For example, a desired color chromaticity coordinates (e.g., a desired color for the luminaire to produce) are used to interpolate illuminant type drive levels using the determined combinations, yielding a drive level set having drive levels for each illuminant type. This completes the color mixing process.

FIG. 26A is a table illustrating an embodiment of a chromaticity data structure useful for color mixing calculations. In the example shown, abscissa x and ordinate y identify a chromaticity coordinate in a predetermined color space, independent of intensity.

FIG. 26B is a table illustrating an embodiment of a tristimulus data structure useful for color mixing calculations. In the example shown, fields X, Y, and Z refer to amounts of three primary colors associated with color perception. In some embodiments, the values in the table correspond to RGB primary colors. In some embodiments, the values in the table correspond to the CIE XYZ color space. In some embodiments, the values in the table correspond to other color spaces, which, for example, are associated with the color capabilities of a particular optical device such as a video camera.

FIG. 27A is a table illustrating an embodiment of a vertex data structure used for color mixing. In the example shown, bitmap MAP is a set of bits, each corresponding to an illuminant type. Tristimulus TSV is calculated from the combination of illuminant types represented by MAP.

FIG. 27B is a table illustrating an embodiment of a facet data structure used for color mixing. In the example shown, vertex indices V1, V2, and V3 each refer to a vertex data structure associated with a control surface. Matrix XLATE is calculated from the tristimulus values of these vertex data structures.

FIG. 27C is a table illustrating an embodiment of a color calculator state data structure used to store predetermined and calculated data for a color-mixing device and its control surfaces. In the example shown, illuminant count N is the number of illuminant types to be mixed. Chromaticity array GAMUT tracks the range of possible chromaticity within the predetermined color space. Luminous intensity array LINT stores a luminous intensity value for each illuminant type, used to calculate the total luminous intensity for a given generated color. Vertex CENTER stores information concerning the center of the control space, having rank-N. Vertex array VERTS stores information for the other vertices in the control space. Percent array LEVELS stores level information used during interpolation.

FIG. 28A is a table illustrating an embodiment of an illuminant status data structure used to store measured illuminant type characteristics of a color-mixing device. In the example shown, tristimulus array ILLUMINANTS includes non-normalized tristimulus values for each illuminant type, thus having both chromaticity and intensity information. Percent array LINEARIZER includes a set of correction factors between drive level and optical output level, allowing correction of any non-linearity in the electronic driver or illuminants.

FIG. 28B is a table illustrating an embodiment of a command data structure for a color-mixing device. In the example shown, chromaticity C specifies a desired color. Intensity I specifies the desired intensity as a percentage of the possible maximum. Optional percent array SPECTRAL specifies a desired spectral power distribution adjustment allowing specific illuminant types or specific areas of the visual spectrum to be partially or entirely suppressed from the generated color, thus producing alternative metamers.

FIG. 28C is a table illustrating an embodiment of a drive level set data structure used to communicate drive level information to an electronic driver controlling illuminant intensity. In the example shown, percent array DRIVES contains a drive level for each illuminant type.

Figure 29:
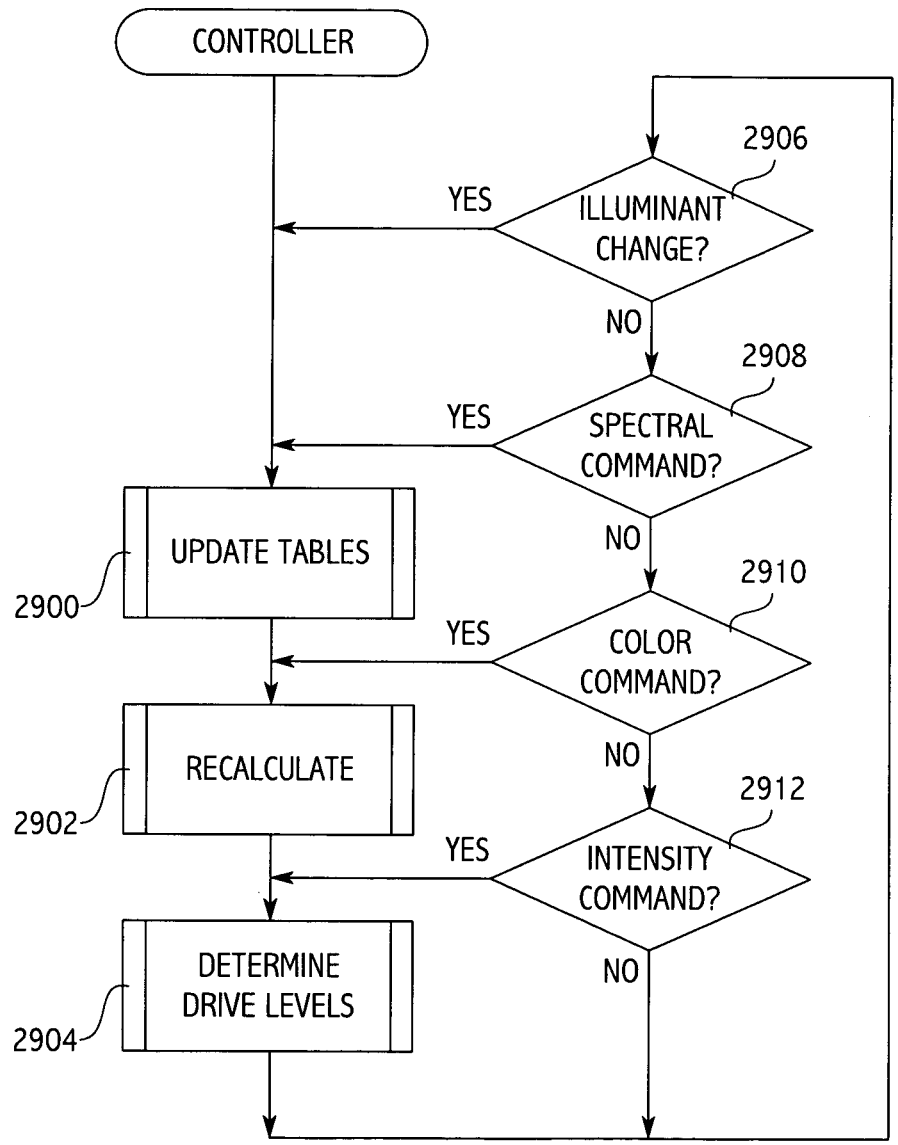
FIG. 29 is a flow chart illustrating an embodiment of a process for generating colored light.

FIG. 29 is a flow chart illustrating an embodiment of a process for generating colored light. In the example shown, an infinite loop responds to commands and changes to controller inputs. In 2900, tables are updated. For example, specified illuminant type information is used to generate tables for illuminant type combinations and their vertex coordinates. In 2902, the process recalculates. For example, a desired color is used to calculate necessary proportional illuminant type intensity levels using interpolation. In 2904, drive levels are determined. For example, drive levels are calculated using proportional levels adjusted for desired intensity and illuminant type drive linearity. In 2906, it is determined whether an illuminant changes. For example, it is determined whether an illuminant changes because an illuminant change causes all data structures to be reinitialized. In some embodiments, only data structures actually affected by the change are reinitialized. In some embodiments, the illuminant change is in response to feedback sensor data. In some embodiments, the illuminant change is in response to operator-provided data. In 2908, it is determined whether the command is a spectral command. For example, a command that is associated with a change in desired spectral power distribution that allows selection of alternate metamers, causing all data structures to be reinitialized. In some embodiments, only data structures actually affected by the change are reinitialized. In 2910, it is determined whether the command is a color command. For example, a command that is associated with a change in desired color that causes proportional levels and the drive level set to be recalculated, but does not require tables to be updated. In 2912, it is determined whether the command is an intensity command. For example, a command that is associated with a change in desired intensity that causes the drive level set to be recalculated, but does not require tables to be updated nor proportional levels to be recalculated.

Figure 30:
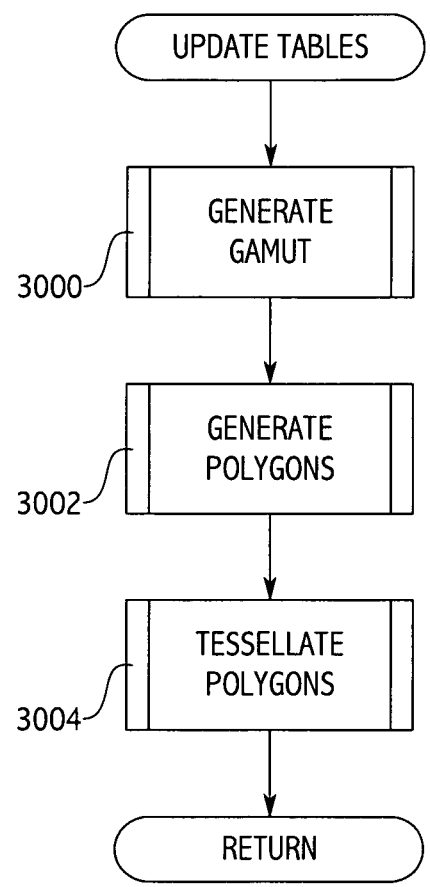
FIG. 30 is a flow chart illustrating an embodiment of a process for updating tables.

FIG. 30 is a flow chart illustrating an embodiment of a process for updating tables. In some embodiments, the flow of FIG. 30 is used to implement 2900 of FIG. 29. In the example shown, in 3000 a gamut is generated. For example the gamut is generated by calculating the xy chromaticity of each illuminant type. In 3002, the polygons are generated. For example, polygons of each different rank are generated by making appropriate combinations of illuminant types and calculating the resulting chromaticity coordinates. In 3004, the polygons are tessellated. For example, the polygons are tessellated to facilitate subsequent interpolation.

Figure 31:
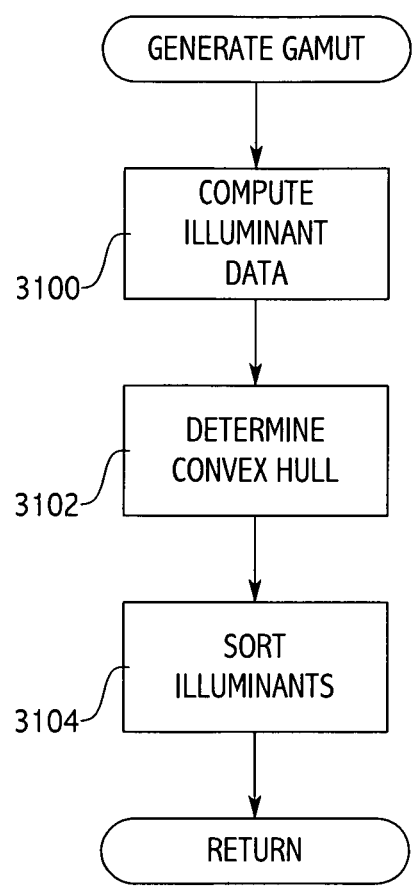
FIG. 31 is a flow chart illustrating an embodiment of a process for generating a gamut.

FIG. 31 is a flow chart illustrating an embodiment of a process for generating a gamut. In some embodiments, the flow of FIG. 31 is used to implement 3000 of FIG. 30. In the example shown, in 3100 illuminant data is computed. For example, the chromaticity and intensity of each illuminant type is calculated from the non-normalized tristimulus values. In some embodiments, chromaticity and intensity are specified directly instead of being calculated. In 3102, a convex hull is determined. For example, the convex hull of the chromaticity coordinates of the illuminant types is determined and a desaturated illuminant, if present, is set aside. In 3104, illuminants are sorted. For example, the illuminants are ordered into a counter-clockwise circular order by hue angle. In some embodiments, the winding order is clockwise.

Figure 32:
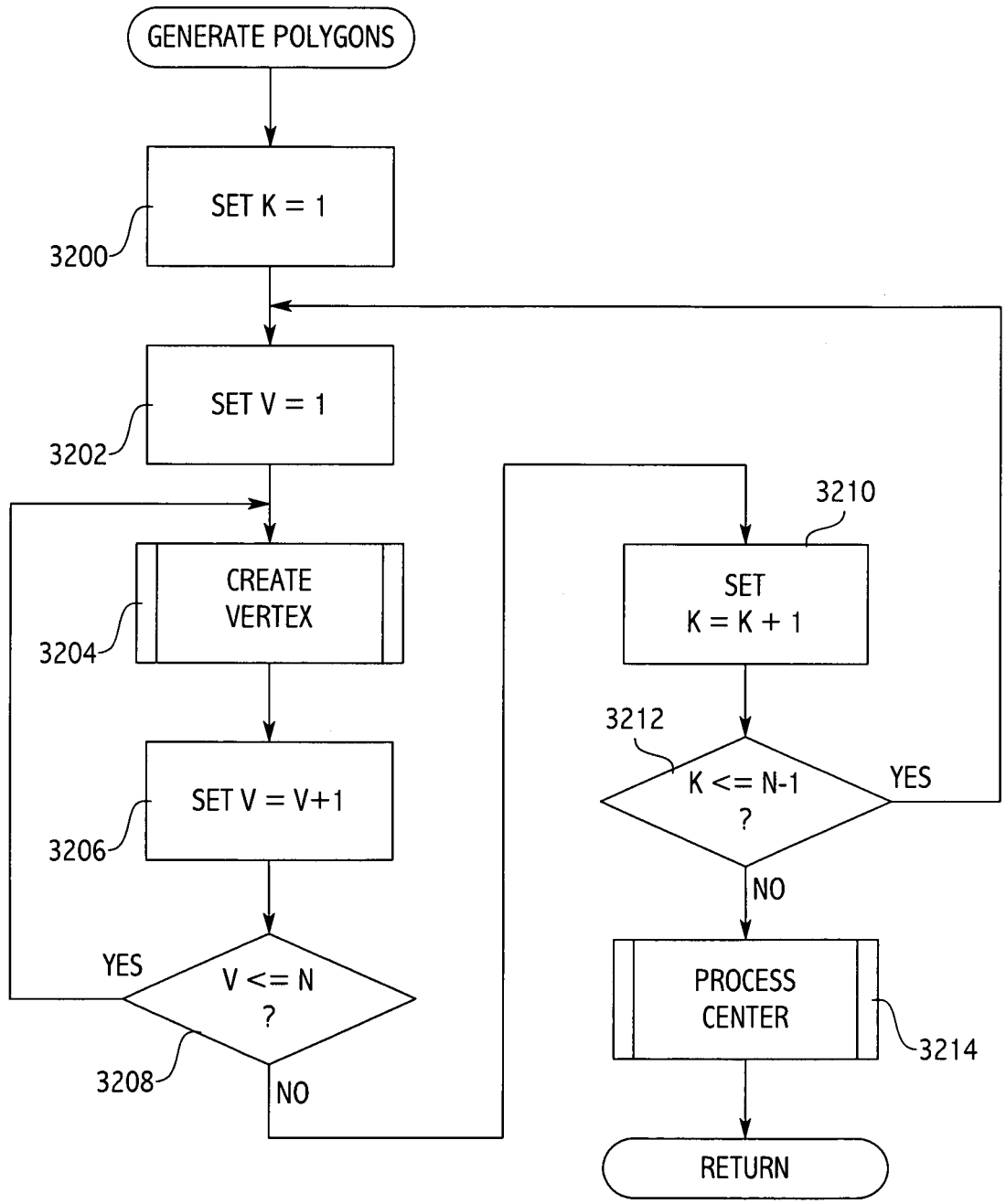
FIG. 32 is a flow chart illustrating an embodiment of a process for generating polygons for a control surface.

FIG. 32 is a flow chart illustrating an embodiment of a process for generating polygons for a control surface. In some embodiments, the process of FIG. 32 is used to implement 3002 of FIG. 30. In the example shown, the process iterates through each vertex of each rank, determining the appropriate illuminant type combinations and calculating their aggregate chromaticity coordinates. For N illuminant types the control surface contains N−1 polygons with a total of N(N−1) vertices. The vertex array stores in order from outermost rank to innermost excluding the center, and within each rank according to the illuminant type circular order. Variable K holds the numerical rank of the polygon currently being generated while variable V holds the numerical index of the current vertex within the current rank. In 3200, K is set equal to 1. For example, K is initialized to the outermost rank 1. In 3202, V is set equal to 1. For example, V is initialized to a first vertex in the illuminant type circular order. In some embodiments, this is the illuminant type with the longest wavelength. In 3204, a vertex is created. For example, a new vertex is created and added to the vertex array. In 3206, V is set to equal V+1. For example, V is incremented to correspond to the next vertex. In 3208, it is determined whether V is less than or equal to N. For example, the vertices continue to be created for the current rank until the polygon is complete. In the event that V is less than or equal to N, control passes to 3204. In the event that V is not less than or equal to N, in 3210 K is set to equal K+1. For example, K is incremented to correspond to the next rank. In 3212, it is determined whether K is less than or equal to N−1. For example, K ranks continue to be created until the control surface is complete. In the event that K is less than or equal to N−1, control passes to 3202. In the even that K is not less than or equal to N−1, in 3214 the center is processed. For example, the center vertex is created to complete the generating polygon process.

Figure 33:
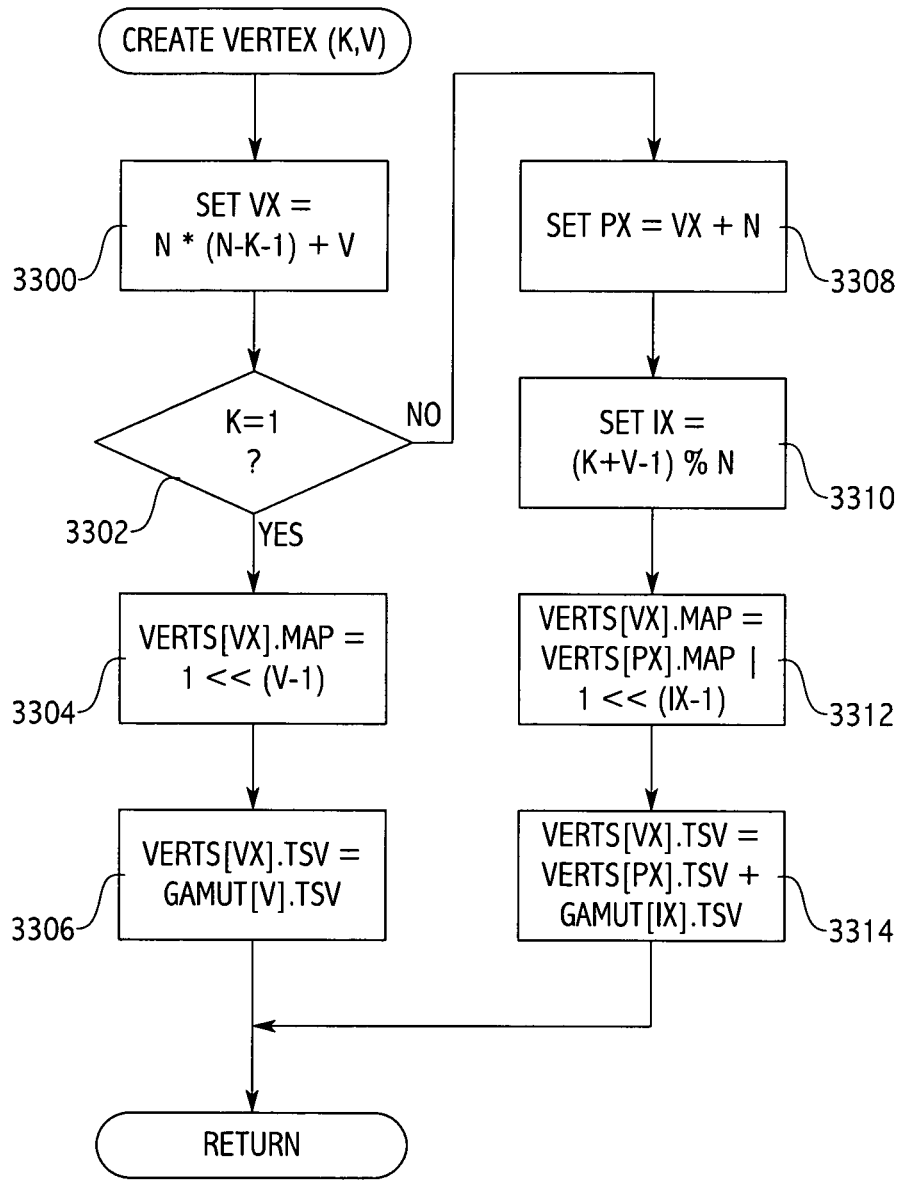
FIG. 33 is a flow chart illustrating an embodiment of a process for creating a color-space-specific vertex for a control surface.

FIG. 33 is a flow chart illustrating an embodiment of a process for creating a color-space-specific vertex for a control surface. In some embodiments, the process of FIG. 33 is used to implement 3204 of FIG. 32. In the example shown, the vertex to be created is specified in terms of rank K, which ranges from 1 at the control surface perimeter towards N at the center; and index within the rank V, which ranges from 1 through N. This process is not executed for the center vertex. In 3300, VX is set equal to N*(N−K−1)+V. For example, VX is calculated to be the index of the vertex being created in the control space array of vertices. In 3302, it is determined whether K is equal to 1. For example, the special case of outermost rank-1 is detected for special handling. In the event that K is equal to 1, control passes to 3304. In the event that K is not equal to 1, control passes to 3308. In 3304, VERTS[VX].MAP is set equal to 1<<(V−1), where << is the binary left-shift operator. For example, rank-1 bitmap MAP is calculated by shifting 1 to the left V−1 places. In 3306, VERTS[VX].TSV is set equal to GAMUT[V].TSV. For example, the vertex tristimulus value is copied from the gamut array directly because the vertex corresponds to only a single illuminant type. In 3308, PX is set. equal to VX+N. For example, PX is calculated to be the index of the already-created vertex in the next lower rank polygon to which the current vertex adds a new adjacent illuminant type. In 3310, IX is set equal to (K+V−1) % N, where % is the modulo operator. For example, IX is calculated to be the index of the new illuminant type. In 3312, VERTS[VX].MAP is set equal to VERTS[PX].MAP|1<<(IX−1), where | is the bitwise-or operator. For example, current vertex bitmap is calculated by adding the bit corresponding to the new illuminant type to the bitmap of the already-created vertex. In 3314, VERTS[VX].TSV is set equal to VERTS[PX].TSV+GAMUT[IX].TSV. For example, the current tristimulus value is calculated by adding new illuminant type to the combination calculated for the already-existing vertex. In this example tristimulus values are pre-scaled according to their intensity.

Figure 34:
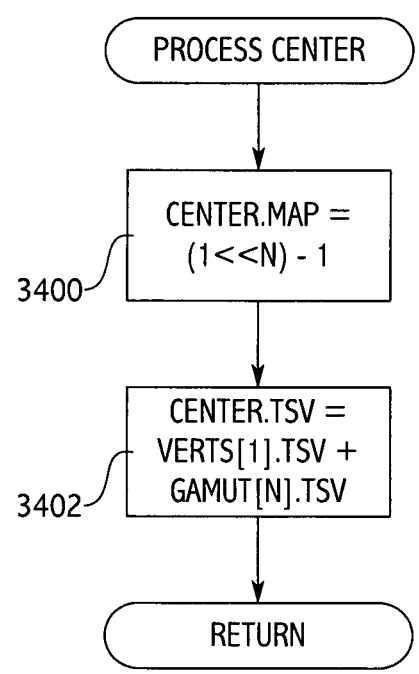
FIG. 34 is a flow chart illustrating an embodiment of a process for processing a color-space-specific center vertex for a control surface.

FIG. 34 is a flow chart illustrating an embodiment of a process for processing a color-space-specific center vertex for a control surface. In some embodiments, the process of FIG. 34 is used to implement 3214 of FIG. 32. In the example shown, in 3400, CENTER.MAP is set equal to (1<<N)−1. For example, bits for all illuminant types are set to 1. In 3402, CENTER.TSV is set equal to VERTS[1].TSV+GAMUT[N].TSV. For example, the tristimulus value of the already-created vertex having a combination of all illuminant types but the last is added to that of the last illuminant type, resulting in the tristimulus value for all illuminant types at full.

Figure 35:
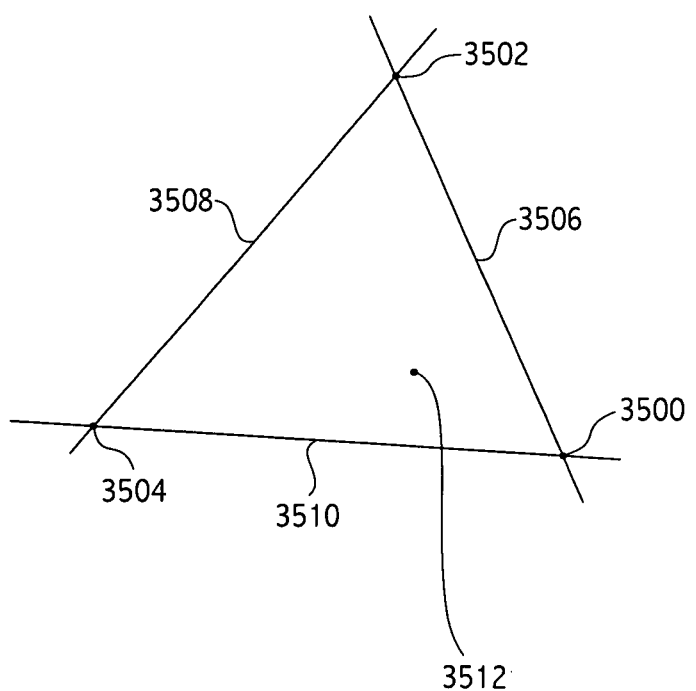
FIG. 35 is a diagram illustrating an embodiment of a facet for a control surface.

FIG. 35 is a diagram illustrating an embodiment of a facet for a control surface. In the example shown, the facet is defined by vertices 3500, 3502, and 3504. Tessellation lines 3506, 3508, and 3510 are drawn for an interior facet not at the perimeter of the control space gamut. Each vertex comprises a tristimulus value with (X,Y,Z) components. An interpolated tristimulus value is obtained for representative point 3512 by interpolating its tristimulus value within the facet using the tristimulus values of the vertices. Interpolating at a vertex results in the tristimulus value of the vertex. Interpolating on the line between two vertices results in a tristimulus value intermediate between those of the two vertices. Interpolating elsewhere in the facet generates a result intermediate among those of all three vertices. If the vertices are ordered with 3500 first, 3502 second, and 3504 third then the winding order is counter-clockwise and the (X,Y,Z) components of the tristimulus result of the interpolation are positive by the right-hand rule. If the winding order is clockwise then the components are negative. If a specified point is not within the facet then some components will be positive and some will be negative, in which case the facet is not useful for interpolating that point.

Figure 36:
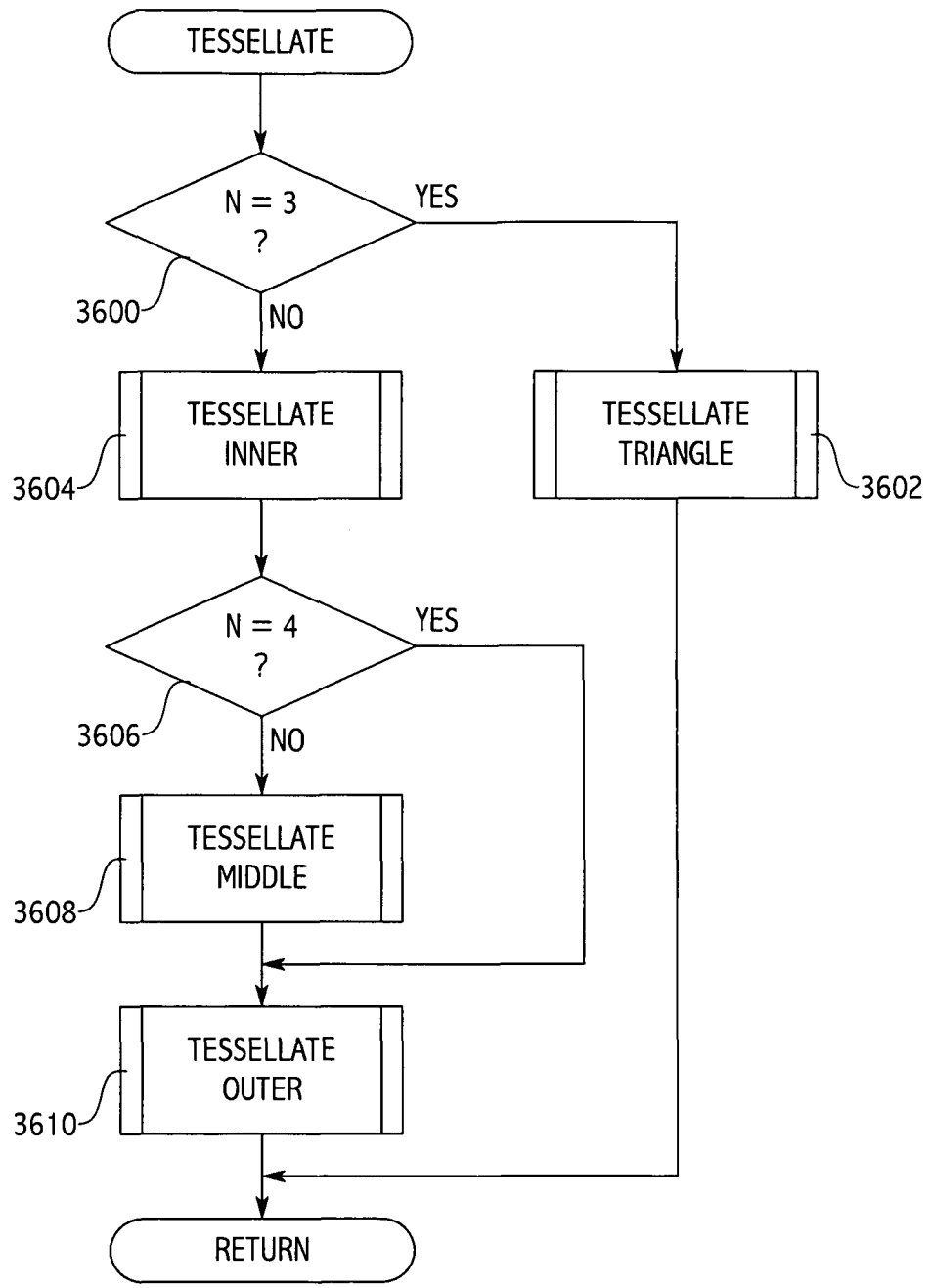
FIG. 36 is a flow chart illustrating an embodiment of a process for tessellating control surface polygons.

FIG. 36 is a flow chart illustrating an embodiment of a process for tessellating control surface polygons. In some embodiments, the process of FIG. 36 is used to implement 3004 of FIG. 30. In the example shown, in 3600, it is determined whether N is equal to 3. For example, the special case of three illuminant types is detected for special handling. In the event that N is not equal to 3, then control passes to 3604. In the event that N is equal to 3, in 3602 the triangle is tessellated. In 3604, inner tessellation is performed. For example, the region between the center point and the innermost polygonal rank N−1 is tessellated. In 3606, it is determined whether N is equal to 4. For example, control spaces of four illuminant types, which have no middle region, are detected. In the event that N is equal to 4, control passes to 3610. In the event that N is not equal to 4, in 3608 middle tessellation is performed. For example, middle ranks are tessellated for control spaces of five or more illuminant types. In 3610, outer tessellation is performed. For example, the region between rank-1 and rank-3 is tessellated, accommodating the presence of desaturated illuminants. The outer region is special because vertices of rank-2 polygons are coincident with edges of rank-1 polygons.

Figure 37:
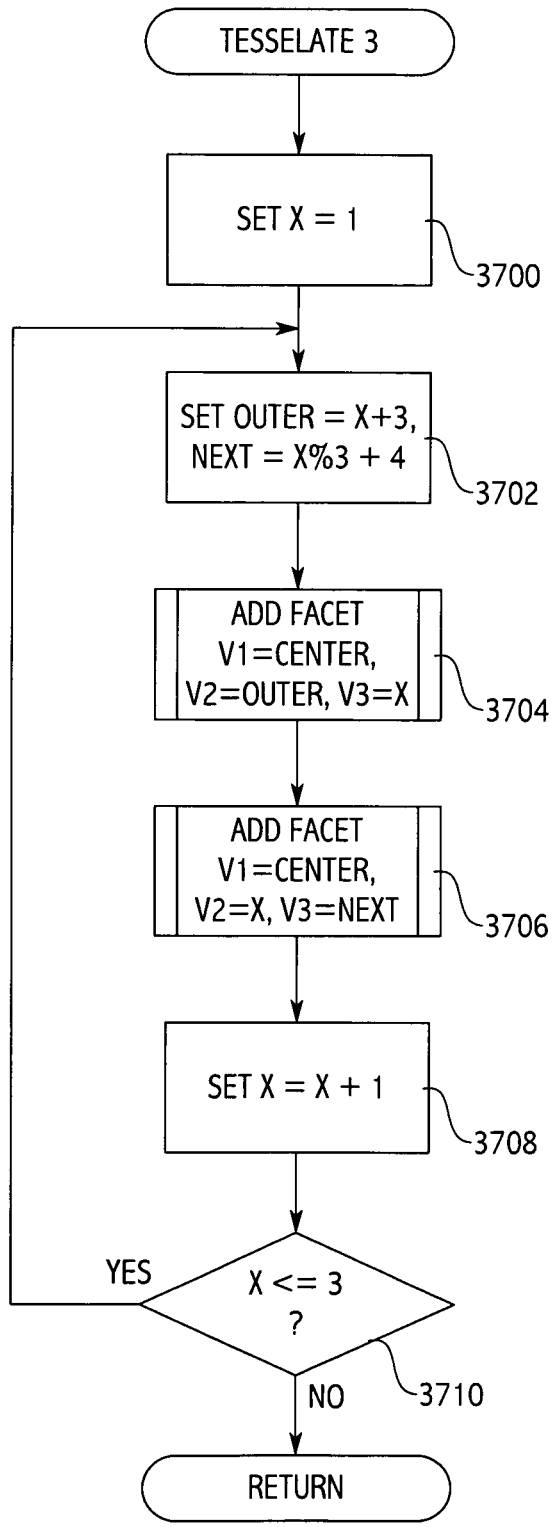
FIG. 37 is a flow chart illustrating an embodiment of a process for tessellating a control space with three illuminant types.

FIG. 37 is a flow chart illustrating an embodiment of a process for tessellating a control space with three illuminant types. In some embodiments, the process of FIG. 37 is used to implement 3602 of FIG. 36. In the example shown, each facet to be created has the center as one point, and adjacent vertices of rank-1 or rank-2 triangles as the other points. Variable X is an index into the vertex array stepping through rank-2 vertices. In 3700, X is set equal to 1. For example, X is initialized to the first vertex of rank-2. In 3702, OUTER is set equal to X−3 and NEXT is set equal to X % 3+4, where % is the modulo operator. For example, rank-1 OUTER and rank-1 NEXT vertex indices are calculated. In 3704, a facet is added with a V1 equal to CENTER, a V2 equal to OUTER, and a V3 equal to X. For example, the first of two adjacent tessellation facets are created. In 3706, a facet is added with a V1 equal to CENTER, a V2 equal to X, and a V3 equal to NEXT. For example, the second of two adjacent tessellation facets are created. In 3708, X is set equal to X+1. For example, X is advanced to the next rank-2 vertex. In 3710, it is determined whether X is less than or equal to 3. For example, the process ends when all rank-2 vertices have been processed. In the event that X is less than or equal to 3, control passes to 3702. In the event that X is not less than or equal to 3, the process is completed.

Figure 38:
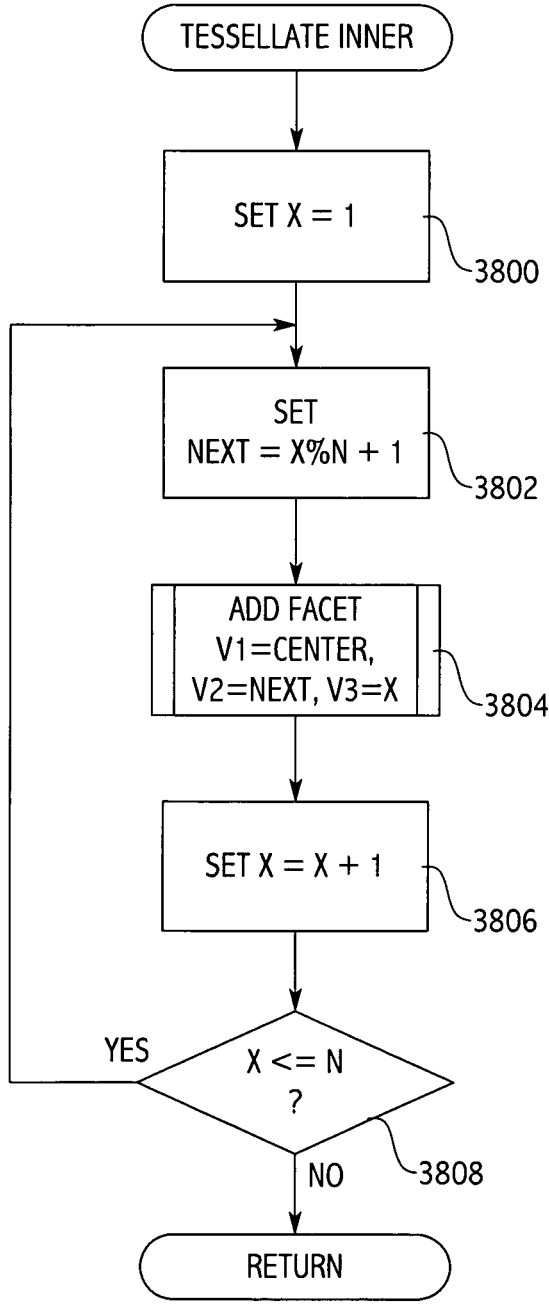
FIG. 38 is a flow chart illustrating an embodiment of a process for tessellating an inner region of a control space.

FIG. 38 is a flow chart illustrating an embodiment of a process for tessellating an inner region of a control space. In some embodiments, the process of FIG. 38 is used to implement 3604 of FIG. 36. In the example shown, the control space has 4 or more illuminants and the region being tessellated is between the center and rank N−1. Each facet to be created has the center as one point, so an outer pair of points is walked around the encompassing rank N−1 polygon, advancing by a single vertex each time. Variable X is an index into the vertex array stepping through rank N−1 vertices. In 3800, X is set equal to 1. For example, X is initialized to the first vertex of rank N−1. In 3802, vertex NEXT is set equal to X % N+1, where % is the modulo operator. For example, NEXT is a next vertex from X in the polygon. In 3804, a facet is added with a V1 equal to CENTER, a V2 equal to NEXT, and a V3 equal to X. For example, a facet corresponding to the current vertex of the rank N−1 polygon is created. In 3806, X set equal to X+1. For example, X is advanced to the next rank N−1 vertex. In 3808, it is determined whether X is less than or equal to N. For example, the process ends when all rank N−1 vertices have been processed. In the event that X is less than N, control passes to 3802. In the event that X is not less than or equal to N, the process is completed.

Figure 39:
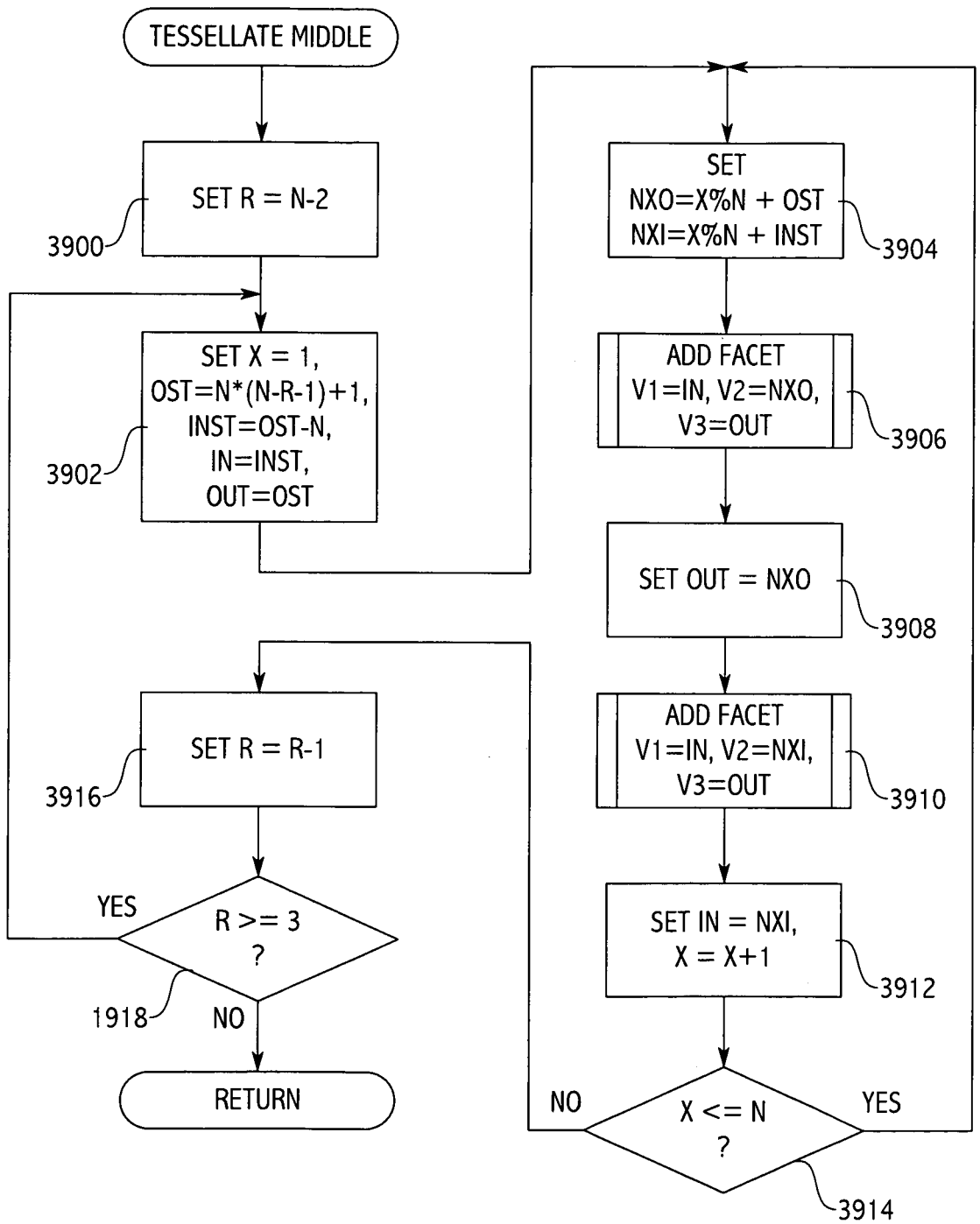
FIG. 39 is a flow chart illustrating an embodiment of a process for tessellating a middle region of a control space.

FIG. 39 is a flow chart illustrating an embodiment of a process for tessellating a middle region of a control space. In some embodiments, the process of FIG. 39 is used to implement 3608 of FIG. 36. In the example shown, the control space has 5 or more illuminants and the region being tessellated is between rank N−1 and rank 3. Starting with rank N−1 and proceeding outward to rank 3, for each adjacent pair of ranks this determines a vertex on each rank that share a facet, creates that facet, and then walks the vertices along the bordering ranks while repeatedly creating facets until the region between that pair of ranks is completely tessellated. In 3900, R is set equal to N−2. For example, R is initialized a value corresponding to rank N−2. In 3902, X is set equal to 1, OST is set equal to N*(N−R−1)+1, INST is set equal to OST-N, IN is set equal to INST, and out is set equal to OST. For example, vertex counter X is initialized to the first vertex, variable OST representing a starting vertex on the outer rank is initialized to the first vertex on that rank, variable INST is initialized to the corresponding starting vertex to OST on the inner rank, inner walking index IN is initialized to INST, and outer walking index OUT is initialized to OST. In 3904, NXO is set equal to X % N+OST and NXI is set equal to X % N+INST, where % is the modulo operator. For example, next outer index NXO and next inner index NXI are calculated from the start vertices and vertex counter X. In 3906, a facet is added with a V1 equal to IN, a V2 equal to NXO, and a V3 equal to OUT. For example, a first current tessellation facet is created with one edge along the outer rank. In 3908, OUT is set equal to NXO.

For example, outer walking index OUT is advanced to previously calculated next outer vertex NXO. In 3910, a facet is added with a V1 equal to IN, a V2 equal to NXI, and a V3 equal to OUT. For example, a second current tessellation facet is created with one edge along the inner rank. In 3912, IN is set equal to NXI and X is set equal to X+1. For example, inner walking index IN is advanced to previously calculated next inner vertex NXI and vertex counter X is advanced. In 3914, it is determined whether X is less than or equal to N. For example, the facet-creating loop terminates when the region between the current pair of ranks is completely tessellated. In the event that X is less than or equal to N, control passes to 3904. In the event than X is not less than or equal to N, in 3916 R is set equal to R−1. For example, the region being tessellated is advanced outward to the next pair of ranks. In 1918, it is determined whether R is greater than or equal to 3. For example, the rank loop is terminated when only the outermost two ranks remain. In the event that R is greater than or equal to 3, control passes to 3902. In the event that R is not greater than or equal to three, the process is completed.

Figure 40:
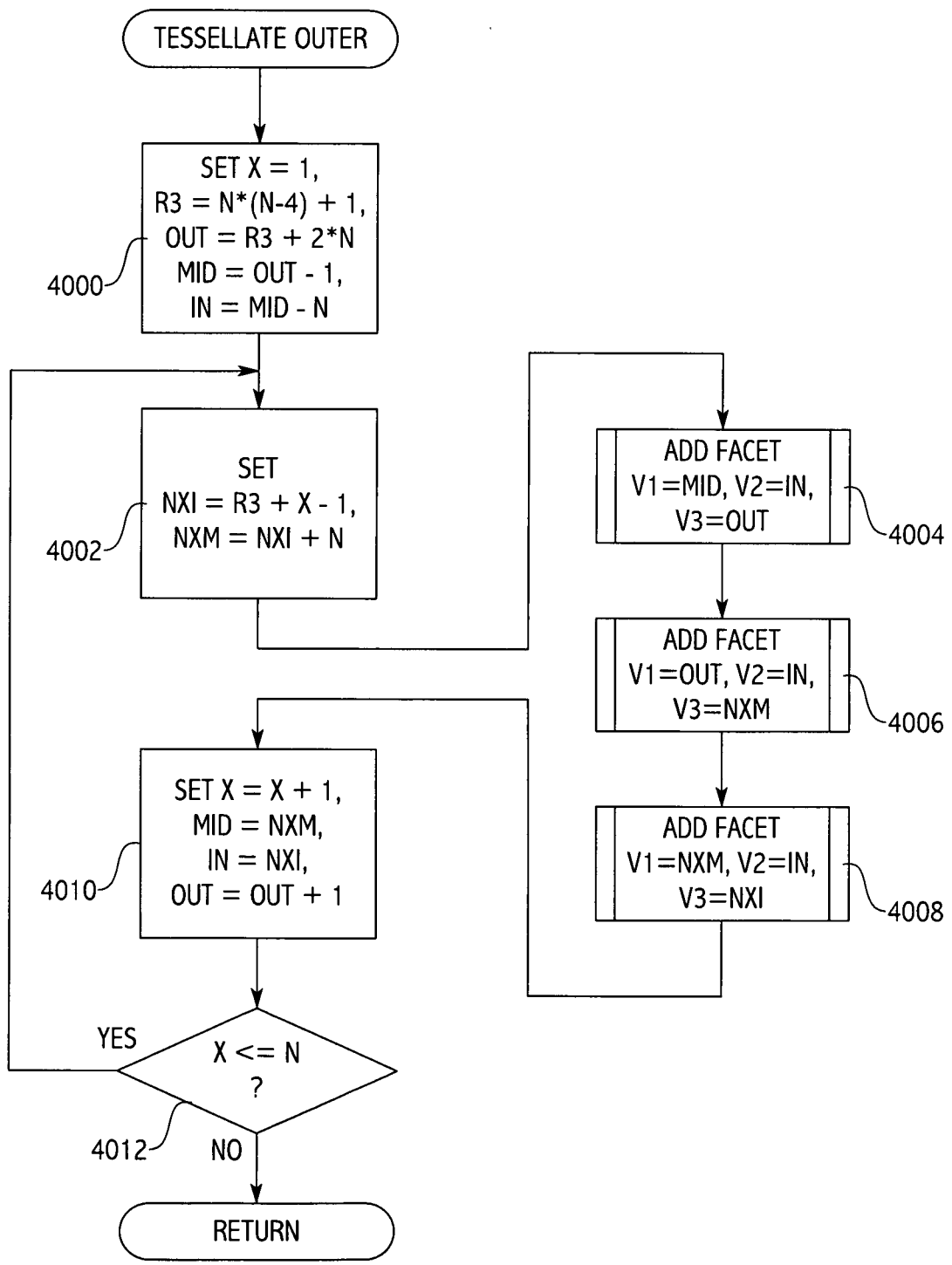
FIG. 40 is a flow chart illustrating an embodiment of a process for tessellating an outer region of a control space.

FIG. 40 is a flow chart illustrating an embodiment of a process for tessellating an outer region of a control space. In some embodiments, the process of FIG. 40 is used to implement 3610 of FIG. 36. In the example shown, the control space has four or more illuminants, the edges of the polygon of rank 2 are ignored, and tessellation occurs between the polygons of rank 1 and rank 3. While various tessellation patterns are possible, this example accommodates the presence of desaturated illuminants by allowing their intensity to be smoothly decreased towards the perimeter of the control space. Outer, middle, and inner vertex indices are walked around the region between rank 1 and rank 3, with each step creating three facets. In 4000, X is set equal to 1, R3 is set equal to N*(N−4)+1, OUT is set equal to R3+2*N, MID is set equal to OUT−1, and IN is set equal to MID-N. For example, vertex counter X is initialized, variable R3 is initialized to the first vertex of rank 3, outer walking index OUT is initialized to the first vertex of rank 1, middle walking index MID is initialized to the last vertex of rank 2, and inner walking index IN is initialized to the last vertex of rank 3. In 4002, NXI is set equal to R3+X−1 and NXM is set equal to NXI+N. For example, next inner walking index NXI is set to the current rank-3 vertex, and next middle walking index NXM is set to the current rank-2 index. In 4004, a facet is added with a V1 equal to MID, a V2 equal to IN, and a V3 equal to OUT. For example, a first facet is added. In 4006, a facet is added with a V1 equal to OUT, a V2 equal to IN, and a V3 equal to NXM. For example, a second facet is added. In 4008, a facet is added with a V1 equal to NXM, a V2 equal to IN, and a V3 equal to NXI. For example, a third facet is added. In 4010, X is set equal to X+1, MID is set equal to NXM, IN is set equal to NXI, and OUT is set equal to OUT+1. For example, vertex counter X, middle walking index MID, inner walking index IN, and outer walking index OUT are advanced. In 4012, it is determined whether X is less than or equal to N. For example, the process terminates when all facets have been created. In the event that X is less than or equal to N, control passes to 4002. In the event that X is not less than or equal to N, the process is completed.

Figure 41:
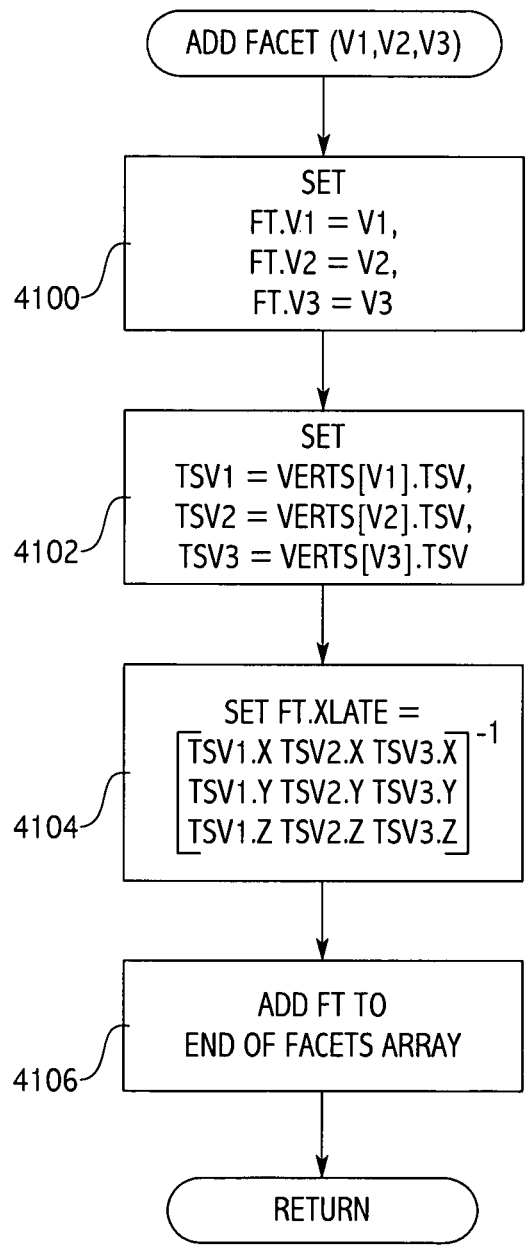
FIG. 41 is a flow chart illustrating an embodiment of a process for adding a facet to the control space facet array.

FIG. 41 is a flow chart illustrating an embodiment of a process for adding a facet to the control space facet array. In some embodiments, the process of FIG. 41 is used to implement 3704 and 3706 of FIG. 37, 3804 of FIG. 38, 3906 and 3910 of FIG. 39, and/or 4004 and 4006 and 4008 of FIG. 40. In the example shown, a facet is the state information necessary to identify three associated illuminant type combinations and interpolate among them. The faced to be added is specified in terms of vertices V1, V2, and V3. In 4100, FT.V1 is set equal to V1, FT.V2 is set equal to V2, and F5.V3 is set equal to V3. For example, current facet FT is initialized with references to the three vertices specified for the facet. In 4102, TSV1 is set equal to VERTS[V1].TSV, TSV2 is set equal to VERTS[V2].TSV, and TSV3 is set equal to VERTS[V3].TSV. For example, tristimulus values for each vertex are obtained. In 4104, FT.XLATE is set according to the following formula:

$$FT \cdot XLATE = \begin{bmatrix} TSV1 \cdot X & TSV2 \cdot X & TSV3 \cdot X \\ TSV1 \cdot Y & TSV2 \cdot Y & TSV3 \cdot Y \\ TSV1 \cdot Z & TSV2 \cdot Z & TSV3 \cdot Z \end{bmatrix}^{-1}$$

For example, current facet matrix FT.XLATE is initialized from vertex tristimulus values and inverted. In 4106, FT is added to end of FACETS array. For example, addition of FT increases a color calculator FACETS array size by one facet.

Figure 42:
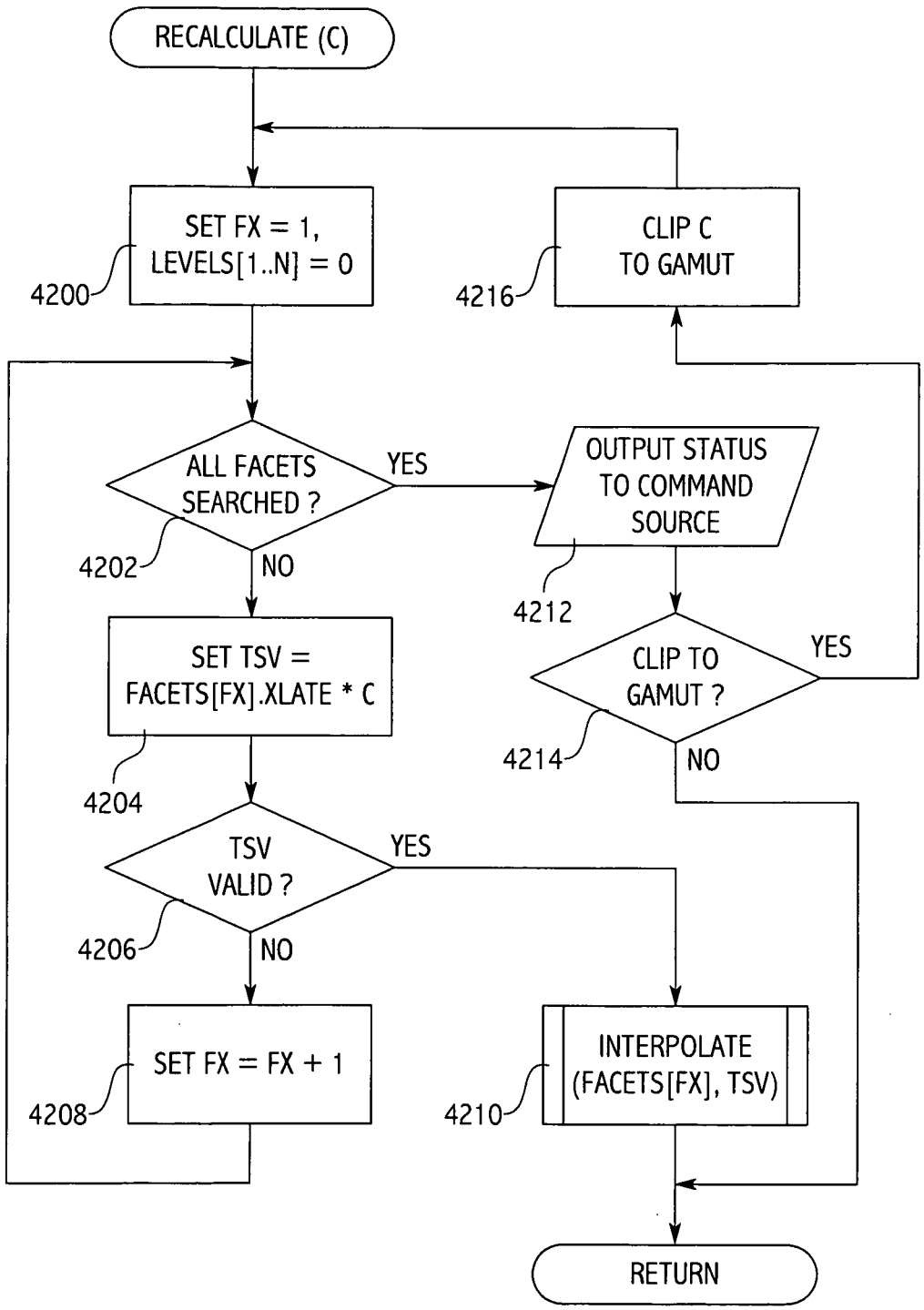
FIG. 42 is a flow chart illustrating an embodiment of a process for recalculating illuminant proportions.

FIG. 42 is a flow chart illustrating an embodiment of a process for recalculating illuminant proportions. In some embodiments, the process of FIG. 42 is used to implement 2902 of FIG. 29. In the example shown, a color calculator updates a LEVELS array according to a desired color coordinates C originating in a command. Facets in a color calculator FACETS array are searched for one enclosing C. If found LEVELS are calculated by interpolation, otherwise either the desired color is clipped to a control surface gamut or an out-of-gamut error reported. In some embodiments the desired color is always clipped to the gamut. In some embodiments the out-of-gamut behavior can be configured. In various embodiments the desired color is clipped to the gamut by clipping to a nearest point in the gamut, by desaturation using a line of constant hue to a white point, by application of a perceptual model, by any number of standard techniques in the art, or by any other means translating the desired color to one in the gamut. This example utilizes a simple linear search. In some embodiments the search is hierarchical. In some embodiments index, mapping, table, caching, or any other appropriate data structures improve search performance. In some embodiments the search is conducted in parallel. In some embodiments, the search is conducted by a special-purpose hardware processor. In some embodiments, the special-purpose hardware processor comprises an appropriately configured DSP (digital signal processor). In 4200, FX is set equal to 1 and LEVELS[1..N] are set equal to zero. For example, search index FX is initialized to FACETS array start and LEVELS array is cleared. In 4202, it is determined whether all facets have been searched. In the event that all facets have been searched, control passes to 4212. In the event that all facets have not been searched, in 4204 TSV is set equal to FACETS[FX].XLATE * C. For example, the desired color tristimulus value is matrix-multiplied by the current facet translation matrix, yielding a tristimulus interpolation value TSV. In 4206, it is determined whether TSV is valid. For example, TSV is valid if X, Y, and Z are either all positive or all negative, depending on the winding order of the facet. In the event that TSV is valid, control passes to 4210. In the event that TSV is not valid, in 4208 FX is set to FX+1 and control passes to 4202. For example, facet index FX is advanced to the next facet in array FACETS and the search loop continues. In 4210, interpolation of TSV within FACETS [FX] is performed. For example, current facet FACETS [FX] encloses the desired color located at barycentric coordinates TSV within the facet, which is interpolated by a sub-process to update LEVELS. In 4212, status is output to command source. For example, an out-of-gamut indication is reported to the command source. In some embodiments no out-of-gamut indication is reported. In 4214, it is determined whether to clip to the gamut. For example, a predetermined option value is checked to determine whether to clip to the gamut. In some embodiments clipping to gamut is a command option. In the event that clip to gamut is true, control passes to 4216. In the event that clip to gamut is false, the process is completed. For example, in some embodiments an out-of-gamut color is equivalent to all illuminants off. In 4216, desired color C is clipped to gamut and control passes to 4200. For example, the desired color C is clipped to an in-gamut color and searching begins again.

Figure 43:
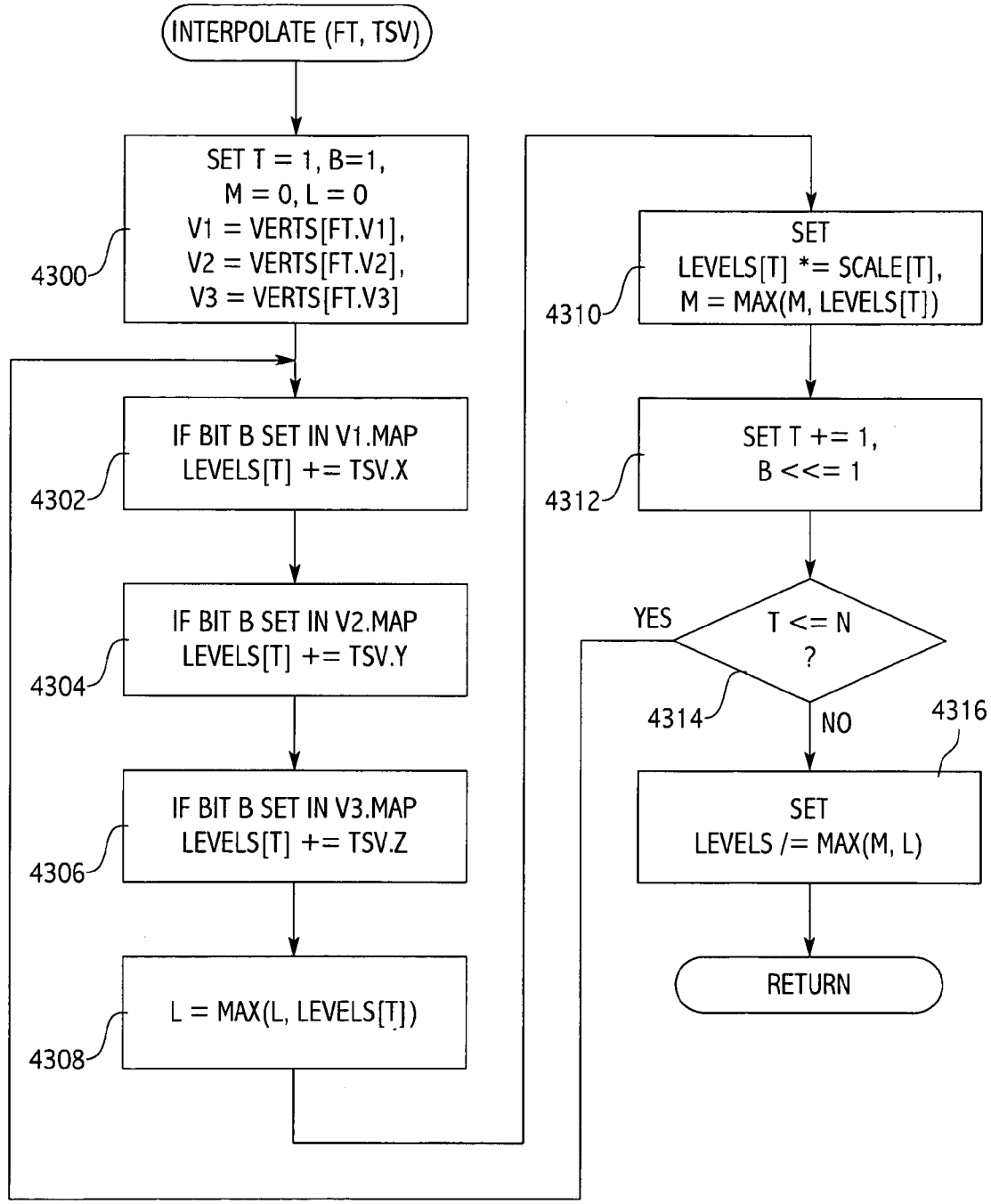
FIG. 43 is a flow chart illustrating an embodiment of a process for calculating an interpolated drive level set.

FIG. 43 is a flow chart illustrating an embodiment of a process for calculating an interpolated drive level set. In some embodiments, the process of FIG. 43 is used to implement 4210 of FIG. 42. In the example shown, interpolation is specified by barycentric coordinates TSV within facet FT. Interpolation is performed once for each illuminant type with the resulting drive levels accumulated according to illuminant types being associated with facet vertices. Accumulated drive levels are normalized so that at least one drive level is full, unless spectral scaling was specified in which case no drive level can exceed its scale level. In 4300, T is set equal to 1, B is set equal to 1, M is set equal to 0, L is set equal to 0, V1 is set equal to VERTS[FT.V1], V2 is set equal to VERTS[FT.V2], and V3 is set equal to VERTS[FT.V3]. For example, type index T, corresponding bit index B, maximum drive level M, and maximum scaled drive level L are initialized prior to the loop. In 4302, if bit B is set in V1.MAP then LEVELS [T] is increased by TSV.X. For example, TSV.X is added to the current iteration's illuminant type drive level if this illuminant type is present in the VI vertex. In 4304, if bit B is set in V2.MAP then LEVELS[T] is increased by TSV.Y. For example, TSV.Y is added to the current iteration's illuminant type drive level if this illuminant type is present in the V2 vertex. In 4306, if bit B is set in V3.MAP then LEVELS[T] is increased by TSV.Z. For example, TSV.Z is added to the current iteration's illuminant type drive level if this illuminant type is present in the V3 vertex. In 4308, L is set equal to the maximum of L and LEVELS[T]. For example, L is maintained as the maximum of all unscaled drive levels. In 4310, LEVELS[T] is multiplied by SCALE[T] and M is set equal to the maximum of M and LEVELS[T]. For example, the current illuminant type drive level is scaled and M is maintained as the maximum of all scaled drive levels. In 4312, T is incremented and B is binary-shifted-left by 1 bit. For example, index T and bitmap B are both advanced for the next illuminant type. In 4314, it is determined whether T is less than or equal to N. For example, the illuminant type loop terminates when all illuminant types have been processed. In the event that T is less than or equal to N, control passes to 4302. In the event that T is not less than or equal to N, in 4316 each element of LEVELS array is divided by the larger of M or L. For example, when no spectral scaling is requested at least one drive level is at full, having the value 1.0. When spectral scaling is employed an illuminant type drive level cannot exceed its scale value using M.

Figure 44:
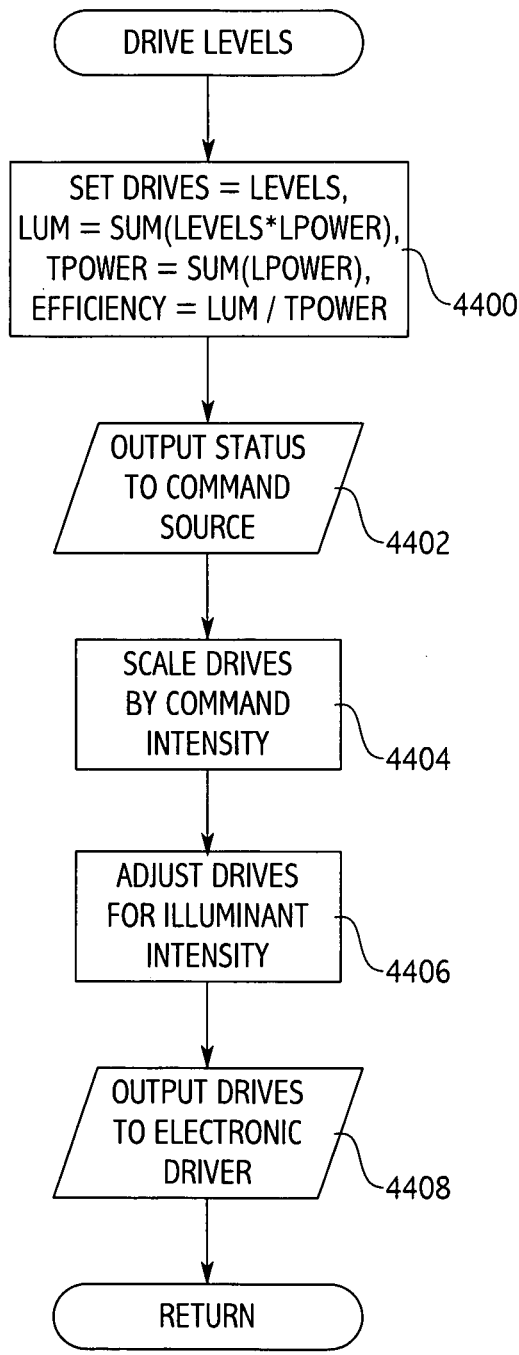
FIG. 44 is a flow chart illustrating an embodiment of a process for calculating output drive levels and illuminant utilization efficiency.

FIG. 44 is a flow chart illustrating an embodiment of a process for calculating output drive levels and illuminant utilization efficiency. In some embodiments, the process of FIG. 44 is used to implement 2904 of FIG. 29. In the example shown, a color calculator LEVELS array input to this process represents idealized proportions of illuminant type intensity, while drive levels output from this process are adjusted for commanded intensity, actual illuminant intensity, and intensity control non-linearity. In some embodiments, limited precision of electronic driver intensity control is mitigated by introducing intentional non-linearity such that low intensity is controlled with a higher precision than high intensity. Intentional non-linearity is reversed inside the electronic driver. Intentional non-linearity is sometimes referred to as gamma in the art. In some embodiments, intentional non-linearity is proportional to $d^n$ where d is the linear drive level and n is greater than one. In 4400, DRIVES is set equal to LEVELS, LUM is set equal to the sum of the elements of LEVELS*LPOWER, TPOWER is set equal to the sum of the elements of LPOWER, and EFFICIENCY is set equal to LUM/TPOWER. For example, drive level set DRIVES is initialized from previously-calculated array LEVELS, luminous output LUM for the current desired color is calculated as the sum of each illuminant type's luminous power weighted by its drive level, maximum aggregate luminous output power TPOWER is the sum of each illuminant type's luminous power, and EFFICIENCY is the ratio between LUM and TPOWER. EFFICIENCY measures how well the current metamer utilizes the illuminant types, as a percentage ranging from 0% through 100%. In 4402, status is output to command source. For example, calculated efficiency is optionally indicated to the command source. In some embodiments, other status information is also reported (e.g. total power, current power, drive levels, illuminant age, illuminant effectiveness, and any other available status information in the controller). In 4404, DRIVES is scaled by command intensity. For example, a most recently received command intensity value ranging from 0% through 100% is multiplied against each element of array DRIVES, changing intensity without changing illuminant type proportions. In 4406, DRIVES is adjusted for illuminant intensity. For example, stored controller information is used to adjust drive levels according to the difference between requested intensity and actual intensity. In some embodiments, illuminant drive levels are adjusted to maintain a constant output level despite intensity reduction due to age, temperature, usage patterns, etc. In some embodiments, illuminant drive levels are set lower than a maximum to allow subsequent increase to compensate for intensity reduction. In some embodiments, intensity control non-linearity is compensated using a lookup table, formula, or other appropriate mapping. In 4408, DRIVES is output to electronic driver. For example, DRIVES is a drive level set that uses the electronic driver to cause each illuminant to output its desired proportion of a total light of all illuminants.

Figure 45:
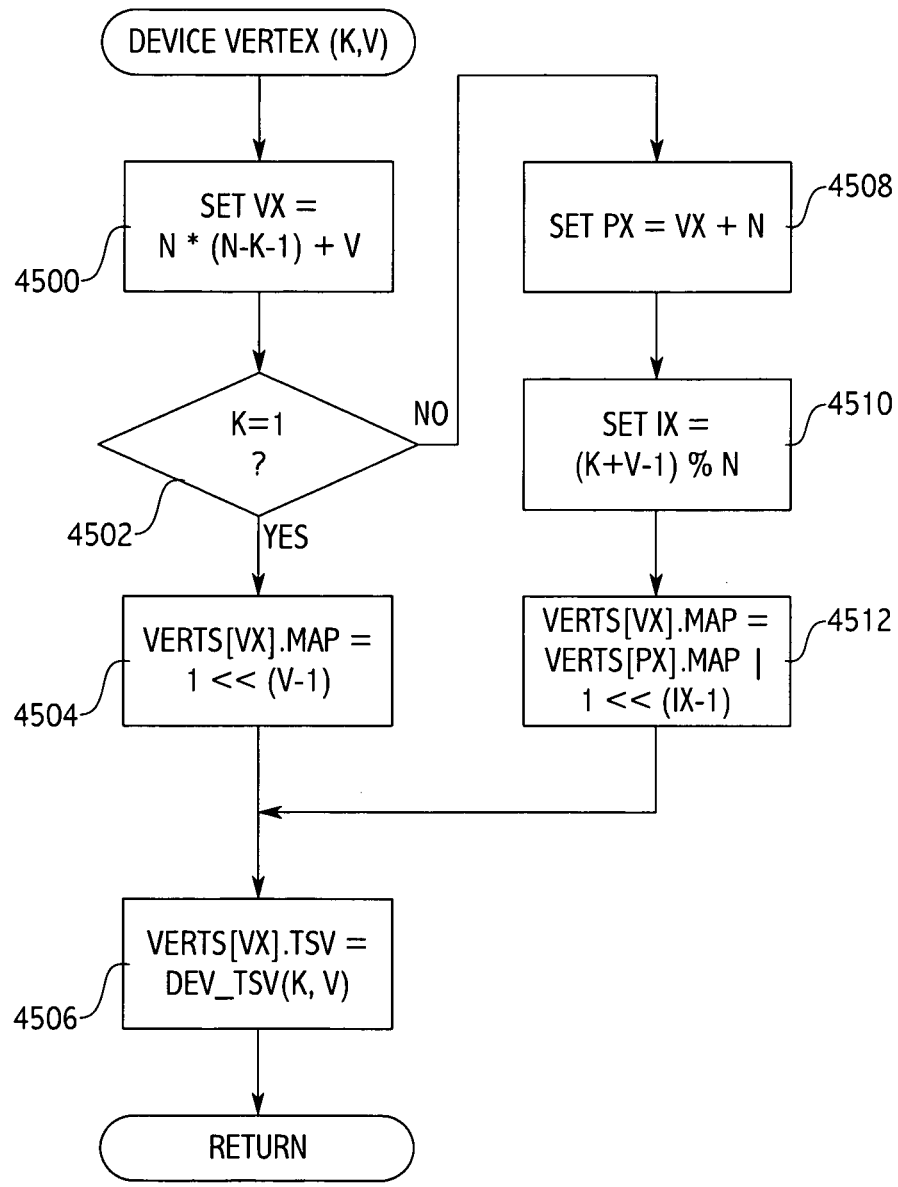
FIG. 45 is a flow chart illustrating an embodiment of a process for creating a color-space-independent vertex for a control surface.

FIG. 45 is a flow chart illustrating an embodiment of a process for creating a color-space-independent vertex for a control surface. In some embodiments, the process of FIG. 45 is used to implement 3204 of FIG. 32. In the example shown, this is an alternative embodiment to the color-space-specific process of FIG. 33. The vertex to be created is specified in terms of rank K, which ranges from 1 at the control surface perimeter towards N at the center and index within the rank V, which ranges from 1 through N. This process is not executed for the center vertex. In 4500, VX is set equal to N*(N−K−1)+V. For example, VX is calculated to be the index of the vertex being created in the control space array of vertices. In 4502, it is determined whether K is equal to 1. For example, the special case of outermost rank-1 is detected for special handling. In the event that K is equal to 1, control passes to 4504. In the event that K is not equal to 1, control passes to 4508. In 4504, VERTS[VX].MAP is set equal to 1<<(V−1), where << is the binary shift-left operator. For example, rank-1 bitmap VERTS[VX].MAP is calculated by shifting 1 to the left V−1 bits. In 4506, VERTS[VX].TSV is set equal to DEV_TSV(K,V). For example, a vertex tristimulus value is calculated by function DEV_TSV using arguments rank K and vertex V. VERTS[VX].TSV is not a traditional color space tristimulus value, but is associated with coordinates useful for a color-space-independent control surface. In some embodiments, a DEV_TSV function for rank k and vertex v is:

$$\alpha = \frac{2\pi}{N}$$

$$c = \frac{1}{2\sin\left(\frac{\alpha}{2}\right)}$$

$$p = c\cos\left(\frac{\alpha}{2}\right)$$

$$r = \begin{cases} c & k = 1 \\ p & k = 2 \\ \frac{N-k}{N-1} & k > 2 \end{cases}$$

$$\theta = \frac{\pi(2v + k - 2)}{N} - \frac{\pi}{2} + \begin{cases} 0 & k \in \{1, 3, 5 \ldots\} \\ \frac{\alpha}{2} & k \in \{2, 4, 6 \ldots\} \end{cases}$$

$$X = r\cos(\theta)$$

$$Y = r\sin(\theta)$$

$$Z = 1 - X - Y$$

where N is the number of illuminants, a is the angle between vertices, c is the circumradius, p is the apothem, (r, θ) are the polar vertex coordinates, and (X, Y, Z) are the tristimulus result. In some embodiments, the control space is centered on coordinates (0, 0). In various embodiments many other formulae are operable, requiring only that polygons of increasing rank be sequentially nested and not overlapping, though vertices of a rank-2 polygon may be coincident with edges of a rank-1 polygon. In 4508, PX is set equal to VX+N. For example, PX is calculated to be the index of the already-created vertex in the next lower rank polygon to which the current vertex adds a new adjacent illuminant type. In 4510, IX is set equal to (K+V−1) % N where % is the modulo operator. For example, IX is calculated to be the index of the new illuminant type. In 4512, VERTS[VX].MAP is set equal to VERTS[PX].MAP|1<<(IX−1), where | is the bitwise-or operator and << is the binary left-shift operator. For example, current vertex bitmap VERTS[VX].MAP is calculated by adding a bit corresponding to the new illuminant type to the bitmap of already-created vertex PX.

Figure 46:
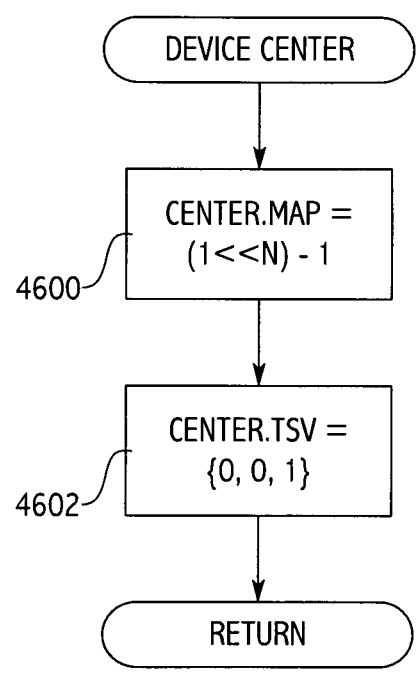
FIG. 46 is a flow chart illustrating an embodiment of a process for creating a color-space-independent center vertex for a control surface.

FIG. 46 is a flow chart illustrating an embodiment of a process for creating a color-space-independent center vertex for a control surface. In some embodiments, the process of FIG. 46 is used to implement 3214 of FIG. 32. In the example shown, this is an alternative embodiment to the color-space-specific process of FIG. 34. In 4600, CENTER.MAP is set equal to (1<<N)−1, where << is the binary left-shift operator. For example, bits for all illuminant types are set to 1. In 4602, CENTER.TSV is set to {0, 0, 1}. For example, center tristimulus value is initialized to center of coordinate plane (0, 0) with full intensity 1.0.

Figure 47:
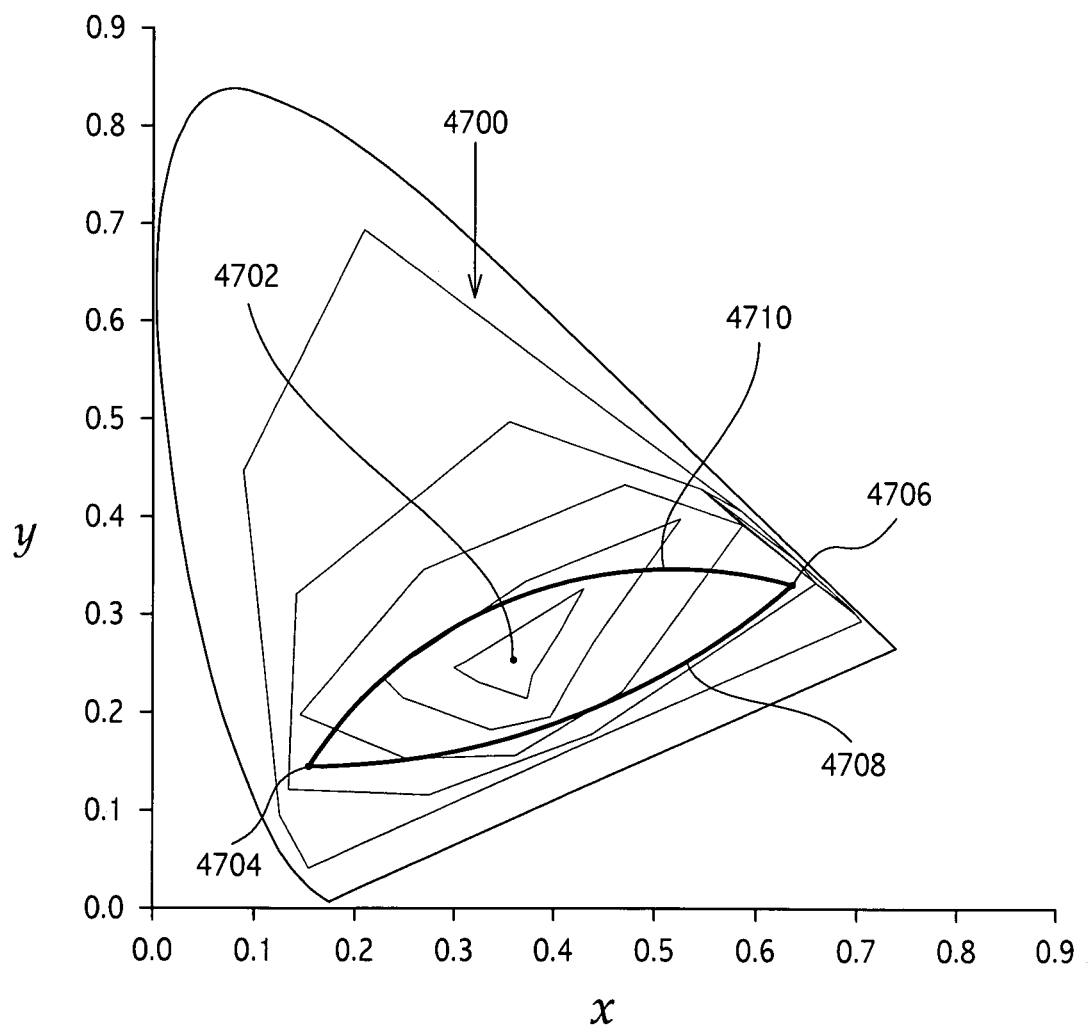
FIG. 47 is a plot illustrating an embodiment of a process for selecting a specific path when changing between two colors.

FIG. 47 is a plot illustrating an embodiment of a process for selecting a specific path when changing between two colors. In the example shown, it is desirable that a color change occurs gradually with intermediate colors being generated during the transition. Polygonal contour lines 4700 illustrate the gamut of each rank of a seven-illuminant control space (e.g., illuminants similar to that of FIG. 20). Maximum power point 4702 is the chromaticity attained with all illuminants at full. Starting chromaticity 4704 corresponds to a deep blue color. Ending chromaticity 4706 corresponds to an orange color. Two possible paths are shown drawn in bold, 4708 which transitions through various shades of purple, and 4710 which transitions through light blue to light orange. For gradual color changes the choice of intermediate colors is often important. In some embodiments, a preferred path between two saturated colors best maintains a constant saturation all along, but still leaves at least two choices since lines of constant saturation form closed curves. The maximum power point is generally to be avoided because it is so much brighter than most transition endpoints.

In some embodiments, a gradual transition is optionally selected. In some embodiments, the rate of transition is selectable. In some embodiments, the path follows a contour of constant saturation. In some embodiments, the path follows a contour of constant luminous intensity. In some embodiments, the path direction is chosen based upon the starting and ending chromaticity coordinates.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for generating a colored light, comprising:
a set of at least five illuminant types, wherein the set of at least five illuminant types is associated with a chromaticity gamut and, wherein each illuminant type of the set of at least five illuminant types is associated with a hue angle;
a processor, wherein the processor is configured to:
sort a set of at least five illuminant types into a circular order by hue angle;
determine combinations of adjacent illuminant types of the set of at least five illuminant types in the circular order;
determine, based at least in part on a mapping, an output level set for a received color coordinate, wherein the mapping comprises associating each color coordinate with an output level set having an output level for each illuminant type of the set of at least five illuminant types using the combinations, wherein the output level for each illuminant type is determined at least in part using an interpolation of at least three chromaticity coordinates, wherein each chromaticity coordinate of the at least three chromaticity coordinates is determined at least in part using an intensity for each illuminant type, wherein the intensity targets a zero intensity or a full intensity, wherein a circular ordered list of illuminant types is circularly ordered according to an illuminant type hue angle, and wherein for each chromaticity coordinate all illuminant types of the set of at least five illuminant types targeting the full intensity are adjacent in the circular ordered list and all illuminant types of the set of at least five illuminant types targeting the zero intensity are adjacent in the circular ordered list.

2. A system as in claim 1, wherein the set of at least five illuminant types comprises at least six illuminant types.

3. A system as in claim 1, wherein the output level set for the received color coordinate has an associated maximum level for at least one illuminant type of the set of at least five illuminant types.

4. A system as in claim 3, wherein the associated maximum level is one of a plurality of associated maximum levels.

5. A system as in claim 1, wherein the received color coordinate is translated to a visually similar color coordinate, wherein the visually similar color coordinate has a greater associated luminous intensity than the luminous intensity associated with the received color coordinate.

6. A system as in claim 1, wherein the received color coordinate is translated to a visually similar color coordinate, wherein the visually similar color coordinate comprises a reproducible color whereas the received color coordinate is not a reproducible color.

7. A system as in claim 1, wherein the received color coordinate is translated to a visually similar color coordinate, wherein the visually similar color coordinate comprises a non-aging sensitive reproducible color whereas the received color coordinate is an aging sensitive reproducible color.

8. A system as in claim 1, wherein at least one illuminant type of the set of at least five illuminant types comprises a color-changing illuminant type.

9. A system as in claim 1, wherein the mapping uses a selected set of hue-adjacent illuminant types to select a preferred color rendering.

10. A system as in claim 1, wherein the output level set targets an optimal luminous intensity output level set.

11. A system as in claim 1, wherein the received color coordinate is determined using a measurement of an existing light source.

12. A system as in claim 1, wherein the received color coordinate is determined using a measurement of an illuminated surface.

13. A system as in claim 1, wherein an intensity is controlled for the received color coordinate by scaling each output level of the output level set proportionately.

14. A method for generating a colored light, comprising:
sorting a set of at least five illuminant types into a circular order by hue angle, wherein the set of at least five illuminant types is associated with a chromaticity gamut, and wherein each illuminant type of the set of at least five illuminant types is associated with a hue angle;
determining, using a processor, combinations of adjacent illuminant types of the set of at least five illuminant types in the circular order;
receiving a color coordinate; and
determining, based at least in part on a mapping, an output level set for the received color coordinate, wherein the mapping comprises associating each color coordinate with an output level set having an output level for each illuminant type of the set of at least five illuminant types using the combinations, wherein the output level for each illuminant type is determined at least in part using an interpolation of at least three chromaticity coordinates, wherein each chromaticity coordinate of the at least three chromaticity coordinates is determined at least in part using an intensity for each illuminant type, wherein the intensity targets a zero intensity or a full intensity, wherein a circular ordered list of illuminant types is circularly ordered according to an illuminant type hue angle, and wherein for each chromaticity coordinate all illuminant types of the set of at least five illuminant types targeting the full intensity are adjacent in the circular ordered list and all illuminant types of the set of at least five illuminant types targeting the zero intensity are adjacent in the circular ordered list.

15. A method as in claim 14, wherein the set of at least five illuminant types comprises at least six illuminant types.

16. A method as in claim 14, wherein the output level set for the color coordinate has an associated maximum level for at least one illuminant type of the set of at least five illuminant types.

17. A method as in claim 16, wherein the associated maximum level is one of a plurality of associated maximum levels.

18. A method as in claim 14, wherein the color coordinate is translated to a visually similar color coordinate, wherein the visually similar color coordinate has a greater associated luminous intensity than the luminous intensity associated with the color coordinate.

19. A method as in claim 14, wherein the color coordinate is translated to a visually similar color coordinate, wherein the visually similar color coordinate comprises a reproducible color whereas the color coordinate is not a reproducible color.

20. A method as in claim 14, wherein the color coordinate is translated to a visually similar color coordinate, wherein the visually similar color coordinate comprises a non-aging sensitive reproducible color whereas the color coordinate is an aging sensitive reproducible color.

21. A method as in claim 14, wherein at least one illuminant type of the set of at least five illuminant types comprises a color-changing illuminant type.

22. A method as in claim 14, wherein the mapping uses a selected set of hue-adjacent illuminant types to select a preferred color rendering.

23. A method as in claim 14, wherein the output level set targets an optimal luminous intensity output level set.

24. A method as in claim 14, wherein the color coordinate is determined using a measurement of an existing light source.

25. A method as in claim 14, wherein the color coordinate is determined using a measurement of an illuminated surface.

26. A method as in claim 14, wherein an intensity is controlled for the color coordinate by scaling each output level of the output level set proportionately.

27. A computer program product for generating a colored light, the computer program product being embodied in a computer readable storage medium and comprising computer instructions for:
sorting a set of at least five illuminant types into a circular order by hue angle, wherein the set of at least five illuminant types is associated with a chromaticity gamut, and wherein each illuminant type of the set of at least five illuminant types is associated with a hue angle;
determining combinations of adjacent illuminant types of the set of at least five illuminant types in the circular order;
receiving a color coordinate; and
determining, based at least in part on a mapping, an output level set for the received color coordinate, wherein the mapping comprises associating each color coordinate with an output level set having an output level for each illuminant type of the set of at least five illuminant types using the combinations, wherein the output level for each illuminant type is determined at least in part using an interpolation of at least three chromaticity coordinates, wherein each chromaticity coordinate of the at least three chromaticity coordinates is determined at least in part using an intensity for each illuminant type, wherein the intensity targets a zero intensity or a full intensity, wherein a circular ordered list of illuminant types is circularly ordered according to an illuminant type hue angle, and wherein for each chromaticity coordinate all illuminant types of the set of at least five illuminant types targeting the full intensity are adjacent in the circular ordered list and all illuminant types of the set of at least five illuminant types targeting the zero intensity are adjacent in the circular ordered list.

* * * * *